United States Patent
Carlton et al.

(10) Patent No.: US 12,095,712 B2
(45) Date of Patent: Sep. 17, 2024

(54) WIRELESS COMMUNICATION WITHIN A CONTROL PLANE AND A DATA PLANE

(71) Applicant: Intel Corporation, Santa Clara, CA (US)

(72) Inventors: Brent R. Carlton, Portland, OR (US); Asma Beevi Kuriparambil Thekkumpate, Santa Clara, CA (US); Renzhi Liu, Portland, OR (US); Rinkle Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 17/131,862

(22) Filed: Dec. 23, 2020

(65) Prior Publication Data
US 2022/0200776 A1    Jun. 23, 2022

(51) Int. Cl.
*H04L 5/14* (2006.01)
*H04B 1/44* (2006.01)
(Continued)

(52) U.S. Cl.
CPC ............ *H04L 5/1461* (2013.01); *H04B 1/44* (2013.01); *H04L 5/143* (2013.01);
(Continued)

(58) Field of Classification Search
CPC . H04L 5/1461; H04L 5/143; H04L 25/03834; H04L 5/0014; H04L 5/0023;
(Continued)

(56) References Cited

U.S. PATENT DOCUMENTS

| 10,111,173 B2 | 10/2018 | Alpman et al. |
| 2004/0171398 A1 | 9/2004 | Hanaoka et al. |

(Continued)

FOREIGN PATENT DOCUMENTS

| EP | 1735994 B1 | 12/2006 |
| KR | 100656339 B1 | 12/2006 |

OTHER PUBLICATIONS

Yoo, et al.; "A Switched-Capacitor RF Power Amplifier"; Institute of Electrical and Electronics Engineers Journal of Solid-State Circuits; Dec. 2011; vol. 46, No. 12, pp. 2977-2987.

(Continued)

*Primary Examiner* — Harry H Kim
(74) *Attorney, Agent, or Firm* — VIERING, JENTSCHURA & PARTNER MBB

(57) ABSTRACT

A transceiver may include a transmitter device, a receiver device, a secondary receiver device, and switching elements. The transmitter device may provide a transmit control signal on first and second channels. The receiver device may receive a receive control signal on the first and second channels. The secondary receiver device may monitor occupation of the first and second channels without decoding at least a portion of control signals concurrent with the receiver device receiving the receive control signal. The switching elements may control when the transmitter device provides the transmit control signal to one of and is electrically isolated from first and second antennas, the receiver device receives the receive control signal from one of and is electrically isolated from the first and second antennas, and the secondary receiver device monitors occupation of one of the first and second channels and is electrically isolated from the first and second antennas.

14 Claims, 17 Drawing Sheets

(51) Int. Cl.
    *H04L 25/02*     (2006.01)
    *H04L 25/03*     (2006.01)
    *H04W 52/02*     (2009.01)
    *H04W 74/00*     (2009.01)
    *H04W 74/0808*     (2024.01)

(52) U.S. Cl.
    CPC ... *H04L 25/03834* (2013.01); *H04W 52/0235* (2013.01); *H04W 74/008* (2013.01)

(58) Field of Classification Search
    CPC . H04L 25/0212; H04L 25/03012; H04B 1/44; H04W 52/0235; H04W 74/008; H04W 74/0808; Y02D 30/70
    See application file for complete search history.

(56) References Cited

U.S. PATENT DOCUMENTS

| | | |
|---|---|---|
| 2005/0141602 A1 | 6/2005 | Hyun et al. |
| 2006/0258307 A1 | 11/2006 | Neurater et al. |
| 2018/0026777 A1 | 1/2018 | Su et al. |
| 2020/0343930 A1* | 10/2020 | DiTommaso ............ H04B 1/44 |
| 2022/0368357 A1* | 11/2022 | Chen ..................... H04B 1/0057 |
| 2022/0416819 A1* | 12/2022 | Kim ....................... H01Q 21/28 |
| 2023/0006700 A1* | 1/2023 | Kishimoto ............... H04B 7/08 |
| 2024/0048163 A1* | 2/2024 | Tsuda ....................... H04B 1/00 |

OTHER PUBLICATIONS

Liu et al.; "An 802.11ba-Based Wake-Up Radio Receiver With Wi-Fi Transceiver Integration"; Institute of Electrical and Electronics Engineers Journal of Solid-State Circuits; May 2020; vol. 55, No. 5, pp. 1151-1164.

International Search Report issued for the corresponding International Application No. PCT/US2021/051166 mailed on Dec. 21, 2021, 5 pages (for informational purposes only).

* cited by examiner

WIRELESS COMMUNICATION WITHIN A CONTROL PLANE AND A DATA PLANE

TECHNICAL FIELD

The aspects discussed in the present disclosure are related to wireless communication within a control plane and a data plane.

BACKGROUND

Unless otherwise indicated in the present disclosure, the materials described in the present disclosure are not prior art to the claims in the present application and are not admitted to be prior art by inclusion in this section.

An electronic device (e.g., circuits, components, packages, chips, boards, racks, etc.) may operate using both a control plane and a data plane. The electronic device may include components that provide a control signal via the control plane and a data signal via the data plane. The components may perform various operations based on the control signal, the data signal, or some combination thereof. The components may provide the control signal to perform operations related to control of the electronic device (e.g., controlling components for processing the data signal). In addition, the components may provide the data signal to perform operations related to processing data generated by or for an end user (e.g., another circuit, another component, another package, another chip, another board, another rack, another electronic device, or a user of the electronic device).

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which.

DESCRIPTION

Figure 1:
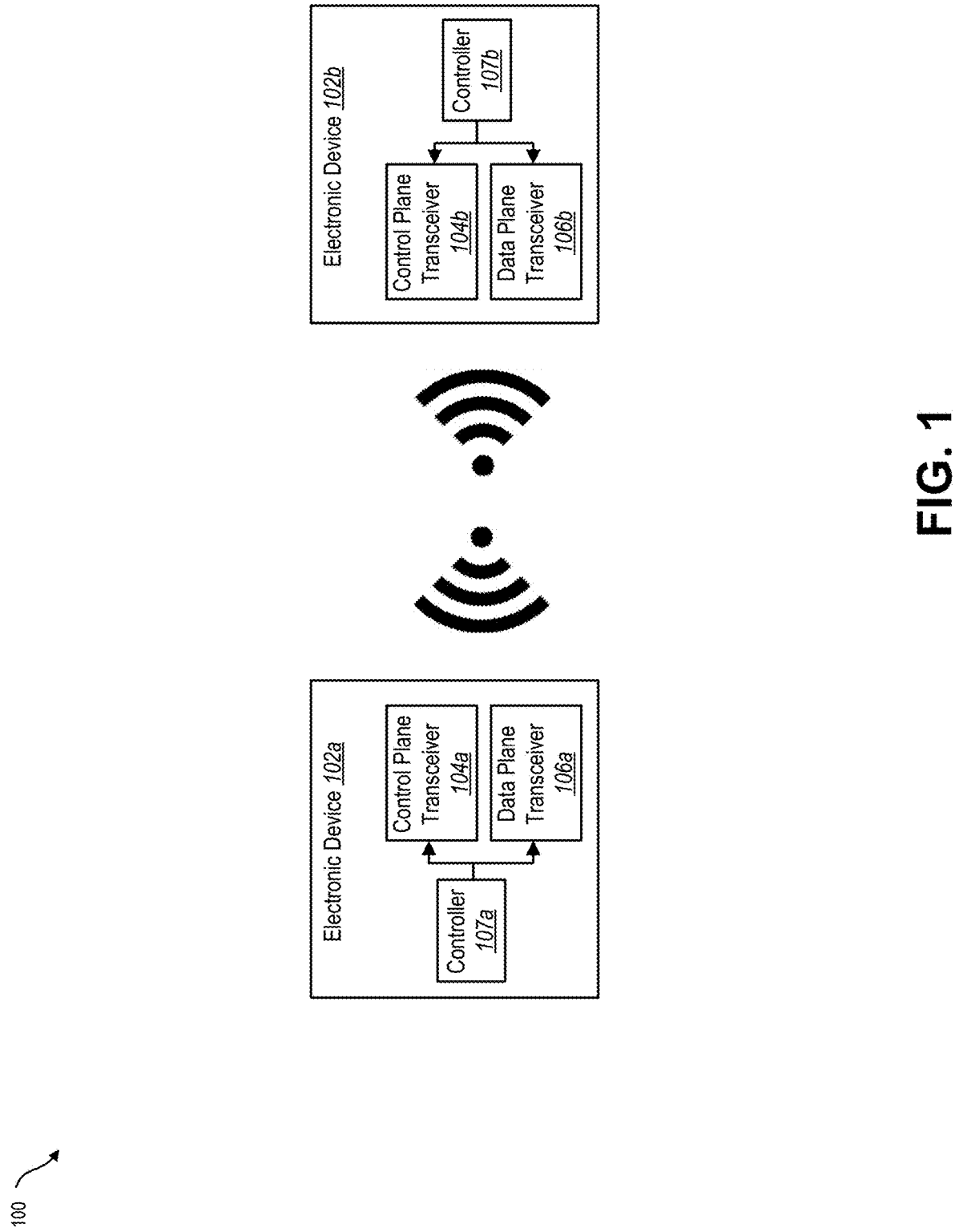
FIG. 1 illustrates a block diagram of an example environment to wirelessly communicate a data signal and a control signal.

The following detailed description refers to the accompanying drawings that show, by way of illustration, exemplary details in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [. . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [. . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An electronic device (e.g., circuits, components, packages, chips, boards, racks, etc.) may operate using both a control plane and a data plane. The electronic device may include components that provide a control signal via the control plane and a data signal via the data plane. The components may perform various operations based on the control signal, the data signal, or some combination thereof. The components may provide the control signal to perform operations related to control of the electronic device (e.g., controlling components for processing the data signal). In addition, the components may provide the data signal to perform operations related to processing data generated by or for an end user (e.g., another circuit, another component, another package, another chip, another board, another rack, another electronic device, or a user of the electronic device).

In some aspects, the components may provide the control signal to perform quality of service (QoS) management operations. The components may provide the control signal to control a state of operation of the electronic device. For example, the components may provide the control signal to control a state of the component or the state of other components within the electronic device. For example, the components may provide the control signal to control a state of switches, variable gain amplifiers (VGAs), central processing units (CPUs), individual transistors, memory devices, or any other appropriate component within the electronic device.

In some aspects, the components may provide the control signal to control routing of the data signal. For example, the components may provide the control signal to generate a routing table, control or determine how the data signal is to be forwarded, indicate a modulation scheme, or any other appropriate routing function. Example protocols for the control signal may include address resolution protocol (ARP), routing information protocol (RIP), dynamic host configuration protocol (DHCP), or any other appropriate protocol.

In some aspects, the components may provide the data signal to perform data manipulation, signal manipulation, signal processing, or any other appropriate operation related to data (generally referred to in the present disclosure as signal processing). The components may perform the signal processing based on the control signal. The components may provide the data signal to permit data to be transmitted from a source (e.g., a component, an electronic device, or a physical position within the electronic device) to a destination (e.g., another component, another electronic device, or another physical position within the electronic device). The data signal may be routed (via switching) within the data plane by various components within the electronic device.

In some aspects, the components may provide the control signal at a control frequency that is different than a data frequency of the data signal. In some aspects, the data frequency may be greater than the control frequency. In these and other aspects, the control frequency may be equal to or less than ten gigahertz (GHz).

The control plane and the data plane may include various components that permit the control signal and the data signal to propagate the planes. For example, the control plane and the data plane may include any number of traces, wires, vias, resistors, capacitors, inductors, transistors, or any other appropriate component to route the control signal and the data signal. As a number of components within the electronic device increases, so does a footprint of these components. In addition, as the number of components within the electronic device increases, so does a complexity of designing the electronic device to properly route the control signal and the data signal.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an example environment 100 to wirelessly communicate a data signal and a control signal, in accordance with at least one aspect described in the present disclosure. The environment 100 may include a first electronic device 102a and a second electronic device 102b (generally referred to in the present disclosure as "electronic device 102" or "electronic devices 102").

The first electronic device 102a may include a first controller 107a communicatively coupled to a first control plane transceiver 104a and a first data plane transceiver 106a. The second electronic device 102b may include a second controller 107b communicatively coupled to a second control plane transceiver 104b and a second data plane transceiver 106b. The first control plane transceiver 104a and the second control plane transceiver 104b are generally referred to in the present disclosure as control plane transceiver 104 or control plane transceivers 104. The first data plane transceiver 106a and the second data plane transceiver 106b are generally referred to in the present disclosure as data plane transceiver 106 or data plane transceivers 106. The first controller 107a and the second controller 107b are generally referred to in the present disclosure as controller 107 or controllers 107.

The control plane transceivers 104 may wirelessly couple to each other. In some aspects, the control plane transceivers 104 may wirelessly transmit and receive the control signal via the wireless coupling to create a control plane that extends within and between the electronic devices 102. In addition, the data plane transceivers 104 may wirelessly couple to each other. In these and other aspects, the data plane transceivers 106 may wirelessly transmit and receive the data signal via the wireless coupling to create a data plane that extends within and between the electronic devices 102.

In some aspects, the control plane transceivers 104 and the data plane transceivers 106 may wirelessly couple to each other by transmitting and receiving signals within a radio frequency (RF) domain. In these and other aspects, the RF domain may be separated into multiple channels that each include a frequency span within the RF domain. The wirelessly transmitted signals may be transmitted on one or more of the channels within the RF domain.

The controllers 107 may control a state or a mode of the corresponding control plane transceiver 104 and the corresponding data plane transceiver 106. In some aspects, the controllers 107 may include pre-defined settings for controlling the control plane transceivers 104 and the data plane transceivers 106. For example, the controllers 107 may include pre-defined settings indicating which channel(s) the control plane transceivers 104 and the data plane transceivers 106 are to communicate on. In other aspects, the controllers 107 may determine a current state of the corresponding electronic devices 102 and control the control plane transceivers 104 and the data plane transceivers 106 according to the current state. The controllers 107, based on the pre-defined settings; the current state; the control signal; the data signal; or some combination thereof, may control the wireless coupling between the control plane transceivers 104 and the wireless coupling between the data plane transceivers 106.

The electronic devices 102 may include devices that are physically separated from each other. For example, the electronic devices 102 may include different circuits separated within a chip, different chips physically separated within a board (illustrated in FIG. 2), different packages physically separated within a chip (illustrated in FIG. 3), different boards physically separated within an electronic unit (illustrated in FIG. 4), or different racks physically separated within an electronic unit (illustrated in FIG. 5).

In some aspects, the first control plane transceiver 104a may wirelessly transmit the control signal to the second control plane transceiver 104b to control components within the second electronic device 102b. In other aspects, the second control plane transceiver 104b may wirelessly transmit the control signal to the first control plane transceiver 104a to control components within the first electronic device 102a. In addition, the data plane transceivers 106a-b may wirelessly transmit the data signal to each other to transfer data between the electronic devices 102.

Each of the control plane transceivers 104 and the data plane transceivers 106 may include one or more transmitters and one or more receivers. Each of the transmitters may include components for processing the corresponding signals in preparation for wireless transmission. For example, each of the transmitters may include a digital to analog (DAC), a baseband stage, an up-conversion stage, and a filtering and amplification stage. In addition, each of the receivers may include components for processing the corresponding signals that are wirelessly received. For example, each of the receivers may include a down conversion stage, a baseband stage, and an analog to digital converter (ADC).

The DAC may convert a digital signal that includes data (either data within the data plane or data within the control plane) to an analog signal that includes the data. In some, aspects, the DAC may receive the digital signal from the corresponding controller 107. In addition, the analog signal may be generated at a baseband frequency. The baseband stage may manipulate the analog signal in preparation for wireless transmission as a transmit signal. For example, the baseband stage may modulate the analog signal. The up-conversion stage may up convert the modulated analog signal from the baseband frequency to a frequency within the RF domain. In addition, the up-conversion stage may manipulate a phase of the modulated analog signal. The up-conversion stage may provide the manipulated analog signal to an antenna element to be transmitted as the transmit signal including the control signal or the data signal on a corresponding channel within the RF domain.

The receivers may also include antenna elements configured to receive the transmitted analog signal as a receive signal including the control signal or the data signal on the corresponding channel. The down conversion stage may down convert the receive signal from the frequency within the RF domain to the baseband frequency. In addition, the down conversion stage may manipulate a phase of the receive signal to compensate for phase rotation that occurs. The baseband stage may demodulate the receive signal. The ADC may convert the demodulated signal to a digital signal to recover the data. The ADC may provide the digital demodulated signal to the corresponding controllers 107. Example transmitters and receivers are discussed in more detail below.

Figure 2:
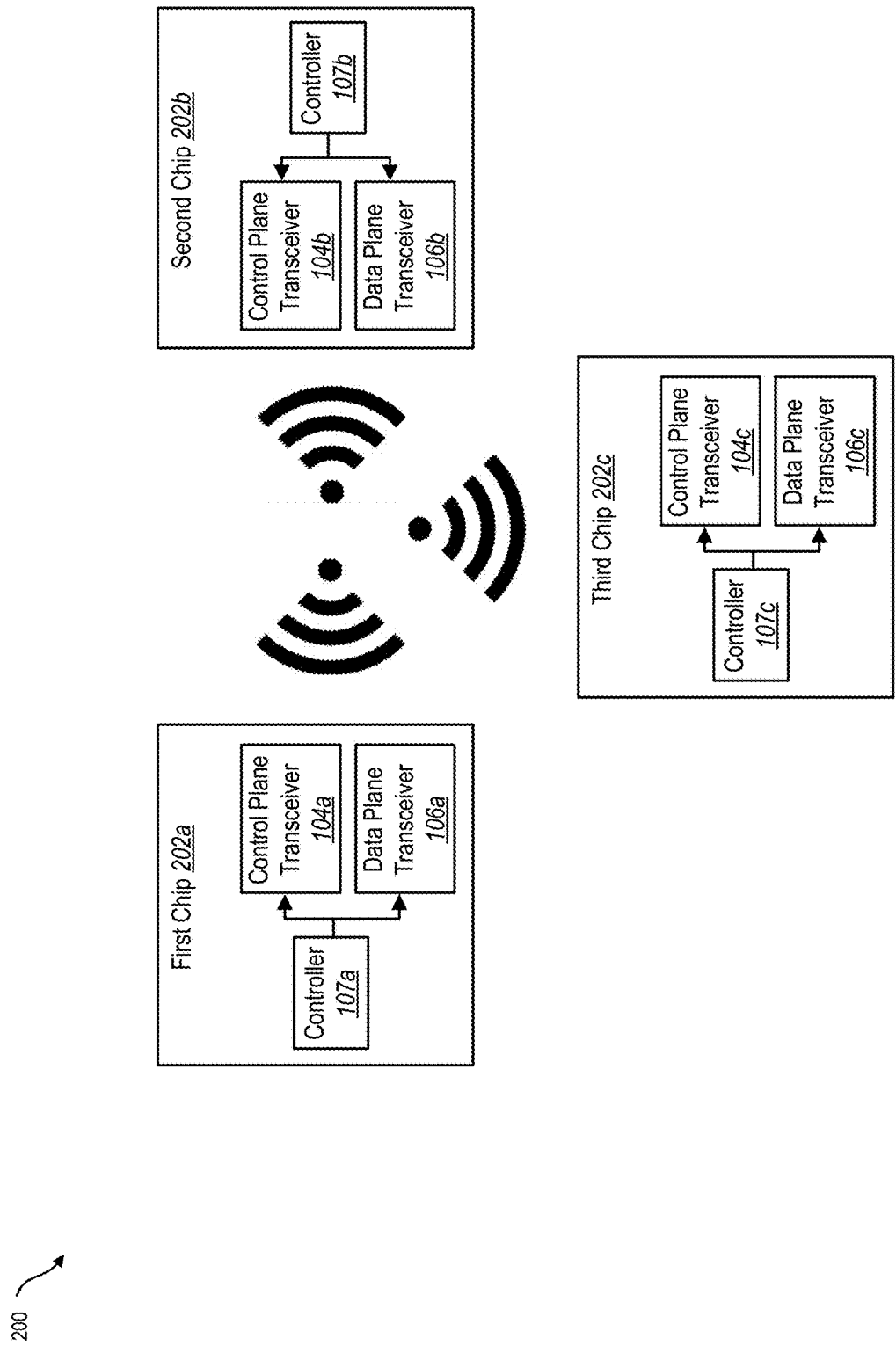
FIG. 2 illustrates a block diagram of another example environment to wirelessly communicate the data signal and the control signal.

FIG. 2 illustrates a block diagram of another example environment 200 to wirelessly communicate the data signal and the control signal, in accordance with at least one aspect described in the present disclosure. The environment 200 may include a first chip 202a, a second chip 202a, and a third chip 202c (generally referred to in the present disclosure as "chip 202" or "chips 202"). Each of the chips 202 may include the controller 107, the control plane transceiver 104, and the data plane transceiver 106. Each of the data plane transceivers 106 may be wirelessly coupled to each other. In addition, each of the control plane transceivers 104 may be wirelessly coupled to each other. The controllers 107, the control plane transceivers 104, and the data plane transceivers 106 may operate as described above in relation to FIG. 1. In contrast, the environment 200 may extend the control plane and the data plane to two or more chips 202 out of multiple chips 202.

According to at least one aspect in the present disclosure, the control plane transceivers 104, the data plane transceivers 106, or some combination thereof may extend the control plane and the data plane between and within the chips 202 while reducing the circuit footprint of the chips 202 compared to chips that include wired control planes and data planes.

Figure 3:
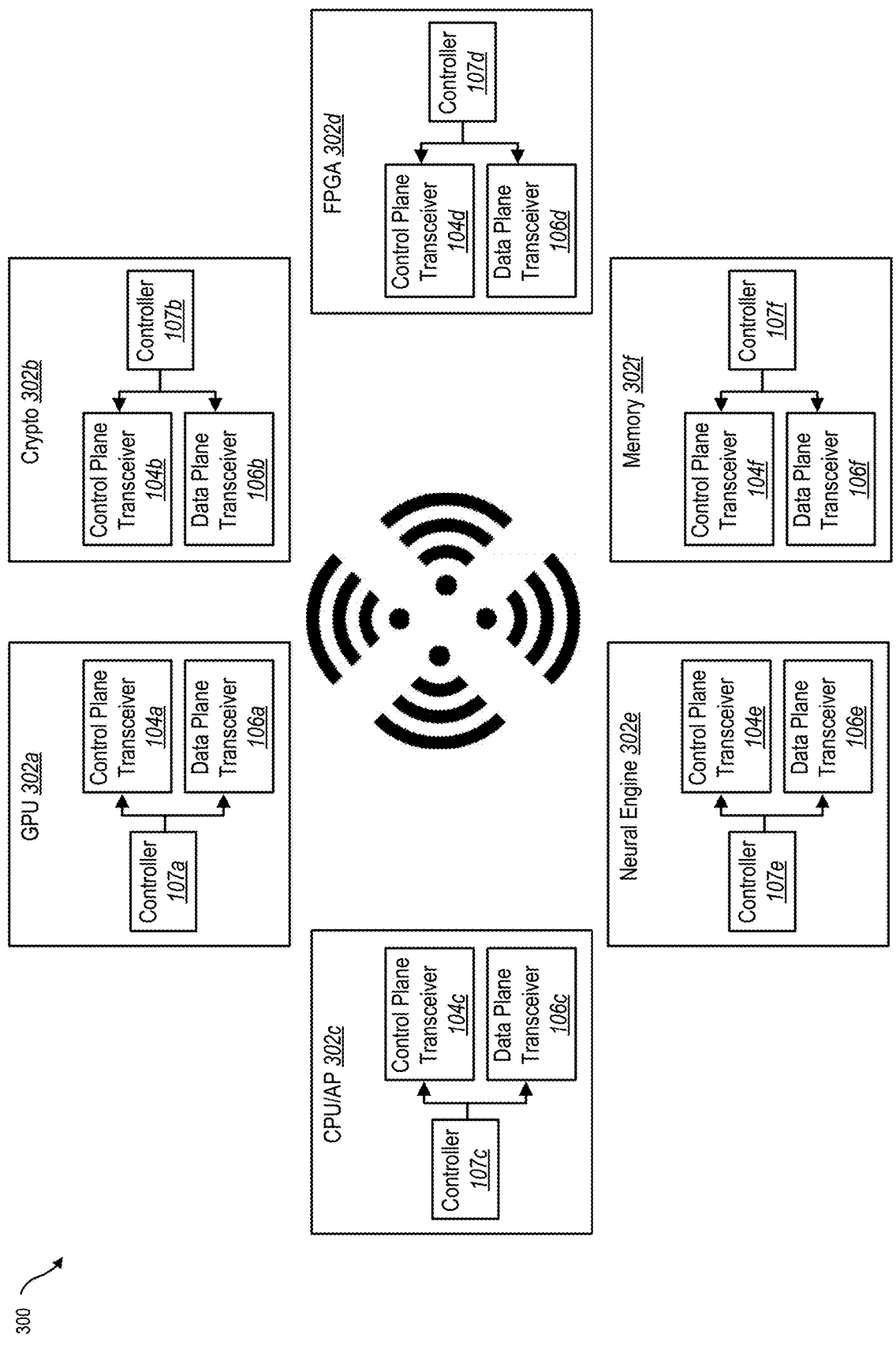
FIG. 3 illustrates a block diagram of yet another example environment to wirelessly communicate the data signal and the control signal.

FIG. 3 illustrates a block diagram of yet another example environment 300 to wirelessly communicate the data signal and the control signal, in accordance with at least one aspect described in the present disclosure. The environment 300 may include a GPU 302, a crypto 302b, a central processing unit (CPU)/application processor (AP) 302c, a field programmable gate array (FPGA) 302d, a neural engine 302e, and a memory 302f (generally referred to in the present disclosure as package 302 or packages 302). Each of the packages 302 may include the controller 107, the control plane transceiver 104, and the data plane transceiver 106. Each of the data plane transceivers 106 may be wirelessly coupled to each other. In addition, each of the control plane transceivers 104 may be wirelessly coupled to each other. The controllers 107, the control plane transceivers 104, and the data plane transceivers 106 may operate as described above in relation to FIG. 2. In contrast, the environment 300 may extend the control plane and the data plane within two or more packages 302 out of multiple packages 302.

According to at least one aspect in the present disclosure, the control plane transceivers 104, the data plane transceivers 106, or some combination thereof may extend the control plane and the data plane between and within the packages 302 while reducing the circuit footprint of the packages 302 compared to packages that include wired control planes and data planes.

Figure 4:
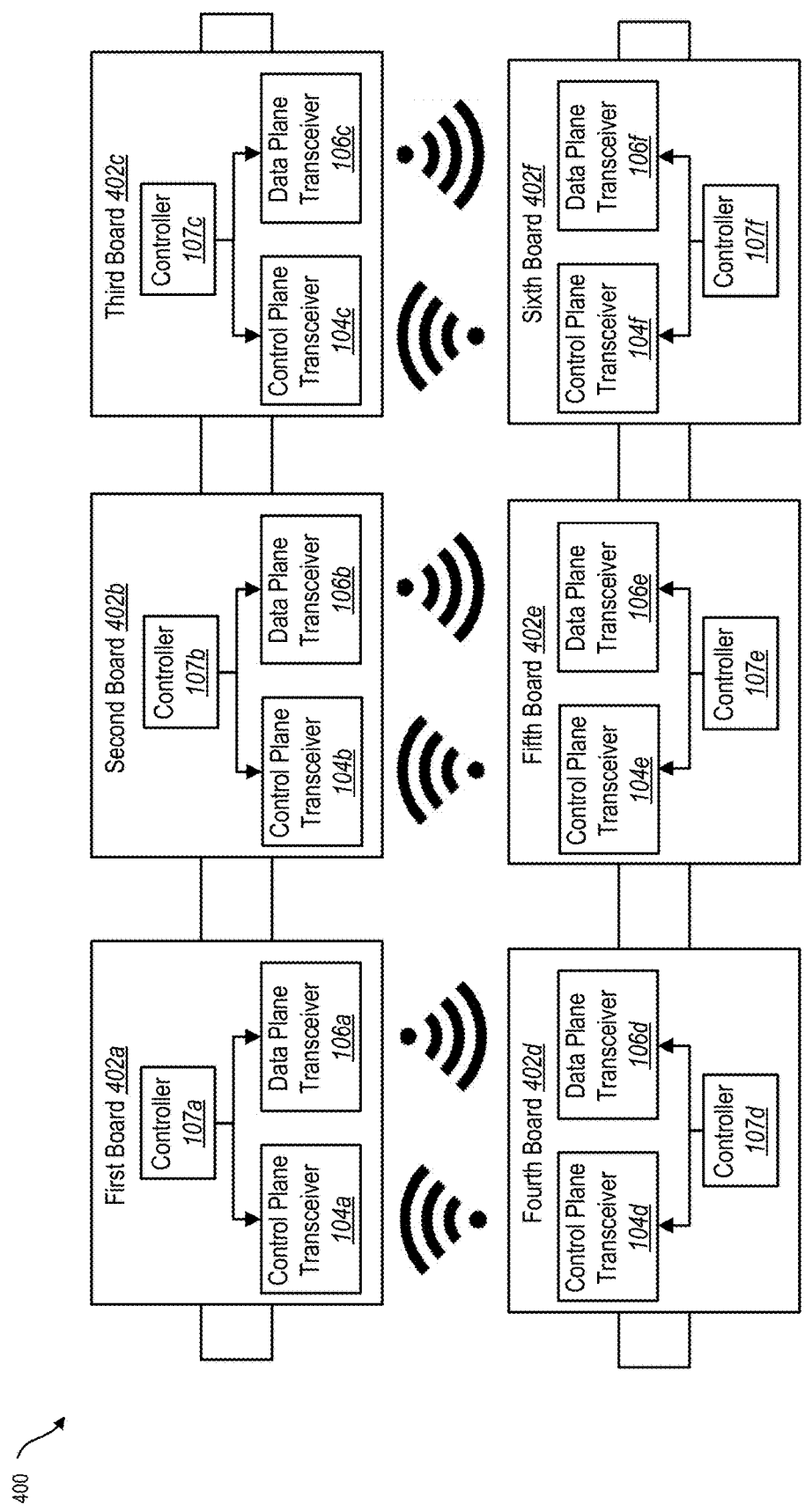
FIG. 4 illustrates a block diagram of an example environment to wirelessly communicate the data signal and the control signal.

FIG. 4 illustrates a block diagram of an example environment 400 to wirelessly communicate the data signal and the control signal, in accordance with at least one aspect described in the present disclosure. The environment 400 may include a first board 402a, a second board 402b, a third board 402c, a fourth board 402d, a fifth board 402e, and a sixth board 402f (generally referred to in the present disclosure as board 402 or boards 402). Each of the boards 402 may include the controller 107, the control plane transceiver 104, and the data plane transceiver 106. Each of the data plane transceivers 106 may be wirelessly coupled to each other. In addition, each of the control plane transceivers 104 may be wirelessly coupled to each other. The controllers 107, the control plane transceivers 104, and the data plane transceivers 106 may operate as described above in relation to FIG. 2. In contrast, the environment 400 may extend the control plane and the data plane within two or more boards 402 out of multiple boards 402.

According to at least one aspect in the present disclosure, the control plane transceivers 104, the data plane transceivers 106, or some combination thereof may extend the control plane and the data plane between and within the boards 402 while reducing the circuit footprint of the boards 402 compared to boards that include wired control planes and data planes.

Figure 5:
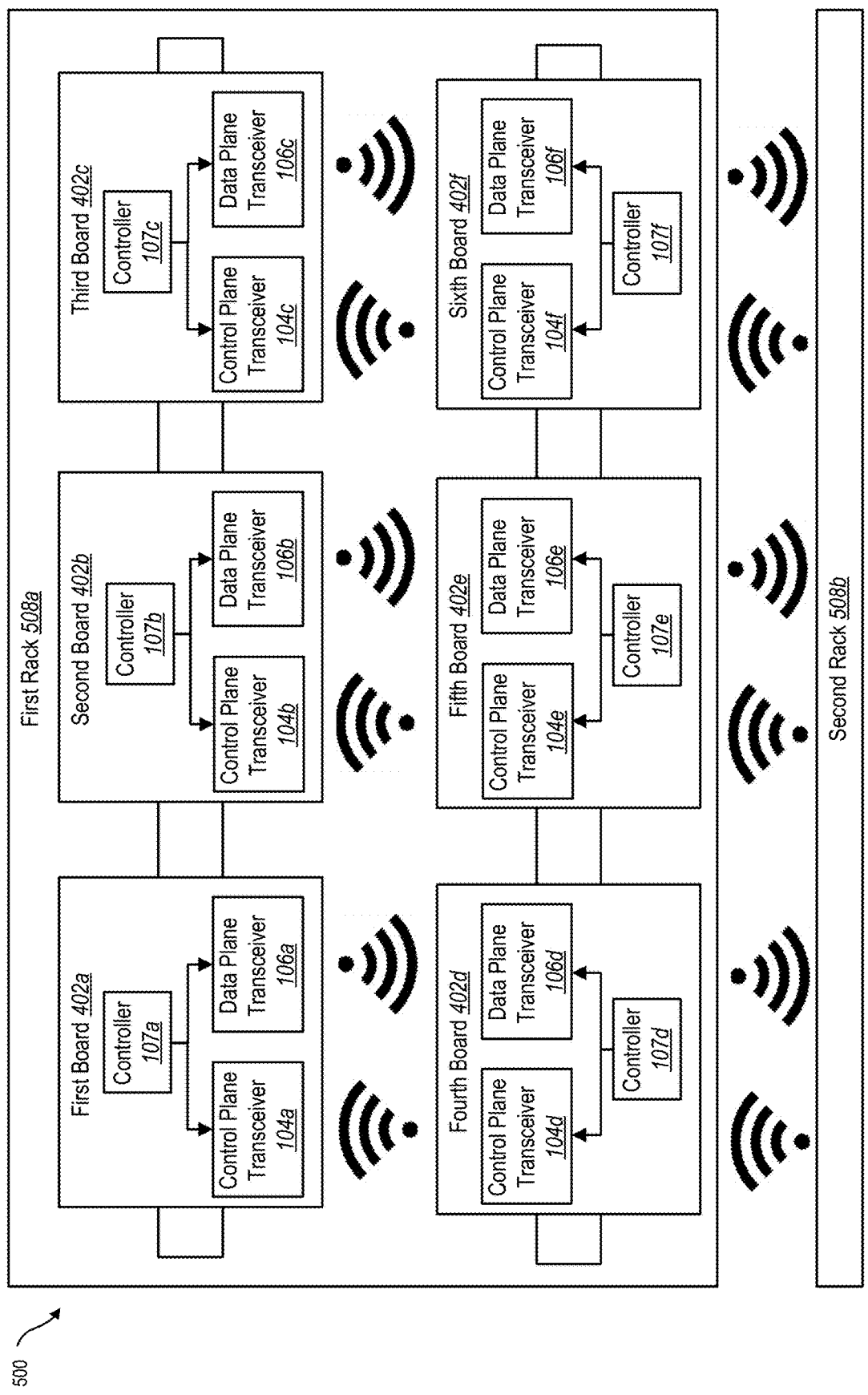
FIG. 5 illustrates a block diagram of another example environment to wirelessly communicate the data signal and the control signal.

FIG. 5 illustrates a block diagram of another example environment 500 to wirelessly communicate the data signal and the control signal, in accordance with at least one aspect described in the present disclosure. The environment 500 may include a first rack 508a and a second rack 508b (generally referred to in the present disclosure as rack 508 or racks 508). The racks may include the boards 402. For example, the first rack may include the first board 402a through the sixth board 402f. Only the first rack 508a is illustrated as including boards 402 in FIG. 5 for ease of illustration. Each of the racks 508 may include any number of boards 402.

Each of the boards 402 may include the controller 107, the control plane transceiver 104, and the data plane transceiver 106. Each of the data plane transceivers 106 may be wirelessly coupled to each other. In addition, each of the control plane transceivers 104 may be wirelessly coupled to each other. The controllers 107, the control plane transceivers 104, and the data plane transceivers 106 may operate as described above in relation to FIG. 2. In contrast, the environment 500 may extend the control plane and the data plane within two or more boards 402 within the same rack 508 or within different racks 508 (e.g., the first board 402a may be wirelessly coupled to a board 402 within the second rack 508b).

According to at least one aspect in the present disclosure, the control plane transceivers 104, the data plane transceivers 106, or some combination thereof may extend the control plane and the data plane between and within the boards within the same rack 508 or different racks 508 while reducing the circuit footprint of the boards 402 compared to boards and racks that include wired control planes and data planes.

Figure 6:
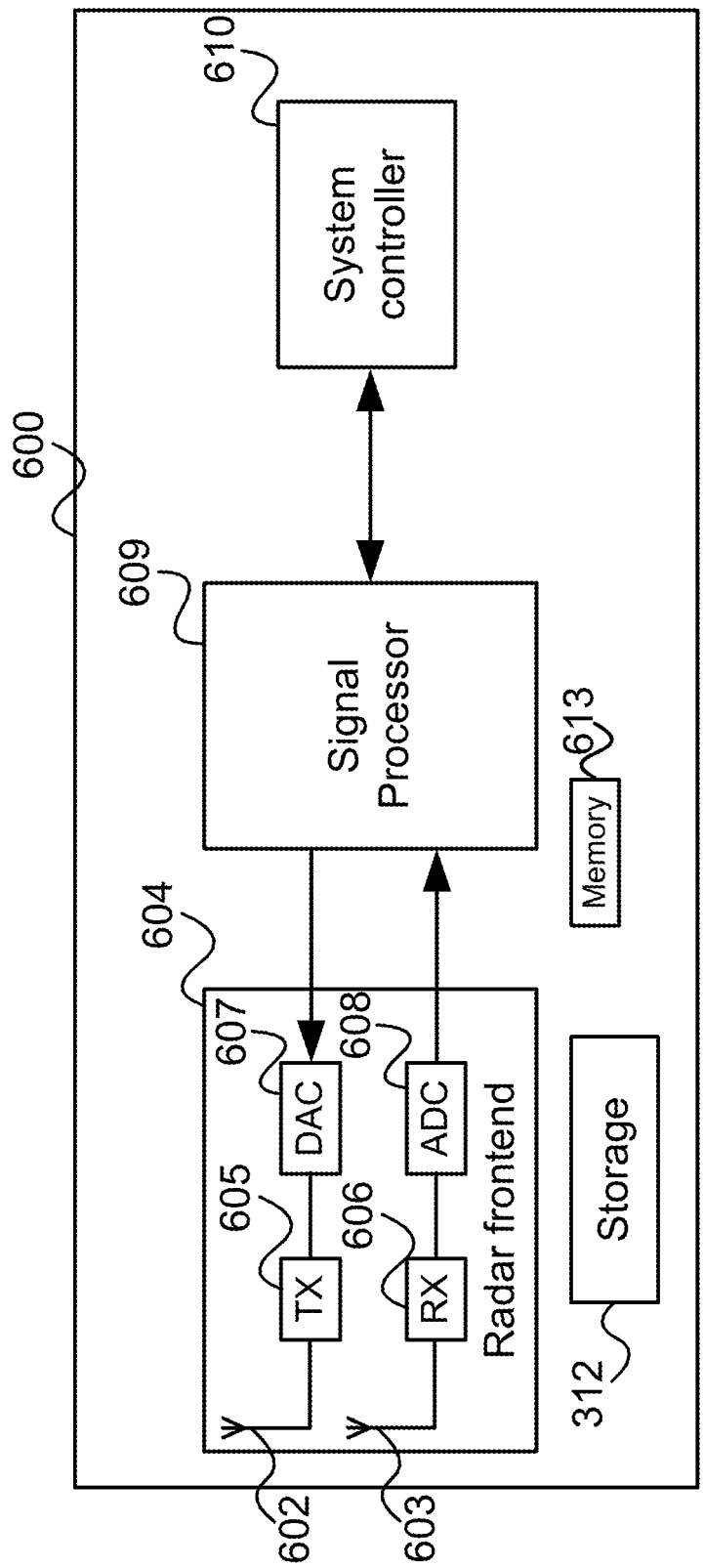
FIG. 6 illustrates an example transceiver that may be implemented in the control plane transceivers, the data plane transceivers, or some combination thereof of FIGS. 1-5.

FIG. 6 illustrates an example transceiver 600 that may be implemented in the control plane transceivers 104a-b, the data plane transceivers 106a-b, or some combination thereof of FIGS. 1-5, in accordance with at least one aspect described in the present disclosure.

The transceiver 600 includes an antenna arrangement, which in this example includes one or more transmit antennas 602 and one or more receive antennas 603. The transceiver 600 further includes a frontend 604 and a signal processor 609.

The one or more transmit antennas 602 are coupled with a transmitter (or transmitter arrangement) 605 of the frontend 604. The one or more receive antennas 603 are coupled with a receiver (or receiver arrangement) 606 of the frontend 604. The transmitter 605 may for example include an oscillator and a power amplifier to generate radio transmit signals. The receiver 606 for example includes one or more mixers and one or more filters for down-converting radio signals received via the one or more receive antennas.

The signal processor 609 supplies digital transmit data (e.g., a digital control signal or a digital data signal) to the frontend 604. The frontend 604 includes a DAC 607 which converts the digital transmit data to an analog transmit signal. The transmitter 605 converts the analog transmit signal to a radio transmit signal which it transmits via the one or more transmit antennas 602.

The receiver 606 converts a radio receive signal received via the one or more receive antennas 603 to an analog receive signal. The frontend 604 includes an ADC 608 which generates digital reception data from the analog receive signal which it supplies to the signal processor 609.

The signal processor 609 recovers the data from the analog receive signal. The signal processor 609 for example supplies the recovered data to a system controller 610 (e.g. the controllers 107*a-b*) which controls components within the corresponding electronic device.

The transceiver 600 may include a storage 612 or a memory 613, e.g. storing recovered data being processed by the signal processor 609.

According to some aspects of the disclosure, the signal processor 609 may include, or may be implemented, partially or entirely, by circuitry and/or logic, e.g., one or more processors including circuitry and/or logic, memory circuitry and/or logic. Additionally or alternatively, one or more functionalities of signal processor 609 may be implemented by logic, which may be executed by a machine and/or one or more processors, e.g., as described herein.

According to an aspect of the disclosure, the signal processor 609 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

Some components within one or more electronic devices may be physically separated but form the same data plane or the same control plane. For example, components within the same data plane or the same control plane may be split between different chips, packages, boards, racks, or some combination thereof as discussed above. The components may be separated to address yield challenges in manufacturing processes, to reduce circuit footprints, to reduce circuit complexity. However, as capabilities of electronic devices continue to increase and as the separation of the components increases, a complexity and footprint associated with a wired interconnect between the separated components also increases.

In some aspects, the electronic devices may implement wireless communication within the data plane and the control plane to address the complexity and the footprint increase. Some wireless communication technologies may not provide full duplex communication that is compatible with the control plane, the data plane, or some combination thereof. In addition, some wireless communication technologies may not provide full duplex communication for point to multi-point or multi-point to multi-point communication that is compatible with the control plane, the data plane, or some combination thereof. In addition, these wireless communication technologies may not obtain communication capability and function parity with wired communication within the control plane or the data plane due to the lack of full duplex communication.

Some aspects described in the present disclosure may provide full duplex wireless communication within the control plane, the data plane, or some combination thereof. In addition, some aspects described in the present disclosure may provide point to multi-point or multi-point to multi-point full duplex wireless communication within the control plane, the data plane, or some combination thereof.

In some aspects, the transceiver may include a first antenna element and a second antenna element. The first antenna element and the second antenna element may wirelessly transmit and receive a signal (e.g., a control signal or a data signal). The first antenna element may include a multi-channel antenna element. The first antenna element may be configured to wirelessly transmit the signal (e.g., a transmit signal) and wirelessly receive the signal (e.g., a receive signal) on a first channel. The second antenna element may also include a multi-channel antenna element. The second antenna element may wirelessly transmit the signal and wirelessly receive the signal on a second channel.

The transceiver may also include a transmitter device (generally referred to in the present disclosure as a "transmitter"). The transmitter may be capable of providing the transmit signal on the first channel, the second channel, or some combination thereof. In addition, the transceiver may include a receiver device (generally referred to in the present disclosure as a "receiver"). The receiver may be capable of receiving the receive signal on the first channel, the second channel, or some combination thereof. Further, the transceiver may include a secondary receiver device (generally referred to in the present disclosure as a "secondary receiver"). The secondary receiver may monitor occupation of the first channel, the second channel, or some combination thereof without decoding at least a portion of signals on the corresponding channel. In addition, the secondary receiver may monitor occupation of the first channel, the second channel, or some combination thereof concurrent with the receiver receiving the receive signal.

In some aspects, the secondary receiver may include a low power receiver that may not operate in an always on state. The secondary receiver may reduce standby power consumption of the transceiver compared to aspects in which the receiver operates in the always on state. In addition, the secondary receiver may perform channel occupation prior to the transmitter transmitting the transmit signal. Further, the secondary receiver may perform the channel occupation concurrent with the receiver actively receiving the receive signal.

The transceiver may also include multiple switches. Each of the switches may be electrically coupled between one of the transmitter, the receiver, and the secondary receiver and one of the first antenna element and the second antenna element. In addition, each of the switches may transition between an open state and a closed state to control when the transmitter, the receiver, the secondary receiver, or some combination thereof are electrically coupled to the first antenna element and the second antenna element. For example, the switches may control when the transmitter provides the transmit signal to the first antenna element or the second antenna element and when the transmitter is electrically isolated from both the first antenna element and the second antenna element. As another example, the switches may control when the receiver receives the receive signal from the first antenna element or the second antenna element and when the receiver is electrically isolated from both the first antenna element and the second antenna element. As yet another example, the switches may control when the secondary receiver monitors occupation of the first channel or the second channel or when the secondary receiver is electrically isolated from both the first antenna element and the second antenna element.

In some aspects, the first antenna element and the second antenna element may include single channel antenna elements configured for frequency division duplexing (FDD) operation. In these and other aspects, the switches may include a dual-port-three-throw (DP3T) switch to interface the first antenna element and the second antenna element with the transmitter, the receiver, and the secondary receiver. According to at least one aspect, the transceiver may switch configurations for the transmitter and the receiver between the first channel and the second channel. For example, a controller (e.g., controller 107) may control the switches to cause the transmitter to switch from transmitting on the first channel to the second channel. In addition, the transceiver may support single point to multi-point and multi-point to multi-point wireless communication. The wireless coupling may replace portions of the wired control plane, the wired data plane, or some combination thereof.

Therefore, at least one aspect described in the present disclosure may extend the control plane, the data plane, or some combination thereof between electronic devices that are physically separated through wireless coupling. In addition, one or more aspect described in the present disclosure may permit reconfigurable wireless communication by the transmitter, the receiver, the secondary receiver, or some combination thereof to permit full duplex communication.

Figure 7:
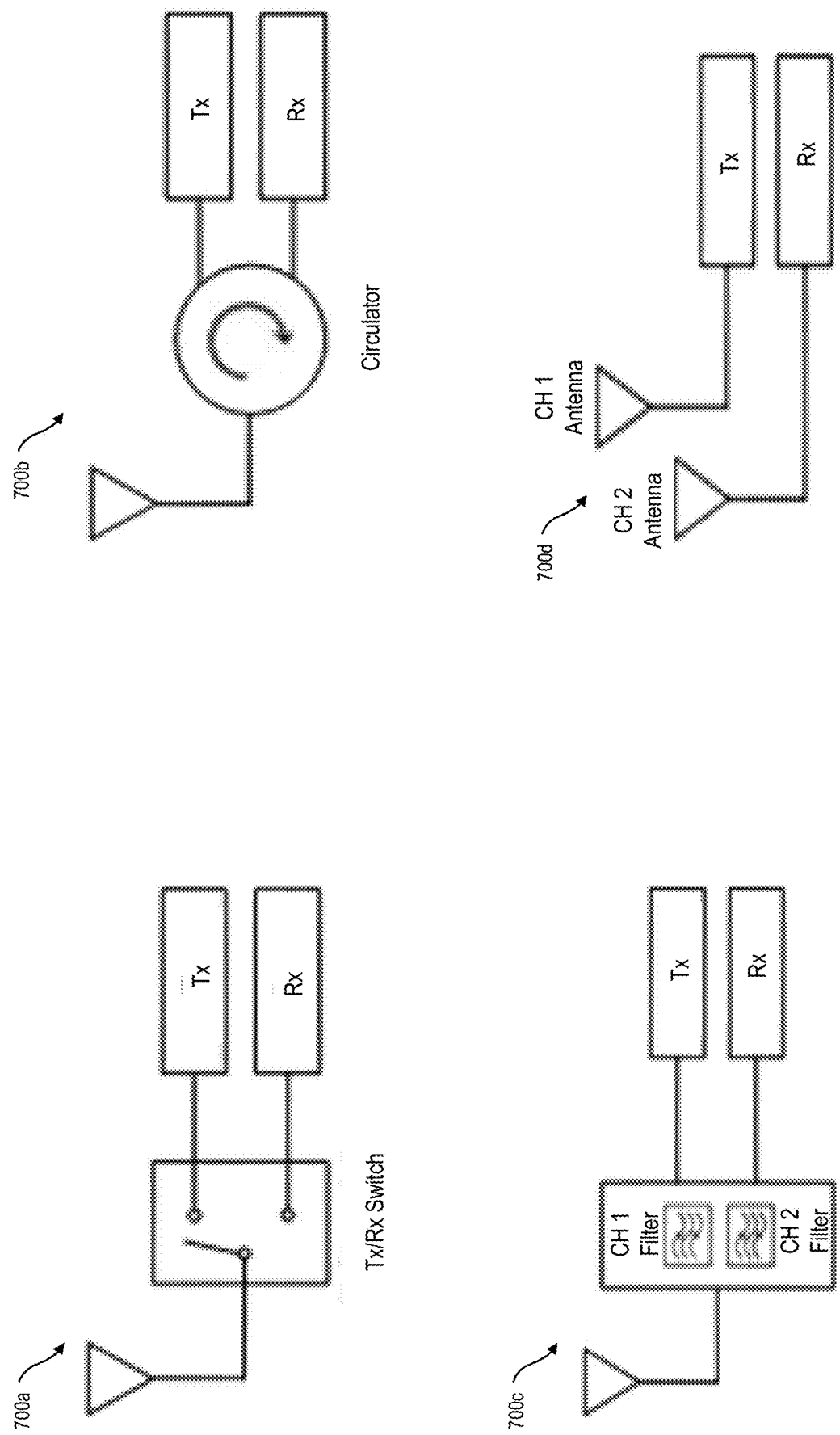
FIG. 7 illustrates example transceivers.

FIG. 7 illustrates example transceivers 700a-d in accordance with at least one aspect described in the present disclosure. The first transceiver 700a may include a time-division duplexing (TDD) transceiver. The second transceiver 700b may include an in-band full duplexing transceiver. The third transceiver 700c may include a FDD transceiver. The fourth transceiver 700d may also include a FDD transceiver.

The first transceiver 700a may include a Tx/Rx switch for controlling whether the transmitter (illustrated as Tx in FIG. 7) or the receiver (illustrated as Rx in FIG. 7) is electrically coupled to the antenna element. The first transceiver 700a may operate according to half-duplex communication due to the uplink (e.g., the link involving the transmitter) and the downlink (e.g., the link involving the receiver) are time division controlled by the Tx/Rx switch.

The second transceiver 700b may include a circulator. The circulator may separate directional signal flow for the transmitter and the receiver to enable simultaneous uplink and downlink communication. The second transceiver 700a may be configured to communicate using a single channel for both the uplink and the downlink to permit point to point communication. To enable point to multi-point communication or multi-point to multi-point communication, the second transceiver 700a may communicate using multiple channels.

The third transceiver 700c may include a frequency diplexer and a dual band antenna element. The third transceiver 700a may communicate using two or more channels that are separated by the diplexer. The channels associated with the uplink and the downlink may both be fixed within the third transceiver 700c. For example, the uplink may be associated with the first channel and the downlink may be associated with the second channel. The third transceiver 700c may not be configured to switch the channel association. The third transceiver 700c may operate according to a fixed point to multi-point topology without being able to switch the topology.

The receiver in the third transceiver 700c may operate in an always-on state for channel monitoring and may not be configured to perform channel occupation monitoring. For example, while the receiver is actively receiving on the second channel, the transmitter may be instructed to transmit the data signal on the first channel according to an unscheduled protocol. According to the unscheduled protocol, prior to transmitting the data signal on the first channel, the first channel may be monitored for channel occupation. Since the receiver operates in the always-on state on the second channel, the third transceiver 700c may not support unscheduled full-duplex communication.

The fourth transceiver 700d may include two single channel antenna elements. The fourth transceiver 700d may communicate using two or more channels that are separated by the antenna elements. The channels associated with the uplink and the downlink may both be fixed. For example, the uplink may be associated with the first channel and the downlink may be associated with the second channel. The fourth transceiver 700d may not be configured to switch the channel association. The fourth transceiver 700d may operate according to a fixed point to multi-point topology without being able to switch the topology.

The receiver in the fourth transceiver 700d may operate in an always-on state for channel monitoring and may not be configured to perform channel occupation monitoring. For example, while the receiver is actively receiving on the second channel, the transmitter may be instructed to transmit the data signal on the first channel according to an unscheduled protocol. According to the unscheduled protocol, prior to transmitting the data signal on the first channel, the first channel may be monitored for occupation. Since the receiver operates in the always-on state on the second channel, the fourth transceiver 700d may not support unscheduled full-duplex communication.

Figure 8:
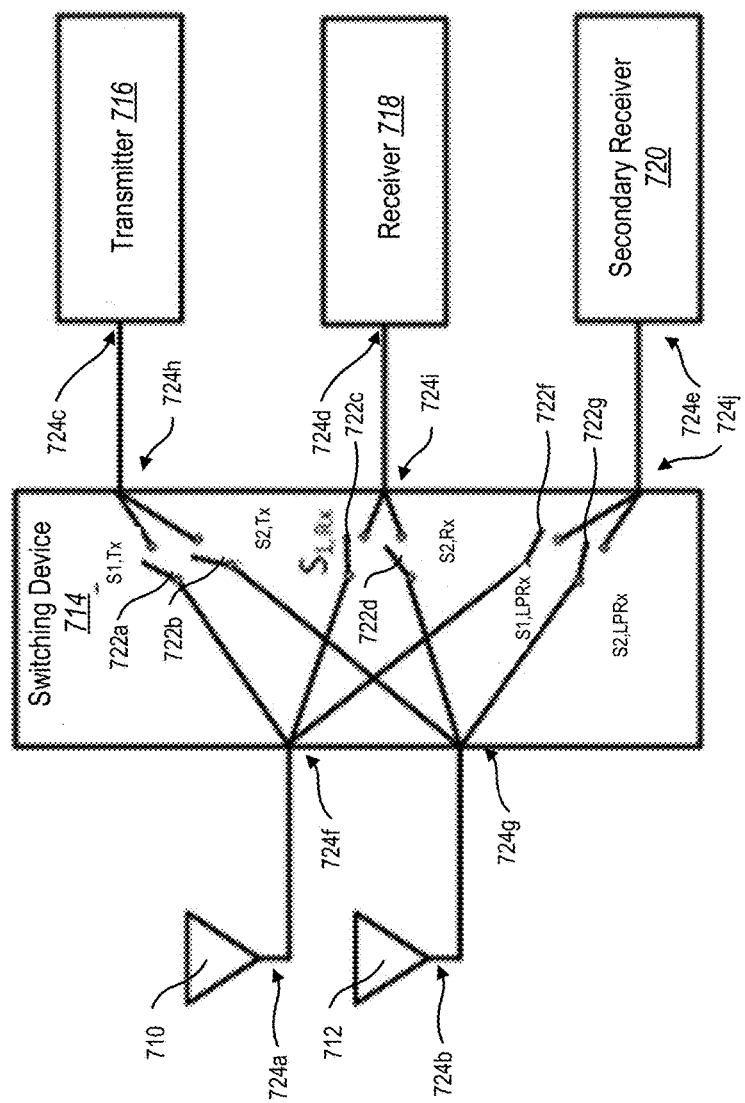
FIG. 8 illustrates an example transceiver for wireless communication that may be implemented in the data plane transceivers, the control plane transceivers, or some combination thereof of FIGS. 1-5.

FIG. 8 illustrates an example transceiver 800 for wireless communication that may be implemented in the data plane transceivers 106, the control plane transceivers 104, or some combination thereof of FIGS. 1-5, in accordance with at least one aspect described in the present disclosure.

The transceiver 800 may include a first antenna element 710 and a second antenna element 712. The first antenna element 710 may include a first terminal 724a and the second antenna element 712 may include a second terminal 724b. The transceiver 800 may also include a transmitter 716, a receiver 718, a secondary receiver 720, and a switching device 714. The transmitter 716 may include a third terminal 724c, the receiver 718 may include a fourth terminal 724d, and the secondary receiver 720 may include a fifth terminal 724e. The switching device 714 may include a sixth terminal 724f, a seventh terminal 724g, an eighth terminal 724h, a ninth terminal 724i, and a tenth terminal 724j.

The sixth terminal 724f may be electrically coupled to the first terminal 724a. The seventh terminal 724g may be electrically coupled to the second terminal 724b. The eighth terminal 724h may be electrically coupled to the third terminal 724c. The ninth terminal 724i may be electrically coupled to the fourth terminal 724d. The tenth terminal 724j may be electrically coupled to the fifth terminal 724e.

The switching device 714 may include multiple switches 722a-g. The first switch 722a may be electrically coupled between the eighth terminal 724h and the sixth terminal 724f. The second switch 722b may be electrically coupled between the eighth terminal 724h and the seventh terminal 724g. The third switch 722c may be electrically coupled between the ninth terminal 724i and the sixth terminal 724f. The fourth switch 722d may be electrically coupled between the ninth terminal 724i and the seventh terminal 724g. The fifth switch 722e may be electrically coupled between the tenth terminal 724j and the sixth terminal 724f. The sixth switch 722f may be electrically coupled between the tenth terminal 724j and the seventh terminal 724g.

The first antenna element 710 may be configured to transmit the transmit signal (e.g., the control signal or the data signal) and wirelessly receive the receive signal (e.g., the control signal or the data signal) on the first channel. The second antenna element 712 may be configured to transmit the transmit signal and wirelessly receive the receive signal on the second channel. The transmitter 716 may provide the transmit signal on the first channel or the second channel. In some aspects, the transmitter 716 may transition between the providing the transmit signal on the first channel and on the second channel. The receiver 718 may receive the receive signal on the first channel or the second channel. The secondary receiver 720 may monitor occupation of the first channel or the second channel. In some aspects, the secondary receiver 720 may monitor the first channel or the second channel without decoding at least a portion of signals on the first channel or the second channel concurrent with the receiver 718 receiving the receive signal.

The switches 722a-g may transition between an open state and a closed state to control an operational mode of the transceiver 800. For example, the switches 722a-g may transition between the open state and the closed state to control when the transmitter 716, the receiver 718, the secondary receiver 720, or some combination thereof are electrically coupled to the first antenna element 710 and the second antenna element 712.

In addition, the switches 722a-g may control when the transmitter 716 provides the transmit signal to the first antenna element 710 or the second antenna element 712 and when the transmitter 716 is electrically isolated from both the first antenna element 710 and the second antenna element 712. As another example, the switches 722a-g may control when the receiver 718 receives the receive signal from the first antenna element 710 or the second antenna element 712 and when the receiver 718 is electrically isolated from both the first antenna element 710 and the second antenna element 712. As yet another example, the switches 722a-g may control when the secondary receiver 720 monitors occupation of the first channel or the second channel or when the secondary receiver 720 is electrically isolated from both the first antenna element 710 and the second antenna element 712.

In some aspects, the switches 722a-g may control when the eighth terminal 724h is electrically coupled to the sixth terminal 724f, the eighth terminal 724h is electrically coupled to the seventh terminal 724g, and the eighth terminal 724h is electrically isolated from the first antenna element 710 and the second antenna element 712. In these and other aspects, the switches 722a-g may control when the ninth terminal 724i is electrically coupled to the sixth terminal 724f, the ninth terminal 724i is electrically coupled to the seventh terminal 724g, and the ninth terminal 724i is electrically isolated from the first antenna element 710 and the second antenna element 712. Further, the switches 722a-g may control when the tenth terminal 724j is electrically coupled to the sixth terminal 724f, the tenth terminal 724j is electrically coupled to the seventh terminal 724g, and the tenth terminal 724j is electrically isolated from the first antenna element 710 and the second antenna element 712.

Prior to operation of the transmitter 716 and the receiver 718, the secondary receiver 720 may monitor the first channel and the second channel for a wake up signal. In some aspects, the switches 722a-g may control when the tenth terminal 724j is electrically coupled to the sixth terminal 724f and the seventh terminal 724g to cause the secondary receiver 720 to monitor for the wake up signal on either the first channel or the second channel. The secondary receiver 720 monitoring for the wake up signal may permit the receiver 718 to operate according to a standby mode to reduce power consumption of the transceiver 800 when the receiver 718 is not actively receiving the receive signal.

The transceiver may wirelessly communicate signals (e.g., control signals or data signals) within the control plane, the data plane, or some combination thereof In some aspects, the transceiver may include a control plane system. In other aspects, the transceiver may include a data plane system.

The transceiver may include a first antenna element. The first antenna element may wirelessly transmit a transmit signal and wirelessly receive a receive signal on a first channel. The transceiver may also include a second antenna element. The second antenna element may wirelessly transmit the transmit signal and wirelessly receive the receive signal on a second channel. The first antenna element and the second antenna element may be tuned to separate single channel frequencies to support operation of the transceiver on two channels. The first antenna element and the second antenna element may support bandwidth of the first channel and the second channel equal to or greater than four hundred megahertz.

In some aspects, the first antenna may include a single channel antenna element. The single channel antenna element may operate on the first channel. The second antenna element may also include a single channel antenna element. The single channel antenna element may operate on the second channel. In some aspects, the transceiver may operate according to a FDD protocol.

The transmitter may provide the transmit signal on the first channel or the second channel. The receiver may receive the receive signal on the first channel or the second channel. The first channel and the second channel may include separate channels within the RF domain. Each channel may include a bandwidth that is equal to or greater than five hundred megahertz. In some aspects, the receiver may include an in-phase quadrature (I/Q) receiver.

The secondary receiver may monitor occupation of the first channel or the second channel. In some aspects, the secondary receiver may monitor the first channel or the second channel without decoding at least a portion of the signals on the first channel and the second channel. In these and other aspects, the secondary receiver may monitor the first channel or the second channel concurrent with the receiver receiving the receive signal.

The secondary receiver may monitor occupation of the first channel or the second channel by detecting energy on one of the first channel and the second channel. In some aspects, the secondary receiver may include an energy detection receiver. The secondary receiver may not be phase coherent. The secondary receiver not being phase coherent may permit a frequency synthesizer within the secondary receiver to be simplified and may reduce a signal to noise ratio (SNR) ratio of the secondary receiver. The secondary receiver may not include IQ paths.

The secondary receiver may monitor for and receive wake-up signals. In aspects in which the secondary receiver includes the energy detection receiver and the receiver is in the standby mode, the secondary receiver may detect the wake-up signals with a narrower bandwidth and lower data rate compared to wake up signals that the receiver may detect.

The secondary receiver may detect the wake up signals and may instruct the controller to cause the secondary receiver, the receiver, and the transmitter to operate according to a standard (e.g., a normal) operation mode. Due to decreased data rates and bandwidth for the wake-up signals, noise settings (e.g., SNR and noise filter settings) and other settings within the secondary receiver may be reduced compared to similar settings of the receiver. The secondary receiver detecting the wake up signals may reduce an always-listening power consumption of the transceiver compared to aspects in which the receiver monitors for the wake up signals.

The secondary receiver may monitor channel occupation of the first channel or the second channel. The secondary receiver may monitor channel occupation through energy detection mechanisms. Prior to the transmitter transmitting the transmit signal, the secondary receiver may monitor channel occupation on the first channel or the second channel. The secondary device may monitor channel occupation concurrent with the receiver receiving the receive signal. For example, the secondary device may monitor channel occupation of the second channel concurrent with the receiver receiving the receive signal on the first channel.

The switching device may include a DP3T switch interfacing between the first antenna element and the second antenna element and the transmitter, the receiver, and the secondary receiver. In some aspects, the switching device may include six switches. Each of the switches within the switching device may electrically couple one of the transmitter, the receiver, and the secondary receiver with one of the first antenna element and the second antenna element.

Each switch of the switching device may transition between an open state and a closed state. In some aspects, the switches may transition between the open state and the closed state to cause the transceiver to operate according to a particular operational mode. The operational modes may include a transmit only mode, a receive only mode, a duplex channel occupation mode, a duplex mode, and a standby mode.

In the transmit only mode, transmitter may provide the transmit signal to one of the first antenna element and the second antenna element. In addition, in the transmit only mode, the switches may electrically isolate the receiver and the secondary receiver from the first antenna element and the second antenna element. Further, in the transmit only mode, the eighth terminal may be electrically coupled to one of the sixth terminal and the seventh terminal. Likewise, in the transmit only mode, the ninth terminal and the tenth terminal may be electrically isolated from the first antenna element and the second antenna element.

In the receive only mode, the receiver may receive the receive signal from one of the first antenna element and the second antenna element. In addition, in the receive only mode, the switches may electrically isolate the transmitter and the secondary receiver from the first antenna element and the second antenna element. In addition, in the receive only mode, the ninth terminal may be electrically coupled to one of the sixth terminal and the seventh terminal. Likewise, in the receive only mode, the eighth terminal and the tenth terminal may be electrically isolated from the first antenna element and the second antenna element.

In the duplex channel occupation mode, the receiver may receive the receive signal from one of the first antenna element and the second antenna element. In addition, in the duplex channel occupation mode, the secondary receiver may monitor occupation of one of the first channel and the second channel. For example, if the receiver receives the receive signal from the first antenna element on the first channel, the secondary receiver may monitor occupation of the second channel via the second antenna element. In addition, in the duplex channel occupation mode, the switches may electrically isolate the transmitter from the first antenna element and the second antenna element.

In the duplex channel occupation mode, the ninth terminal may be electrically coupled to one of the sixth terminal and the seventh terminal. In addition, in the duplex channel occupation mode, the tenth terminal may be electrically coupled to one of the sixth terminal and the seventh terminal. Further, in the duplex channel occupation mode, the eighth terminal may be electrically isolated from the first antenna element and the second antenna element.

In the duplex mode, the receiver may receive the receive signal from one of the first antenna element and the second antenna element. In addition, in the duplex mode, the transmitter may provide the transmit signal to one of the first antenna element and the second antenna element. For example, in the duplex mode, if the receiver receives the receive signal via the first antenna element on the first channel, the transmitter may provide the transmit signal via the second antenna element on the second channel. In the duplex mode, the switches may electrically isolate the secondary receiver from the first antenna element and the second antenna element.

In the duplex mode, the ninth terminal may be electrically coupled to one of the sixth terminal and the seventh terminal. In addition, in the duplex mode, the eighth terminal may be electrically coupled to one of the sixth terminal and the seventh terminal. Further, in the duplex mode, the tenth terminal may be electrically isolated from the first antenna element and the second antenna element.

In the standby mode, the secondary receiver may monitor one of the first channel and the second channel for the wake up signal. In the standby mode, the switches may electrically isolate the receiver and the transmitter from the first antenna element and the second antenna element. In addition, in the standby mode, the tenth terminal may be electrically coupled to one of the sixth terminal and the seventh terminal. Further, in the standby mode, the eighth terminal and the ninth terminal may be electrically isolated from the first antenna element and the second antenna element. The state of the switches for the different operational modes are listed below in Table I.

TABLE I

| | $S_{1, Tx}$ | $S_{2, Tx}$ | $S_{1, Rx}$ | $S_{2, Rx}$ | $S_{1, LPRx}$ | $S_{2, LPRx}$ |
|---|---|---|---|---|---|---|
| Transmit Only Mode | On | Off | Off | Off | Off | Off |
| Receive Only Mode | Off | Off | Off | On | Off | Off |
| Standby Mode | Off | Off | Off | Off | Off | On |
| Duplex Channel Occupation Mode | Off | Off | Off | On | On | Off |
| Duplex Mode | On | Off | Off | On | Off | Off |

The states of the switches in Table 1 are based on the first channel being used for transmitting the transmit signal and the second channel being used for receiving the receive signal. In some aspects, the channels may be switched and the states of the switches may switch accordingly.

In some aspects, responsive to the secondary receiver detecting the wake up signal, the switches may transition between the open state and the closed state to cause the transceiver to operate according to one of the transmit only mode, the receive only mode, the duplex channel occupation mode, and the duplex mode.

In some aspects, the transmit only mode and the receive only mode may include half-duplex communication. In these and other aspects, the transmitter may be electrically coupled to the first antenna element and the receiver may be electrically coupled to the second antenna element.

The switching device may provide configurability (e.g., an ability to change whether the transmitter, the receiver, or the secondary receiver are electrically coupled to the first antenna element or the second antenna element) and flexibility to the transceiver despite the antenna elements including single channel antenna elements.

In some aspects, the switches may control when the transmitter provides the transmit signal to the first antenna element, when the transmitter provides the transmit signal to the second antenna element, and when the transmitter is electrically isolated from the first antenna element and the second antenna element. In these and other aspects, the switches may control when the receiver receives the receive signal from the first antenna element, when the receiver receives the receive signal from the second antenna element, and when the receiver is electrically isolated from the first antenna element and the second antenna element. In addition, in some aspects, the switches may control when the secondary receiver monitors occupation of the first channel, when the secondary receiver monitors occupation of the second channel, and when the secondary receiver is electrically isolated from the first antenna element and the second antenna element.

The switching device may include a first switch electrically coupled between the transmitter and the first antenna element. The switching device may also include a second switch electrically coupled between the transmitter and the second antenna element. In addition, the switching device may include a third switch electrically coupled between the receiver and the first antenna element. Further, the switching device may include a fourth switch electrically coupled between the receiver and the second antenna element. The switching device may include a fifth switch electrically coupled between the secondary receiver and the first antenna element. In addition, the switching device may include a sixth switch electrically coupled between the secondary receiver and the second antenna element.

In some aspects, prior to the transmitter device providing the transmit signal, the switches may transition between the open state and the closed state to cause the transceiver to operate according to the duplex channel occupation mode to permit the secondary receiver to determine if one of the first channel and the second channel are occupied. In these and other aspects, responsive to the corresponding channel not being occupied, the switches may transition between the open state and the closed state to cause the transceiver to operate according to one of the transmit only mode or the duplex mode.

In some aspects, the transceiver may support point to multi-point communication. In these and other aspects, the transceiver may support multi-point to multi-point communication.

The secondary receiver and the switching device may permit the transceiver to support full-duplex point-to-multi-point wireless communication while providing channel configuration flexibility.

In some aspects, the transceiver may include additional transmitters, receivers, or some combination thereof to permit simultaneous transmission or reception of multiple signals via the first channel and the second channel.

In some aspects, the transmitter may provide the transmit signal including an ultra-wideband data rate to permit the transceiver to operate within the control plane, the data plane, or some combination thereof. The transmitter may provide the transmit signal including a symbol rate based on a frequency of the transmit signal to maintain the ultra-wideband data rate. For example, the frequency of the transmit signal may be equal to or less than ten gigahertz and the symbol rate may be equal to or greater than five hundred megahertz. In addition, to maintain the ultra-wideband data rate and permit duplex communication, the transmitter may perform pulse shaping within the transmit signal.

Some transmitter technologies may perform pulse shaping within a digital chain. In addition, these transmitter technologies may perform pulse shaping using a clock signal that includes a frequency that is greater than the symbol rate due to oversampling settings. For example, the frequency of the clock signal may be a multiple of the symbol rate (e.g., four times greater). The clock signal and the oversampling settings may be based on operational parameters of the digital chain (e.g., a DAC, a mixer, or some combination thereof) within the transmitter. In addition, some transmitter technologies may not perform pulse shaping and may only permit half duplex communication. These transmitter technologies may increase a power consumption of the transceiver due to the frequency of the clock signal being greater than the symbol rate.

Some aspects described in the present disclosure may perform pulse shaping within the RF domain. In addition, in some aspects the transmitter may perform the pulse shaping using the clock signal with a frequency that is equal to the symbol rate. In some aspects, the transmitter may include an all-digital polar transmitter that performs direct pulse shaping in the RF domain to permit full-duplex communication. In addition, the all-digital polar transmitter may perform the direct pulse shaping based on the frequency of the clock signal being equal to the symbol rate (e.g., five hundred MHz).

In some aspects, the transmitter may include a baseband stage, a phase modulator stage, a pulse shaper and modulator stage, and an amplifier stage. The baseband stage may receive an input signal. The input signal may include a baseband symbol rate frequency (generally referred to in the present disclosure as baseband symbol rate). In addition, the baseband stage may receive a first clock signal within a first frequency. The first frequency may be equal to the baseband symbol rate. Further, the baseband stage may generate a baseband signal within the RF domain. The baseband stage may generate the baseband signal based on the first clock signal and the input signal. The baseband signal may include a symbol rate that is less than the baseband symbol rate.

The phase modulator stage may receive a second clock signal and the baseband signal. In addition, the phase modulator stage may generate a carrier signal within the RF domain. The phase modulator stage may generate the carrier signal to include a modulated phase based on the baseband signal and the second clock signal. The pulse shaper and modulator stage may receive a third clock signal, the baseband signal, and the carrier signal. In addition, the pulse shaper and modulator stage may generate a modulated signal within the RF domain. The pulse shaper and modulator stage may generate the modulated signal based on the third clock signal, the baseband signal, and the carrier signal. In addition, the pulse shaper and modulator stage may generate the modulated signal to include shaped symbols (e.g., shaped pulses) at the symbol rate so as to permit full-duplex wireless communication by the transceiver.

The amplifier stage may include a weighting scheme. For example, the amplifier stage may include multiple capacitors that include capacitive values based on the weighting scheme. The amplifier stage may receive the modulated signal. In addition, the amplifier stage may generate the transmit signal (e.g., the control signal or the data signal) within the RF domain based on the weighting scheme and the modulated signal.

At least some aspects described in the present disclosure may omit a DAC and a mixer within the transmitter. These aspects may perform both phase modulation and amplitude modulation directly on a digital signal within the RF domain.

Therefore, at least one aspect described in the present disclosure may perform pulse shaping using the clock signal with the frequency equal to the baseband symbol rate to reduce power consumption of the transmitter. In addition, at least one aspect described in the present disclosure may reduce complexity of the transmitter by eliminating a DAC, a mixer, or some combination thereof. Further, at least one aspect described in the present disclosure may provide full duplex communication while eliminating a DAC, a mixer, or some combination thereof while performing pulse shaping using the clock signal with the frequency equal to the baseband symbol rate. At least one aspect described in the present disclosure may perform pulse shaping to suppress spectrum leakage in adjacent channels to permit full-duplex communication by the transceiver.

Figure 9:
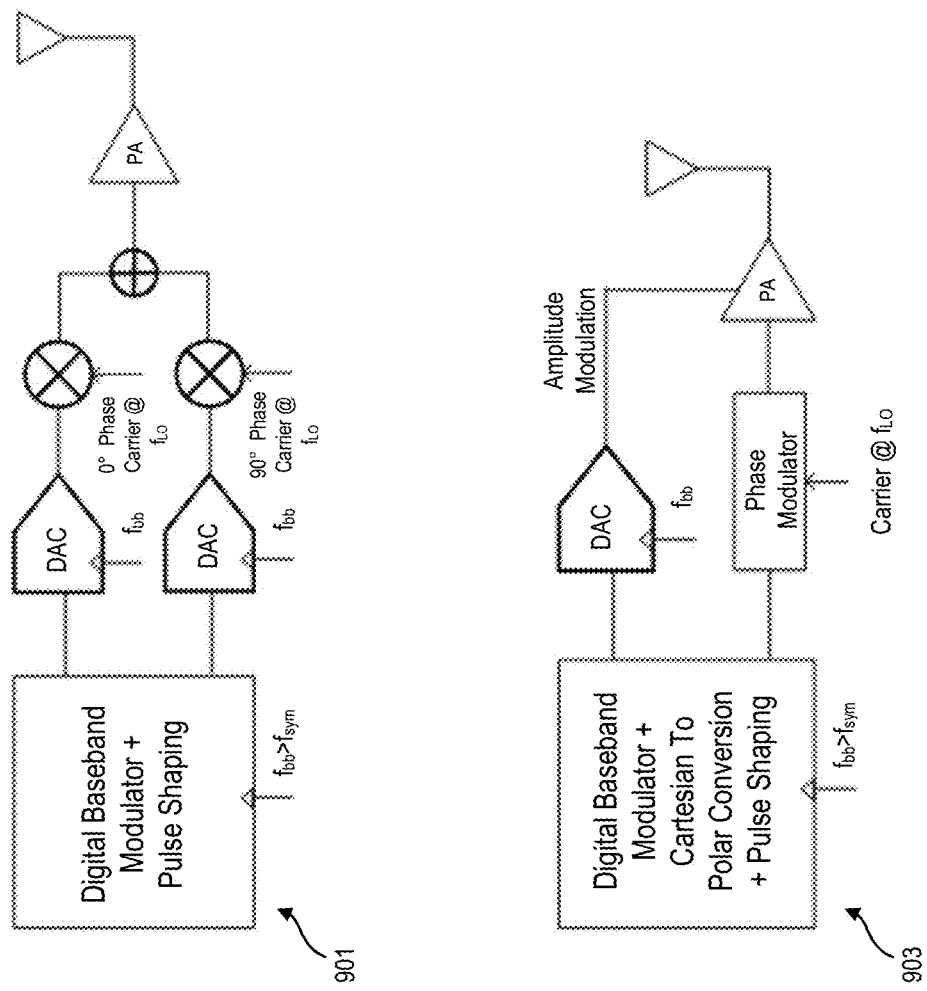
FIG. 9 illustrates an example Cartesian transmitter and an example polar transmitter.

FIG. 9 illustrates an example Cartesian transmitter 901 and an example polar transmitter 903, in accordance with at least one aspect described in the present disclosure. The Cartesian transmitter 901 may include digital baseband to perform symbol mapping and modulation. In addition, the digital baseband may perform baseband pulse shaping. A frequency of a clock signal for the digital baseband may be several times a symbol rate of the baseband signal. The frequency of the clock signal may be greater than the symbol rate of the baseband signal due to oversampling settings within the Cartesian transmitter 901. The Cartesian transmitter 901 may include one or more DACs after the digital baseband. The DACs may use the same clock signal as the digital baseband. To achieve the ultra-wideband data rate, the Cartesian transmitter 901 may consume significant power in the digital baseband as well as in the DAC due to the high frequency of the clock signal.

The polar transmitter 903 may include a digital baseband that separately performs amplitude modulation and phase modulation. In addition, the digital baseband in the polar transmitter 903 may perform Cartesian to polar conversion along with symbol mapping, symbol modulation, and symbol pulse shaping. The digital baseband in the polar transmitter 903 may operate using the same or similar clock signal ratios as the digital baseband in the Cartesian transmitter 901.

Figure 10:
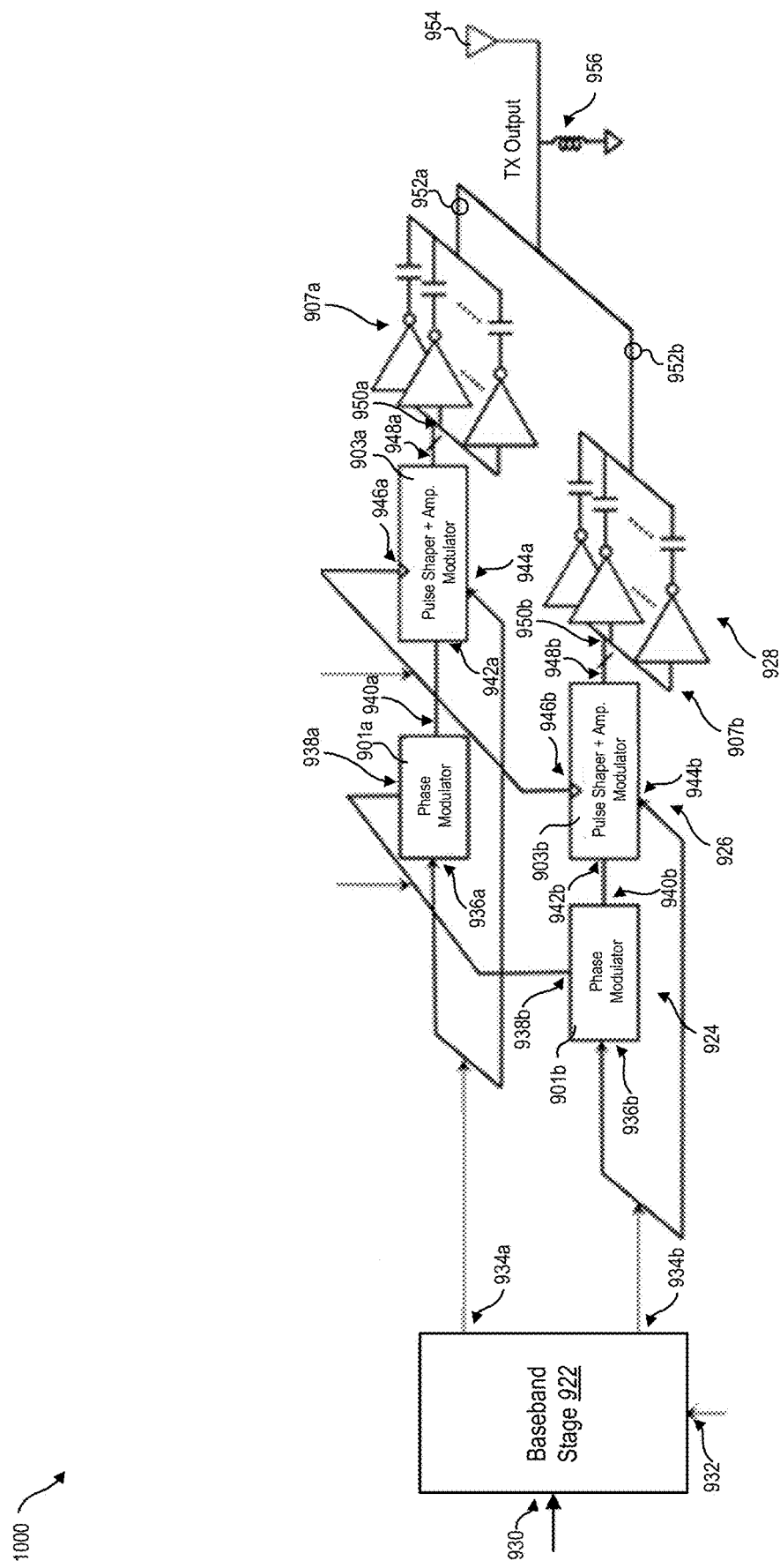
FIG. 10 illustrates an example transmitter that may be implemented in the example transceiver of FIG. 8 or the data plane transceiver, the control plane transceiver, or some combination thereof of FIGS. 1-5.

FIG. 10 illustrates an example transmitter 1000 that may be implemented in the example transceiver 716 of FIG. 8 or the data plane transceiver 106, the control plane transceiver 104, or some combination thereof of FIGS. 1-5, in accordance with at least one aspect described in the present disclosure.

The transmitter 1000 may include a baseband stage 922, a phase modulator stage 924, a pulse shaper and modulator stage 926, an amplifier stage 928, an inductor 956, and an antenna element 954. The baseband stage may include a first terminal 930, a second terminal 932, and sub-third terminals 934a-b (generally referred to in the present disclosure as third terminal 934). The phase modulator stage 924 may include an even phase modulator 936a and an odd phase modulator 936b. In addition, the phase modulator stage 924 may include sub-fourth terminals 936a-b (generally referred to in the present disclosure as fourth terminal 936), sub-fifth terminals 938a-b (generally referred to in the present disclosure as fifth terminal 938), and sub-sixth terminals 940a-b (generally referred to in the present disclosure as sixth terminal 940). The fourth terminal 936 may be electrically coupled to the third terminal 934.

The pulse shaper and modulator stage 926 may include an even pulse shaper and modulator 903a and an odd pulse shaper and modulator 903b. The pulse shaper and modulator stage 926 may include sub-seventh terminals 942a-b (generally referred to in the present disclosure as seventh terminal 942), sub-eighth terminals 944a-b (generally referred to as eighth terminal 944), sub-ninth terminals 946a-b (generally referred to in the present disclosure as ninth terminal 946), and sub-tenth terminals 948a-b (generally referred to in the present disclosure as tenth terminal 948). The seventh terminal 942 may be electrically coupled to the sixth terminal 940.

The amplifier stage 928 may include sub-eleventh terminals 950a-b (generally referred to in the present disclosure as eleventh terminal 950) electrically coupled to the tenth terminal 948. In addition, the amplifier stage 928 may be electrically coupled to sub-transmit terminals 952a-b (generally referred to in the present disclosure as transmit terminal 952). The amplifier stage 928 may include an even amplifier portion 907a and an odd amplifier portion 907b. The amplifier stage 928 may include a weighting scheme and multiple amplifier capacitor pairs. Each capacitor may include a capacitive value and the weighting scheme may include the capacitive values. Each of the amplifier capacitor pairs may be electrically coupled to the eleventh terminal 950 via a different trace. The amplifier capacitor pairs are discussed in more detail below in relation to FIG. 12.

In some aspects, the phase modulator stage 924, the pulse shaper and modulator stage 926, and the amplifier stage 928 may include an even path and an odd path. The even path may include the even phase modulator 901a, the even pulse shaper and modulator 903a, and the even amplifier portion 907a. The odd path may include the odd phase modulator 901b, the odd pulse shaper and modulator 903b, and the odd amplifier portion 907b.

The baseband stage 922 may receive, at the first terminal 930, an input signal that includes a baseband symbol rate. The baseband stage 922 may also receive, at the second terminal 932, a first clock signal. The first clock signal may include a first frequency that is equal to the baseband symbol rate. In addition, the baseband stage 922 may generate, based on the first clock signal and the input signal, a baseband signal. The baseband stage 922 may generate the baseband signal within the RF domain. The baseband stage 922 may generate the baseband signal to include a symbol rate that is less than the baseband symbol rate.

The phase modulator stage 924 may receive, at the fifth terminal 938, a second clock signal. The phase modulator stage 924 may also receive, at the fourth terminal 936, the baseband signal. In addition, the phase modulator stage 924 may generate a carrier signal. The phase modulator stage 924 may generate the carrier signal within the RF domain. The phase modulator stage 924 may generate the carrier signal to include a modulated phase based on the baseband signal and the second clock signal.

The pulse shaper and modulator stage 926 may receive, at the ninth terminal 946, a third clock signal. The pulse shaper and modulator stage 926 may also receive, at the eighth terminal 944, the baseband signal. In addition, the pulse shaper and modulator stage 926 may receive, at the seventh terminal 942, the carrier signal. The pulse shaper and modulator stage 926 may generate, based on the third clock signal; the baseband signal; and the carrier signal, a modulated signal. The pulse shaper and modulator stage 926 may generate the modulated signal within the RF domain. The pulse shaper and modulator stage 926 may generate the modulated signal to include shaped symbols at the symbol rate. The shaped symbols at the symbol rate may permit full-duplex wireless communication by the transceiver 1000 within the control plane, the data plane, or some combination thereof.

The amplifier stage 928 may receive, at the eleventh terminal 950, the modulated signal. In addition, the amplifier stage 928 may generate a signal (e.g., the control signal or the data signal) within the RF domain. The amplifier stage 928 may generate the signal based on the weighting scheme and the modulated signal. The antenna element 954 may receive, via the transmit terminal 952, the signal and may wirelessly transmit the signal as the transmit signal.

In some aspects, the baseband signal may include even symbols and odd symbols. The even phase modulator 901a (e.g., the even path) may receive the even symbols. The even phase modulator 901a may generate an even carrier signal based on the even symbols and the second clock signal. The odd phase modulator 901b (e.g., the odd path) may receive the odd symbols. The odd phase modulator 901b may generate an odd carrier signal based on the odd symbols and the second clock signal. In some aspects, the carrier signal may include the even carrier signal, the odd carrier signal, or some combination thereof.

The even pulse shaper and modulator 903a may receive the even carrier signal, the even symbols, and the third clock signal. The even pulse shaper and modulator 903a may generate an even modulated signal based on the even symbols, the even carrier signal, and the third clock signal. The odd pulse shaper and modulator 903b may receive the odd carrier signal, the odd symbols, and the third clock signal. The odd pulse shaper and modulator 903b may generate an odd modulated signal based on the odd symbols, the odd carrier signal, and the third clock signal. In some aspects, the modulated signal may include the even modulated signal, the odd modulated signal, or some combination thereof The even amplifier portion 907a may receive the even modulated signal. The even amplifier portion 907a may generate an even signal based on the even modulated signal and the weighting scheme of the even amplifier portion 907a. The odd amplifier portion 907b may receive the odd modulated signal. The odd amplifier portion 907b may generate an odd signal based on the odd modulated signal and the weighting scheme of the odd amplifier portion 907b. In some aspects, the signal may include the even signal, the odd signal, or some combination thereof. In these and other aspects, the even signal and the odd signal may be summed at the transmit terminal 952.

Figure 11:
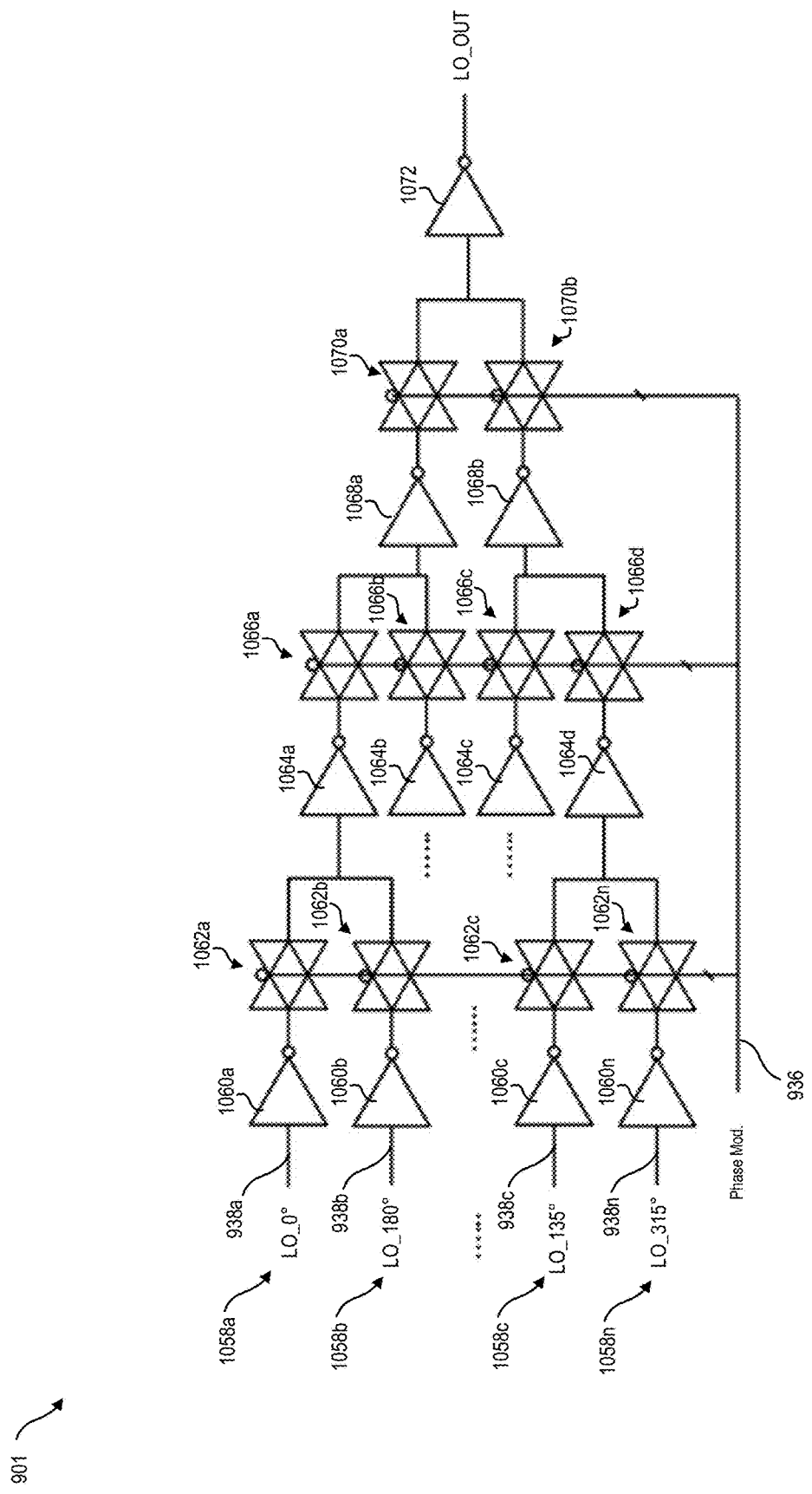
FIG. 11 illustrates an example phase modulator that may be implemented in the example transmitter of FIG. 10.

FIG. 11 illustrates an example phase modulator 901 that may be implemented in the example transmitter 1000 of FIG. 10, in accordance with at least one aspect described in the present disclosure. The phase modulator 901 may include oscillator terminals 1058a-n, first stage buffers 1060a-n, first stage transmission gates 1062a-n, second stage buffers 1064a-d, second stage transmission gates 1066a-d, third stage buffers 1068a-b, third stage transmission gates 1070a-b, and an output buffer 1072. In addition, the fifth terminal 938 may include sub-fifth terminals 938a-n. In some aspects, a local oscillator (not illustrated) may be electrically coupled to each of the oscillator terminals 1058a-n.

The local oscillator may provide the second clock signal as multiple complementary phase signals within the second frequency. Each of the different complementary phase signals may be provided on a different oscillator terminal 1058a-n. The phase modulator 901 may operate as a multiplexer to multiplex the complementary phase signals based on the baseband signal.

As indicated by the ellipsis and the Nth first stage buffer 1060n and the Nth first stage transmission gate 1062n in FIG. 11, the phase modulator 901 may include any appropriate number of first stage buffers 1060 and first stage transmission gates 1062. In some aspects, each subsequent stage may include a number of buffers and transmission gates equal to a number of buffers and transmission gates in the previous stage divided by two. For example, the second stage buffers 1064a-d may include four buffers if the first stage buffers 1060a-n include eight first stage buffers 1060a-n.

In some aspects, each of the first stage buffers 1060a-n may generate a first buffered signals based on the corresponding complementary phase signal. Each of the first stage transmission gates 1062a-n may generate a first transmission signal based on the corresponding first buffered signal and the baseband signal. Each pair of the first transmission signals may be summed together at the outputs of the first stage transmission gates 1062a-n to generate multiple first stage combined signals.

Each of the second stage buffers 1064a-d may generate a second buffered signal based on the corresponding first stage combined signal. Each of the second stage transmission gates 1066a-d may generate a second transmission signal based on the corresponding second buffered signal and the baseband signal. Each pair of the second transmission signals may be summed together at the outputs of the second stage transmission gates 1066a-d to generate multiple second stage combined signals.

Each of the third stage buffers 1068a-b may generate a third buffered signal based on the corresponding second stage combined signal. Each of the third stage transmission gates 1066a-b may generate a third transmission signal based on the corresponding third buffered signal and the baseband signal. Each pair of the third transmission signals may be summed together at the outputs of the third stage transmission gates 1070a-b to generate a third stage combined signal. The output buffer 1072 may generate the carrier signal (e.g., the even carrier signal or the odd carrier signal) based on the third stage combined signal.

Figure 12:
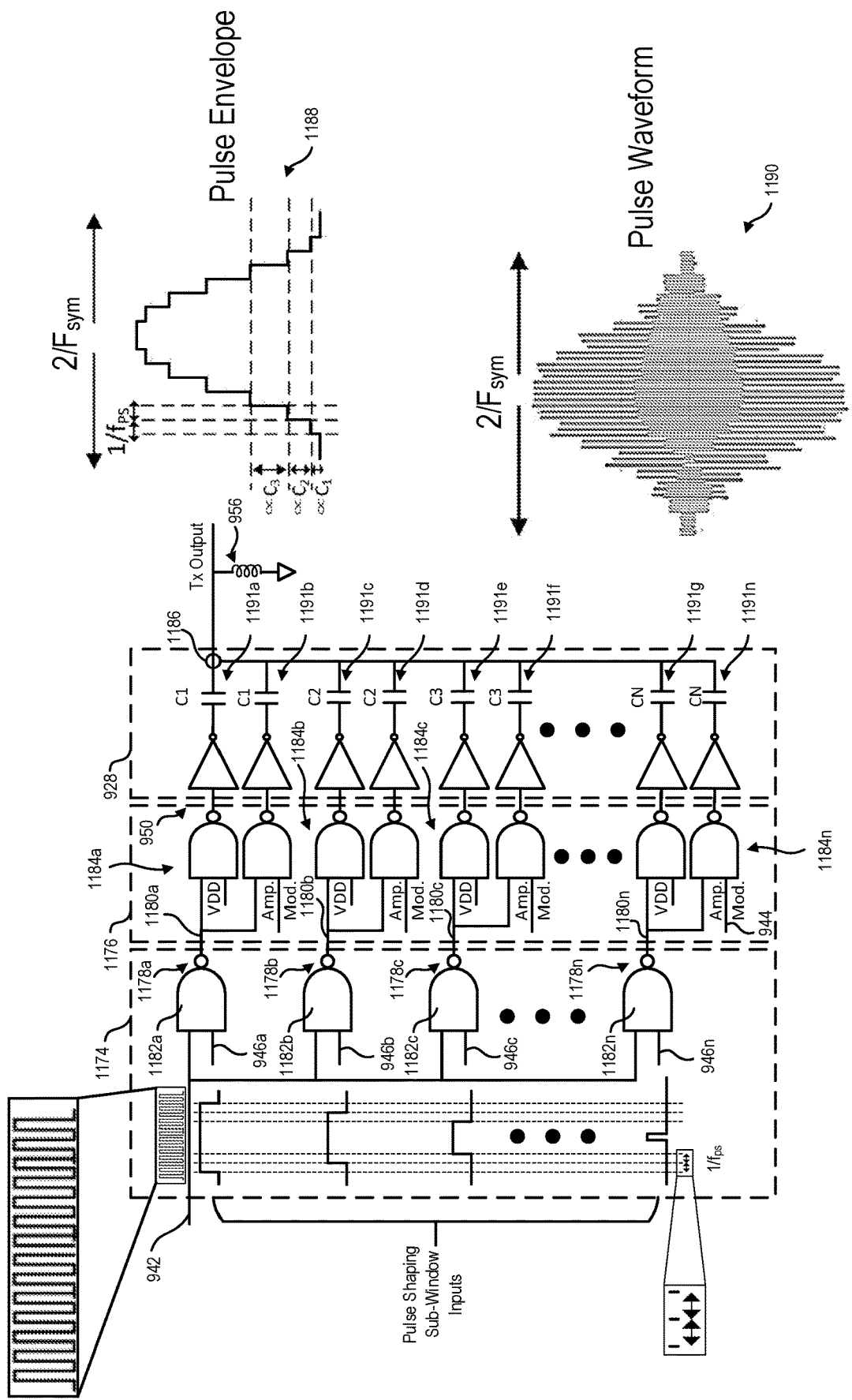
FIG. 12 illustrates an example pulse shaper stage, an example modulator stage, and an example amplifier stage that may be implemented in the example transmitter of FIG. 10.

FIG. 12 illustrates an example pulse shaper stage 1174, an example modulator stage 1176, and an example amplifier stage 928 that may be implemented in the example transmitter 1000 of FIG. 10, in accordance with at least one aspect described in the present disclosure.

The example pulse shaper stage 1174 may include digital gates 1182a-n. Each of the digital gates 1182a-n may be electrically coupled to the seventh terminal 942 and a different sub-ninth terminal 946a-n. As indicated by the ellipsis and the Nth digital gate 1182n in FIG. 12, the pulse shaper stage 1174 may include any appropriate number of digital gates 1182a-n and corresponding number of sub-ninth terminals 946a-n. The pulse shaper stage 1174 may also include sub-twelfth terminals 1178a-n (generally referred to in the present disclosure as twelfth terminal 1178).

The modulator stage 1176 may include gate pairs 1184a-n and sub-thirteenth terminals 1180a-n (generally referred to in the present disclosure as thirteenth terminal 1180). As indicated by the ellipsis and the Nth gate pair 1184n in FIG. 12, the modulator stage 1176 may include any appropriate number of gate pairs 1184a-n and corresponding number of sub-thirteenth terminals 1180a-n. The thirteenth terminal 1180 may be electrically coupled to the twelfth terminal 1178. Each of the gate pairs 1184a-n may be electrically coupled to the eighth terminal 944 and a different sub-thirteenth terminal 1180a-n. A single instance of the eighth terminal 944 is numbered in FIG. 12 for ease of illustration.

The amplifier stage 928 may include amplifier capacitor pairs 1191a-n. Each of the amplifier capacitor pairs 1191a-n may be electrically coupled to a different sub-eleventh terminal 950. As indicated by the ellipsis and the Nth amplifier capacitor pair 1191n in FIG. 12, the amplifier stage 928 may include any appropriate number of amplifier capacitor pairs 1191a-n. A single instance of the sub-eleventh terminal 950 is numbered in FIG. 12 for ease of illustration.

The digital gates 1182a-n may receive, via a corresponding sub-ninth terminal 946a-n, the third clock signal. In some aspects, the third clock signal may include sub-window signals and each of the digital gates 1182a-n may receive a different sub-window signal. The digital gates 1182a-n may receive, at the seventh terminal 942, the carrier signal. The digital gates 1182a-n may gate the carrier signal with the corresponding sub-window signal to generate sub-shaped signals within the RF domain. Each of the sub-shaped signals may include the shaped symbols at the symbol rate. The shaped signal may include the sub-shaped signals.

The gate pairs 1184a-n may receive, via a corresponding sub-thirteenth terminal 1180a-n, a corresponding sub-shaped signal. The gate pairs 1184a-n may also receive, at the eighth terminal 944, the baseband signal. In addition, the gate pairs 1184a-n may gate the corresponding sub-shaped signal with the baseband signal and gate the corresponding sub-shaped signal with a ground reference. The gate pairs 1184a-n may generate multiple sub-modulated signals within the RF domain based on the gating of the corresponding sub-shaped signal, the baseband signal, and the ground reference. The sub-modulated signals may include the shaped symbols at the symbol rate. In addition the modulated signal may include the sub-modulated signals.

Each of the amplifier capacitor pairs 1191a-n may receive, via a corresponding sub-eleventh terminal 950, a corresponding sub-modulated signal. Each of the amplifier capacitor pairs 1191a-n may also amplify an amplitude of the corresponding sub-modulated signal. In addition, each of the amplifier capacitor pairs 1191a-n may generate a sub-signal within the RF domain. Each of the amplifier capacitor pairs 1191a-n may generate the corresponding sub-signal based on a corresponding amplified sub-modulated signal. The signal may include a sum of the sub-signals generated by the amplifier capacitor pairs 1191a-n.

Figure 13:
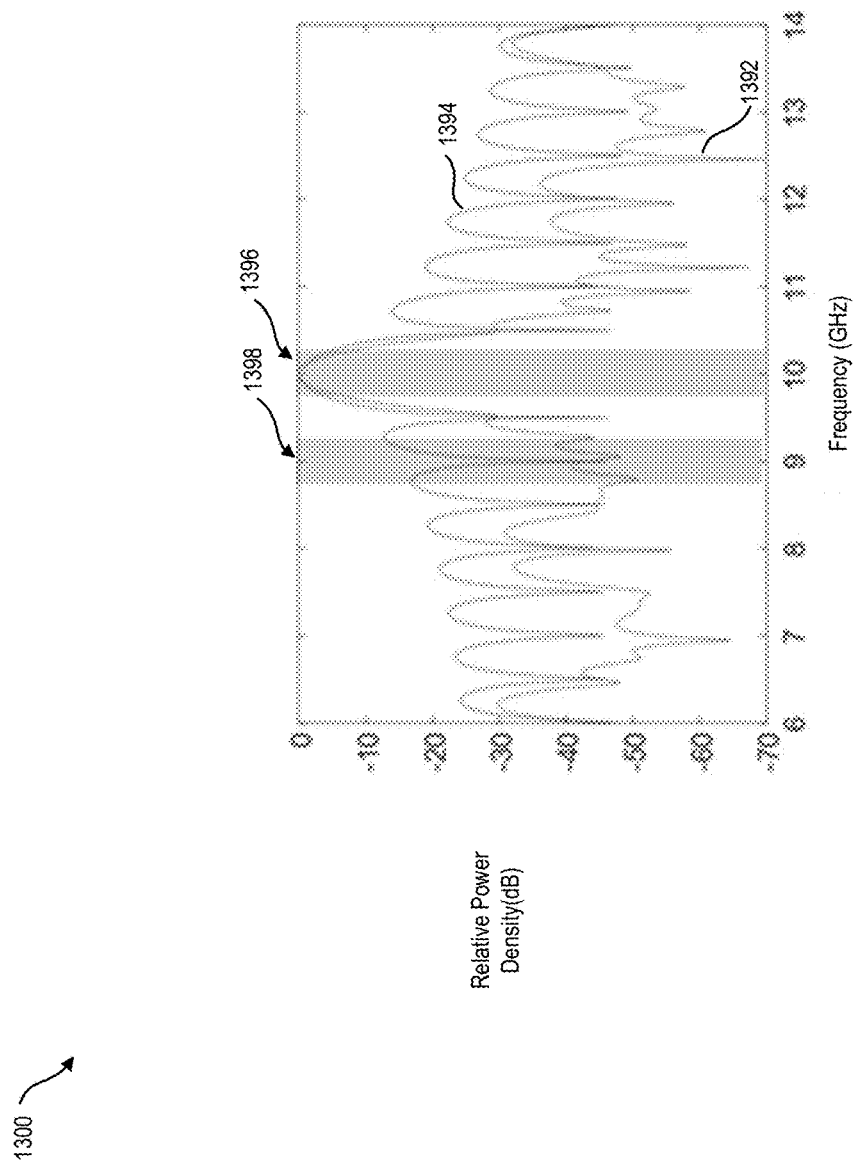
FIG. 13 illustrates a graphical representation of a simulation of output power of transmitted signals with and without pulse shaping.

FIG. 13 illustrates a graphical representation 1300 of a simulation of output power of transmitted signals with and without pulse shaping, in accordance with at least one aspect described in the present disclosure. Curve 1292 represents output power of the transmit signal with pulse shaping in accordance with at least aspect described in the present disclosure. Curve 1294 represents the output power of a transmitted signal without pulse shaping. Rectangle 1396 represents a transmit channel frequency band (e.g., ten GHz) and rectangle 1398 represents a receive channel frequency band (e.g., nine GHz). In addition, the transmit channel frequency band and the receive channel frequency band each include a channel bandwidth of five hundred MHz.

As illustrated in FIG. 13, the output power of the transmitted signal without pulse shaping (e.g., curve 1394) within the receive channel frequency band is roughly −15 dB. Also, as illustrated in FIG. 13, the output power of the transmitted signal with pulse shaping (e.g., curve 1392) within the receive channel frequency band is roughly −40 dB. If transmit and receive isolation within a transceiver is equal to forty dB, the spectral leakage of the transmitted signal without pulse shaping will be −55 dB, which may desensitize the receiver. In addition, if the transmit and receive isolation within a transceiver is equal to forty dB, the spectral leakage of the transmitted signal with pulse shaping will be −80 dB, which may not desensitize the receiver.

The transmitter may include a polar transmitter architecture. In some aspects, the transmitter may perform both phase modulation and amplitude modulation on signals. However, the transmitter may not include a DAC, a mixer, or some combination thereof. In addition, the transmitter may perform pulse shaping using a clock signal that includes a frequency equal to a symbol rate of an input signal. The transmitter may include a simpler architecture and reduced power consumption compared to a transmitter that performs pulse shaping using a clock signal that includes a frequency greater than the symbol rate of the input signal.

The transmitter may include a baseband stage. The baseband stage may receive an input signal that includes a baseband symbol rate. The baseband stage may also receive a first clock signal within a first frequency that is equal to the baseband symbol rate. The baseband stage may modulate a carrier signal directly in the RF domain. The baseband stage may generate, based on the first clock signal and the input signal, a baseband signal within the RF domain. The baseband signal may include a symbol rate that is less than the baseband symbol rate.

The transmitter may include a phase modulator stage. The phase modulator stage may receive a second clock signal and the baseband signal. In addition, the phase modulator stage may generate a carrier signal within the RF domain. The phase modulator stage may generate the carrier signal to include a modulated phase based on the baseband signal and the second clock signal.

In some aspects, the phase modulator stage may be electrically coupled to a local oscillator. The local oscillator may provide the second clock signal as multiple complementary phase signals. In some aspects, the local oscillator may include a four stage ring oscillator. The phase modulator stage may include a multiplexer to multiplex the complementary phase signals with the baseband signal. In some aspects, the phase modulator stage may generate the carrier signal with a resolution of three or fewer bits. In these and other aspects, the phase modulator stage may support a data rate between 0.5 gigabits per second and 1.5 gigabits per second.

The second clock signal may include a second frequency that is different than the first frequency. The local oscillator may generate the second clock signal as multiple complementary phase signals within the second frequency. In addition, the phase modulator may multiplex the complementary phase signals based on the baseband signal. In some aspects, the complementary phase signals may include eight sets of complementary phase signals. In some aspects, the local oscillator may include a multiple stage ring oscillator.

The transmitter may include a pulse shaper and modulator stage. The pulse shaper and modulator stage may receive a third clock signal, the baseband signal, and the carrier signal. The pulse shaper and modulator stage may also generate a modulated signal within the RF domain. The phase modulator stage may generate the modulated signal to include a modulated phase based on the baseband signal and the second clock signal. The phase modulator stage may perform direct-RF pulse shaping of the carrier signal to generate the modulated signal. The pulse shaper and modulator stage may generate the modulated signal within the RF domain to include shaped symbols at the symbol rate frequency so as to permit full-duplex wireless communication by the transceiver within the control plane, the data plane, or some combination thereof.

In some aspects, the pulse shaper and modulator stage may perform pulse shaping of the modulated signal to support full-duplex wireless communication by the transceiver. For example, if the transmit channel frequency is ten GHz and the receiver channel frequency is nine GHz, each band including a five hundred MHz channel bandwidth, an output power of the transmit signal within the receive channel frequency may be high enough to desensitize the receiver within the transceiver if no pulse shaping is performed. However, if the pulse shaper and modulator stage performs pulse shaping, the output power of the transmit signal within the receive channel frequency may be significantly reduced. In some aspects, the pulse shaper may perform pulse shaping by expanding a duration of the symbols (e.g., pulses) from one symbol duration (e.g., 1/fsym) to two symbols durations (e.g., 2/fsym). In addition the pulse shaper may cause an envelope of the symbols to roughly follow a bell shape.

In some aspects, the pulse shaper and modulator stage may perform direct-RF pulse shaping of the modulated signal in the RF domain. In these and other aspects, the pulse shaper and modulator may shape the symbols of the modulated signal within the RF domain.

In some aspects, the pulse shaper and modulator stage may perform a one bit amplitude modulation on each of the gated signals. The one bit amplitude modulation may increase a total resolution of the gated signals from three bits to four bits. In some aspects, the pulse shaper and modulator stage in combination with the phase modulator stage may support a data rate up to roughly two gigabits per second when the symbol rate is equal to five hundred MHz.

In some aspects, the pulse shaper and modulator stage may include a pulse shaper stage and a modulator stage. The pulse shaper stage may receive the third clock signal and the carrier signal. In addition, the pulse shaper stage may generate, based on the third clock signal and the carrier signal, a shaped signal within the RF domain. The pulse shaper stage may generate the shaped symbol to include the shaped symbols at the symbol rate.

The third clock signal may include multiple sub-window signals. The pulse shaper stage may include multiple digital gates. Each of the digital gates may receive a corresponding sub-window signal and the carrier signal. In addition, each of the digital gates may gate the carrier signal with the corresponding sub-window signal. Each of the digital gates may generate sub-shaped signals within the RF domain. In some aspects, the shaped signal may include the sub-shaped signals.

The third clock signal may include a third frequency and the sub-window signals may include a timing resolution of one divided by the third frequency. In some aspects, a duty cycle (e.g., a duration) of each sub-window signal may be reduced a step size equal to two divided by the third frequency such that the duty cycle of each sub-window signal is reduced compared to the duty cycle of a previous sub-window signal. In some aspects, the duty cycle of a first sub-window signal may be equal to one hundred twenty eight divided by the third frequency and the duty cycle of a last sub-window signal may be equal to one divided by the third frequency.

In some aspects, the third clock signal source may include an eight bit Johnson counter followed by OR gates to perform OR operations on outputs of the eight bit Johnson counter. The OR gates may perform the OR operations in a pre-defined sequence to generate the third clock signal to include the multiple sub-window signals that include pulses of varying durations. A timing and duration of the pulses may be determined based on the pre-defined settings. In some aspects, a timing resolution of the sub-window signals may be equal to one over the frequency of the pulse shaping clock. In addition, the duration of the sub-window signals may follow an arithmetic progression. For example, both edges of a subsequent sub-window signal may be reduced by one over the frequency of the pulse clock until the duration of a final sub-window signal is equal to either one over the frequency of the pulse clock or two over the frequency of the pulse clock.

The modulator stage may receive the shaped signal and the baseband signal. In addition, the modulator stage may generate, based on the shaped signal and the baseband signal, the modulated signal within the RF domain. The modulator stage may generate the modulated signal to include the shaped symbols at the symbol rate.

In some aspects, the modulator stage may include multiple gate pairs. Each of the gate pairs may receive a corresponding sub-shaped signal and the baseband signal. In addition, each of the gate pairs may gate the corresponding sub-shaped signal with the baseband signal and may gate the corresponding sub-shaped signal with a ground reference. The gate pairs may cause the modulated signal to include multiple sub-modulated signals within the RF domain. In some aspects, an envelope of the shaped symbols of the modulated signal may include a bell shaped envelope extending two or more symbol periods.

The transmitter may include an amplifier stage that includes a weighting scheme. The amplifier stage may receive the modulated signal. In addition, the amplifier stage may generate the signal within the RF domain. The amplifier stage may generate the signal based on the weighting scheme and the modulated signal.

The amplifier stage may include multiple amplifier capacitor pairs. A capacitive value of each of the amplifier capacitor pairs may determine the weighting scheme. Each amplifier capacitor pair may receive a corresponding sub-modulated signal. Each amplifier capacitor pair may also amplify an amplitude of the corresponding sub-modulated signal. In addition, each amplifier capacitor pair may generate a sub-signal within the RF domain. Each amplifier capacitor pair may generate the corresponding sub-signal based on a corresponding amplified sub-modulated signal. The signal may be equal to a sum of the sub-signals generated by the amplifier capacitor pairs.

In some aspects, the sub-signals may be summed at an output terminal (e.g., a weighted summing node). The weighting scheme may be based on pre-defined settings of the amplifier stage. For example, the pre-defined settings may be based on an application of the transceiver. The signal received by the antenna element may include shaped symbols that resemble a bell shape and span two symbol periods.

In some aspects, due to the pulse duration being expanded to two symbol periods, the transmitter may include an even path and an odd path. The even path and the odd path may concurrently operate to process even symbols and odd symbols within the baseband signal to double a throughput of the transmitter. In some aspects, the even path may process the even symbols of the baseband signal and the odd path may process the odd symbols of the baseband signal.

In some aspects, the even path may generate an even carrier signal based on the even symbols and the second clock signal. In these and other aspects, the odd path may generate an odd carrier signal based on the odd symbols and the second clock signal. The carrier signal may include the even carrier signal and the odd carrier signal.

The even path may generate, based on the third clock signal; the even symbols; and the even carrier signal, an even modulated signal. The odd path may generate, based on the third clock signal; the odd symbols; and the odd carrier signal, an odd modulated signal. In some aspects, the modulated signal may include the even modulated signal and the odd modulated signal.

In some aspects, the pulse envelope of the even symbols may overlap the pulse envelope of the odd symbols by a single symbol duration.

In some aspects, the transmitter may support at least one of a binary phase shift keying scheme, a quadrature phase shift keying scheme, an eight phase shift keying scheme, and a sixteen phase shift keying scheme. In these and other aspects, the baseband symbol rate frequency may include five hundred megahertz.

A transceiver may include a transmitter that includes a baseband stage, a phase modulator stage, a pulse shaper and modulator stage, and an amplifier stage. The baseband stage may include a first terminal, a second terminal, and a third terminal. In addition, the baseband stage may receive, at the first terminal, an input signal that includes a baseband symbol rate. The baseband stage may also receive, at the second terminal, a first clock signal within a first frequency. In some aspects, the first frequency may be equal to the baseband symbol rate frequency. In addition, the baseband stage may generate, based on the first clock signal and the input signal, a baseband signal within a RF domain. The baseband signal may include a symbol rate that is less than the baseband symbol rate.

The phase modulator stage may include a fourth terminal electrically coupled to the third terminal, a fifth terminal, and a sixth terminal. The phase modulator stage may receive, at the fifth terminal, a second clock signal. The phase modulator stage may also receive, at the fourth terminal, the baseband signal. In addition, the phase modulator stage may generate a carrier signal within the RF domain. The carrier signal may include a modulated phase based on the baseband signal and the second clock signal.

The second clock signal may include a second frequency that is different than the first frequency. The fifth terminal may include multiple sub-fifth terminals. The transceiver may also include a local oscillator. The local oscillator may include multiple oscillator terminals. Each oscillator terminal may be electrically coupled to a different sub-fifth terminal. The local oscillator may generate the second clock signal as multiple complementary phase signals within the second frequency. the local oscillator may provide each of the complementary phase signals on a different oscillator terminal. The phase modulator stage may receive, via the sub-fifth terminals, the complementary phase signals. The phase modulator stage may also multiplex the complementary phase signals based on the baseband signal.

The pulse shaper and modulator stage may include a seventh terminal electrically coupled to the sixth terminal, an eighth terminal electrically coupled to the fourth terminal, a ninth terminal, and a tenth terminal. The pulse shaper and modulator stage may receive, at the ninth terminal, a third clock signal. The pulse shaper and modulator stage may also receive, at the eighth terminal, the baseband signal. In addition, the pulse shaper and modulator stage may receive, at the seventh terminal, the carrier signal. Further, the pulse shaper and modulator stage may generate, based on the third clock signal; the baseband signal; and the carrier signal, a modulated signal within the RF domain. The modulated signal may include shaped symbols at the symbol rate so as to permit full-duplex wireless communication by the transceiver.

The pulse shaper and modulator stage may include a pulse shaper stage and a modulator stage. The pulse shaper stage may include the seventh terminal, the ninth terminal, and a twelfth terminal. The pulse shaper stage may receive, at the ninth terminal, the third clock signal. The pulse shaper stage may also receive, at the seventh terminal, the carrier signal. In addition, the pulse shaper stage may generate, based on the third clock signal and the carrier signal, a shaped signal within the RF domain. The shaped signal may include the shaped symbols at the symbol rate.

The third clock signal may include multiple sub-window signals. The pulse shaper stage may include multiple digital gates. In addition, the ninth terminal may include multiple sub-ninth terminals. Each of the digital gates may be electrically coupled to the seventh terminal and a different sub-ninth terminal. Each digital gate may receive, via a corresponding sub-ninth terminal, a corresponding sub-window signal. Each digital gate may also receive, via the seventh terminal, the carrier signal. In addition, each digital gate may gate the carrier signal with the corresponding sub-window signal to generate sub-shaped signals within the RF domain. The shaped signal may include the sub-shaped signals.

The modulator stage may include the eight terminal and a thirteenth terminal electrically coupled to the twelfth terminal. The modulator stage may receive, at the thirteenth terminal, the shaped signal. The modulator stage may also receive, at the eighth terminal, the baseband signal. In addition, the modulator stage may generate, based on the shaped signal and the baseband signal, the modulated signal within the RF domain. The modulated signal may include the shaped symbols at the symbol rate.

The modulator stage may include multiple gate pairs. The thirteenth terminal may include sub-thirteenth terminals. Each gate pair may be electrically coupled to the eighth terminal and a different sub-thirteenth terminal. Each gate pair may receive, via a corresponding sub-thirteenth terminal, a corresponding sub-shaped signal. Each gate pair may also receive, via the eighth terminal, the baseband signal. In addition, each gate pair may gate the corresponding sub-shaped signal with the baseband signal. Further, each gate pair may gate the corresponding sub-shaped signal with a ground reference to cause the modulated signal to include multiple sub-modulated signals within the RF domain.

The amplifier stage may include a weighting scheme and an eleventh terminal electrically coupled to the tenth terminal. The amplifier stage may receive, at the eleventh terminal, the modulated signal. The amplifier stage may also generate a signal within the RF domain based on the weighting scheme and the modulated signal.

The amplifier stage may include multiple amplifier capacitor pairs. A capacitive value of each of the amplifier capacitor pairs may include the weighting scheme. The eleventh terminal may include multiple sub-eleventh terminals. Each amplifier capacitor pair may be electrically coupled to a different sub-eleventh terminal. Each amplifier capacitor pair may receive, via a corresponding sub-eleventh terminal, a corresponding sub-modulated signal. Each amplifier capacitor pair may also amplify an amplitude of the corresponding sub-modulated signal. In addition, each amplifier capacitor pair may generate a sub-signal within the RF domain. The amplifier capacitor pairs may generate the sub-signals based on the amplified corresponding sub-modulated signal. The signal may include a sum of the sub-signals generated by the amplifier capacitor pairs.

The baseband signal may include even symbols and odd symbols. The fourth terminal may include a first sub-terminal and a second sub-terminal. The phase modulator stage, the pulse shaper and modulator stage, and the amplifier stage may include an even path and an odd path. The even path may be electrically coupled to the first sub-terminal and the odd path may be electrically coupled to the second sub-terminal.

The even path may receive, via the first sub-terminal, the baseband signal including the even symbols. The even path may also generate an even carrier signal based on the even symbols and the second clock signal. In addition, the even path may generate, based on the third clock signal, the even symbols, and the even carrier signal, an even modulated signal.

The odd path may receive, via the second sub-terminal, the baseband signal including the odd symbols. The odd path may also generate an odd carrier signal based on the odd symbols and the second clock signal. In addition, the odd path may generate an odd carrier signal based on the odd symbols and the second clock signal.

The carrier signal may include the even carrier signal and the odd carrier signal. The modulated signal may include the even modulated signal and the odd modulated signal.

A transceiver may include a receiver that operates on one or more channels within a frequency domain. Environmental conditions and other aspects of a channel may change over time. For example, I/Q imbalances, frequency offsets, timing mismatches, phase shifts, or other channel issues may occur. The transceiver may periodically perform a calibration procedure for the channel to compensate for the changes. For example, the transceiver may perform the calibration procedure when the receiver transitions to an on state from an off state or a low power state (generally referred to in the present disclosure as the low power state). In addition, the transceiver may periodically perform the calibration procedure during operation to maintain a particular level of reliability. The calibration procedure may reduce a bit error rate (BER) of the transceiver using the channel.

The transceiver may consume bandwidth of the channel and increase latency to perform the calibration procedure. Some transceiver technologies may increase power consumption of the transceiver to reduce the latency. For example, as an amount of time the receiver is in the low power state increases, an amount of time to perform the calibration procedure also increases proportionally, which may increase the latency.

Some transceiver technologies may perform the calibration procedure using the receiver and a training sequence to determine coefficients for a channel equalizer within the receiver. These and other transceiver technologies may perform power save polling, unscheduled automatic power save delivery, target wake time, or some combination of these operations to reduce power consumption of the transceiver. However these transceiver technologies may not reduce the latency. Further, these transceiver technologies may prevent the receiver from operating during the calibration procedure, which may reduce throughput.

At least one transceiver described in the present disclosure may reduce power consumption and latency to perform the calibration procedure. The transceiver may include a main receiver device (e.g., the receiver, referred to in the present disclosure as the main receiver) and a secondary receiver device (referred to in the present disclosure as the secondary receiver). The secondary receiver may perform various procedures related to the calibration procedure while the main receiver is in the low power state. When the main receiver exits the low power state, the secondary receiver may provide information related to the calibration procedure to the main receiver. The main receiver may use the information related to the calibration procedure to shorten a period of time for the main receiver to be ready to operate.

The secondary receiver may include a low power receiver that operates at a lower bandwidth but on the same channel as the main receiver. The secondary receiver may determine coarse channel state information (CSI) of the channel (e.g., the information related to the calibration procedure) while the main receiver is in the lower power state. Upon exiting the low power state, the receiver may use the coarse CSI to perform a shortened version of the calibration procedure. In some aspects, the secondary receiver may perform the calibration procedure using training sequences to determine a channel quality coefficients for a channel equalizer within the main receiver.

In some aspects, the transceiver may include the main receiver and the secondary receiver. The secondary receiver may receive a beacon signal on the channel. The beacon signal may include sample pairs. Each of the sample pairs may include out of phase pre-defined channel samples. The secondary receiver may also determine a ratio and a sign of amplitudes of each of the out of phase pre-defined channel samples. In addition, the secondary receiver may determine the CSI of the channel based on the ratio and the sign of the amplitudes of the out of phase pre-defined channel samples. The main receiver may receive a signal on the channel. In addition, the main receiver may recover the signal based on the CSI.

Some aspects described in the present disclosure, may reduce power consumption of the receiver while maintaining reliable communication over a channel. In addition, some aspects described in the present disclosure may permit the main receiver to determine fine CSI more quickly than if that main receiver alone performed the calibration procedure. Therefore, some aspects described in the present disclosure, may permit calibration of the main receiver to be maintained while the main receiver is in the low-power state.

Figure 14:
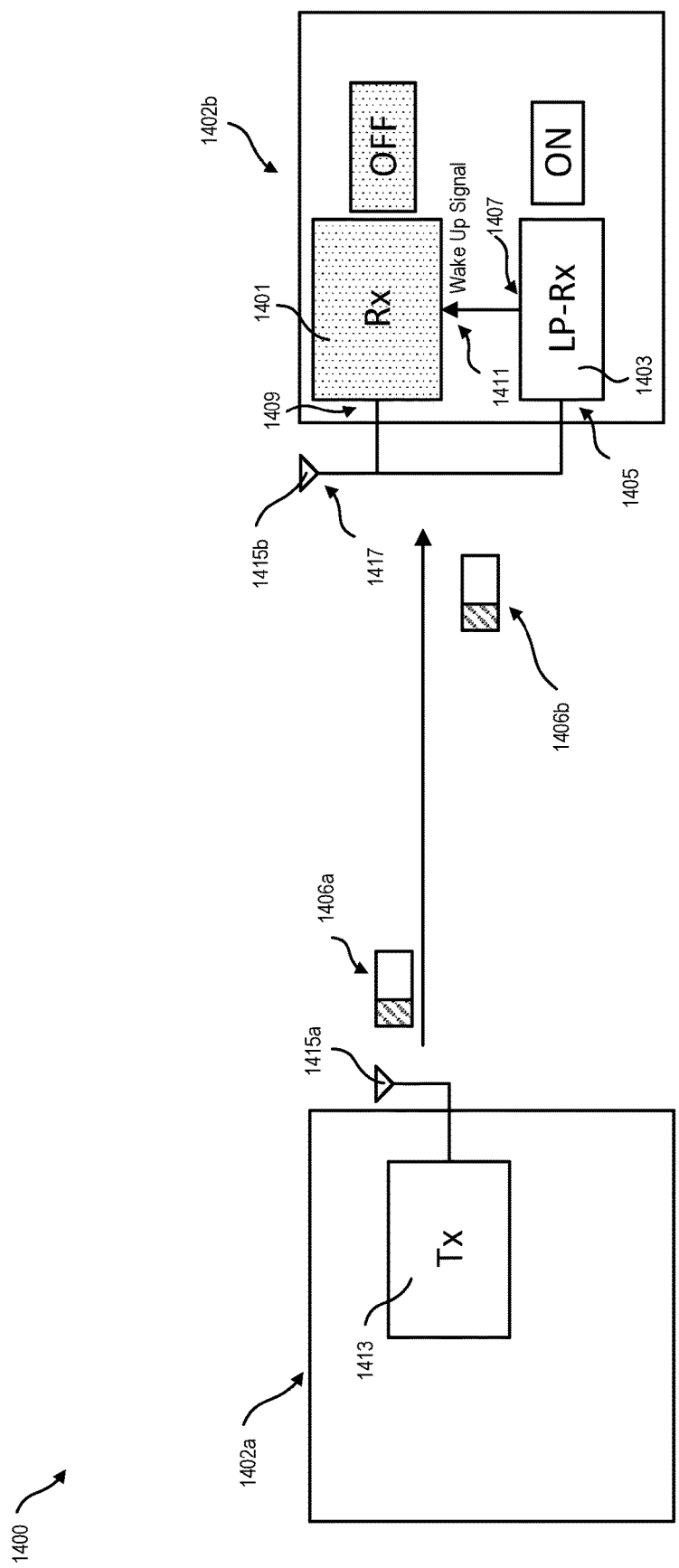
FIG. 14 illustrates a block diagram of an example operational environment to communicate wirelessly within a data plane, a control plane, or some combination thereof.

FIG. 14 illustrates a block diagram of an example operational environment 1400 to communicate wirelessly within a data plane, a control plane, or some combination thereof, in accordance with at least one aspect described in the present disclosure. The environment 1400 may include a first transceiver 1402a and a second transceiver 1402b (generally referred to in the present disclosure as transceiver 1402 or transceivers 1402). The transceivers 1402 may correspond to the data plane transceiver 106, the control plane transceiver 104, or some combination thereof of FIGS. 1-5. In addition, the environment 1400 may include a first antenna 1415a and a second antenna 1415b. The second antenna 1415b may include a fifth terminal 1417.

The first transceiver 1402a may include a transmitter 1413 electrically coupled to the first antenna 1415a. The second transceiver 1402a may include a main receiver 1401 and a secondary receiver 1403. The main receiver 1401 may include a third terminal 1409 and a fourth terminal 1411. The secondary receiver 1403 may include a first terminal 1405 and a second terminal 1407. The fourth terminal 1411 may be electrically coupled to the second terminal 1407. The first terminal 1405 may be electrically coupled to the fifth terminal 1417. The third terminal 1409 may also be electrically coupled to the second antenna 1417.

The transmitter 1413 may provide a beacon signal to the first antenna 1415*a*. In some aspects, the beacon signal may include wake up packets, data packets, or some combination thereof. In addition, the beacon signal may include sample pairs. Each of the sample pairs may include multiple out of phase pre-defined channel samples. The first antenna 1415*a* may wirelessly transmit the beacon signal 1406*a* on a channel within the RF domain. The second antenna 1415*b* may wirelessly receive the beacon signal 1406*b* on the channel.

The secondary receiver 1403 may receive, via the first terminal 1405, the beacon signal. The secondary receiver 1403 may determine a ratio and a sign of amplitudes of each of the out of phase channel samples. In addition, the secondary receiver 1403 may determine coarse CSI of the channel based on the ratio and the sign of the amplitudes of the out of phase pre-defined channel samples.

In some aspects, the secondary receiver 1403 may receive, via the first terminal 1405, a wake up signal on the channel. The secondary receiver 1403 may also provide, via the second terminal 1407, the wake up signal. The main receiver 1401 may receive, via the fourth terminal 1411, the wake up signal. Responsive to receiving the wake up signal, the main receiver 1401 may transition from a low power state to an operative state.

The main receiver 1401 may receive, via the fourth terminal 1411, the coarse CSI. The main receiver 1401 may determine fine CSI based on the coarse CSI and pre-defined parameters of the secondary receiver and the main receiver. In addition, the main receiver 1401 may receive, via the third terminal 1409, a signal that includes data on the channel. Further, the main receiver 1401 may recover the data included in the signal based on the fine CSI. In some aspects, the secondary receiver 1403 may determine the coarse CSI of the channel to maintain a calibrated channel for the main receiver 1401 to receive the signal.

In some aspects, the first antenna 1415*a* may wirelessly transmit and the second antenna 1415*b* may wirelessly receive the beacon signal 1406*a-b* multiple times over a period of time. Each time the beacon signal 1406*a-b* is transmitted, the beacon signal 1406*a-b* may include updated sample pairs representative of a current state of the channel.

The secondary receiver 1403 may receive, via the first terminal 1405, a subsequent beacon signal 1406*b* (e.g., a second beacon signal) on the channel. The subsequent beacon signal 1406*b* may include updated sample pairs (e.g., a second set of sample pairs). Each of the updated sample pairs may include an updated set of out of phase pre-defined channel samples (e.g., a second set of out of phase pre-defined channel samples). The secondary receiver 1403 may determine a ratio and a sign of amplitudes of each of the updated out of phase pre-defined channel samples. In addition, the secondary receiver 1403 may update the coarse CSI of the channel based on the ratio and the sign of the amplitudes of the out of phase pre-defined channels samples and the ratio and the sign of the amplitudes of the updated out of phase pre-defined channel samples.

Figure 15:
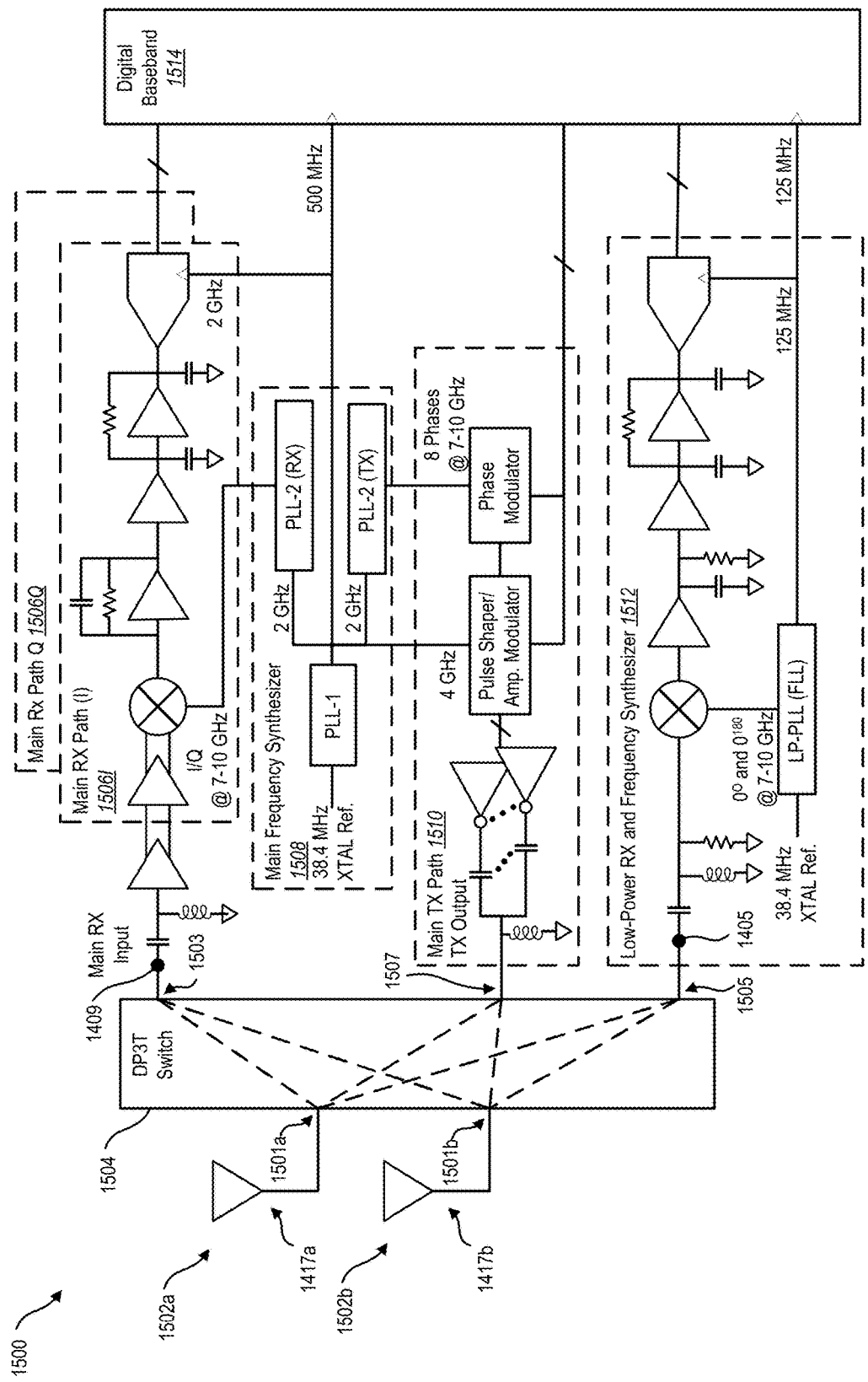
FIG. 15 illustrates an example transceiver that may be implemented in the data plane transceiver, the control plane transceiver, or some combination thereof of FIGS. 1-5 or the transceivers of FIG. 14

FIG. 15 illustrates an example transceiver 1500 that may be implemented in the data plane transceiver 106, the control plane transceiver 104, or some combination thereof of FIGS. 1-5 or the transceivers 1402 of FIG. 14, in accordance with at least one aspect described in the present disclosure.

The example transceiver 1500 may include a main Rx path I 15061 and a main Rx path Q 1506Q (generally referred to in the present disclosure as main receiver 1506). The main receiver 1506 may correspond to the main receiver 1401 of FIG. 14. The example transceiver 1500 may also include a low-power Rx and frequency synthesizer 1512 (referred to in the present disclosure as secondary receiver 1512). The secondary receiver 1512 may correspond to the secondary receiver 1403 of FIG. 14. In addition, the transceiver 1500 may include a main Tx path 1510 (referred to in the present disclosure as main transmitter 1510). The main transmitter 1510 may correspond to the transmitter 1000 of FIG. 10. Further, the transceiver 1500 may include a digital baseband 1514, a main frequency synthesizer 1508, a DP3T switch 1504 (referred to in the present disclosure as switching device 1504), a first antenna 1502*a*, and a second antenna 1502*b*. The digital baseband 1514 may correspond to the baseband stage 922 of FIG. 10. The switching device 1504 may correspond to the switching device 714 of FIG. 8.

The main transmitter 1510 and the switching device 1504 may include a ninth terminal 1507. The ninth terminal 1507 may electrically couple the main transmitter 1510 to a portion of the switching device 1504. The switching device 1504 may include a first sub-sixth terminal 1501*a* and a second sub-sixth terminal 1501*b* (generally referred to in the present disclosure as sixth terminal 1501), a seventh terminal 1503, and an eighth terminal 1505.

The sixth terminal 1501 may be electrically coupled to the fifth terminal 1417. The seventh terminal 1503 may be electrically coupled to the third terminal 1409. The eighth terminal 1505 may be electrically coupled to the first terminal 1405. The switching device 1504 may include multiple switches electrically coupled between the sixth terminal 1501 and one of seventh terminal 1503, the eighth terminal 1505, and the ninth terminal 1507. Each switch of the switching device 1504 may transition between an open state and a closed state to control when the seventh terminal 1503 is electrically coupled to sixth terminal 1501 and when the eighth terminal 1505 is electrically coupled to the sixth terminal 1501.

The main frequency synthesizer 1508 may include multiple phase lock loops (PLLs). The PLLs may generate reference signals for the main receiver 1506, the main transmitter 1510, the digital baseband 1514, or some combination thereof based on a single reference signal. For example, the main frequency synthesizer 1508 may generate I and Q reference signals (e.g., a first clock signal) for the main receiver 1506 between seven GHz and ten GHz based on a reference signal (e.g., a reference signal at 38.4 MHz). As another example, the main frequency synthesizer 1508 may generate a reference signal at four GHz, a reference signal that includes eight phases between seven GHz and ten GHz for the main transmitter 1510 based on the single reference signal. As yet another example, the main frequency synthesizer 1508 may generate a reference signal at five hundred MHz for the digital baseband 1514 based on the single reference signal.

The digital baseband 1514 may generate multiple baseband signals for the main transmitter 1510 to process and provide as transmit signals. The main transmitter 1510 may include a phase modulator configured to generate modulated signals based on the baseband signals. The main transmitter 1510 may also include a pulse shaper/amp. modulator configured to generate shaped signals based on the modulated signals. Further, the main transmitter 1510 may include multiple amplifier capacitor pairs configured to generate the transmit signals based on the shaped signals. The main transmitter 1510 may generate the transmit signals within the RF domain. The main transmitter 1510 may operate the same as or similar to the transmitter 1000 of FIG. 10.

The main transmitter 1510 may provide the transmit signals to the first antenna 1502a, the second antenna 1502b, or both the first antenna 1502a and the second antenna 1502b via the switching device 1504. The first antenna 1502a, the second antenna 1502b, or both the first antenna 1502a and the second antenna 1502b may wirelessly transmit the transmit signals on a transmit channel within the RF domain.

The first antenna 1502a, the second antenna 1502b, or both the first antenna 1502a and the second antenna 1502b may receive receive signals (e.g., the beacon signal, the wake-up signal, the signal, or any other appropriate signal) on a receive channel (e.g., the channel) within the frequency domain. The first antenna 1502a, the second antenna 1502b, or both the first antenna 1502a and the second antenna 1502b may provide the receive signals to the main receiver 1506, the secondary receiver 1512, or both the main receiver 1506 and the secondary receiver 1512 via the switching device 1504. The switching device 1504 may operate the same as or similar to the switching device 714 of FIG. 8.

In some aspects, the main receiver 1506 may process the receive signals and provide the processed signals to the digital baseband 1514. The main receiver 1506 may include capacitors, amplifiers, inductors, mixers, resistors, and an ADC configured to process the signals and recover data in the receive signals. The main receiver 1506 may provide digital signals representative of the recovered data to the digital baseband 1514.

In some aspects, the receive signals may include a beacon signal or a wake up signal and the secondary receiver 1512 may perform non-coherent detection of the receive signals. The secondary receiver 1512 may determine the coarse CSI based on the receive signals. The secondary receiver 1512 may include a low power-PLL (LP-PLL), a mixer, capacitors, resistors, inductors, amplifiers, and an ADC configured to process the receive signals. The secondary receiver 1512 may perform non-coherent detection of the receive signals and may provide digital signals representative of the non-coherent detection result to the digital baseband 1514.

The secondary receiver 1512 (e.g., the LP-PLL) may generate reference signals for the mixer, the ADC, and the digital baseband 1514, or some combination thereof based on another single reference signal (e.g., a second clock signal). In some aspects, the another single reference single may be the same or similar to the single reference signal the main frequency synthesizer uses. In addition, the secondary receiver 1512 may generate one or more of the reference signals to include a frequency that is the same as or similar to the frequency of one or more reference signals generated by the main frequency synthesizer 1508. For example, the secondary receiver 1512 may generate a reference signal between seven GHz and ten GHz for the mixer.

In some aspects, the secondary receiver 1512 may determine the coarse CSI for the main receiver 1506 because the secondary receiver 1512 and the main receiver 1506 operate using reference signals at the same or similar frequencies. For example, duty cycles of the components within the main receiver 1506 may be the same as or similar to duty cycles of the components within the secondary receiver 1512 because the frequency of the reference signals is the same. In addition, the secondary receiver 1512 may determine the coarse CSI for the main receiver 1506 because the main receiver 1506 and the secondary receiver 1512 receive signals on the same channel and use the same antennas 1502, are electrically coupled to the antennas 1502 through the same switching device 1504, or some combination thereof.

In some aspects, the amplifiers of the main receiver 1506 and the secondary receiver 1512 may include constant gain settings. The main receiver 1506 or the secondary receiver 1512 may determine a scaling factor based on a difference between the gain of the main receiver 1506 and the gain of the secondary receiver 1512. In these and other aspects, the coarse CSI may include tap coefficients and the main receiver 1506 may multiply the tap coefficients by the constant scaling factor to determine the fine CSI.

Figure 16:
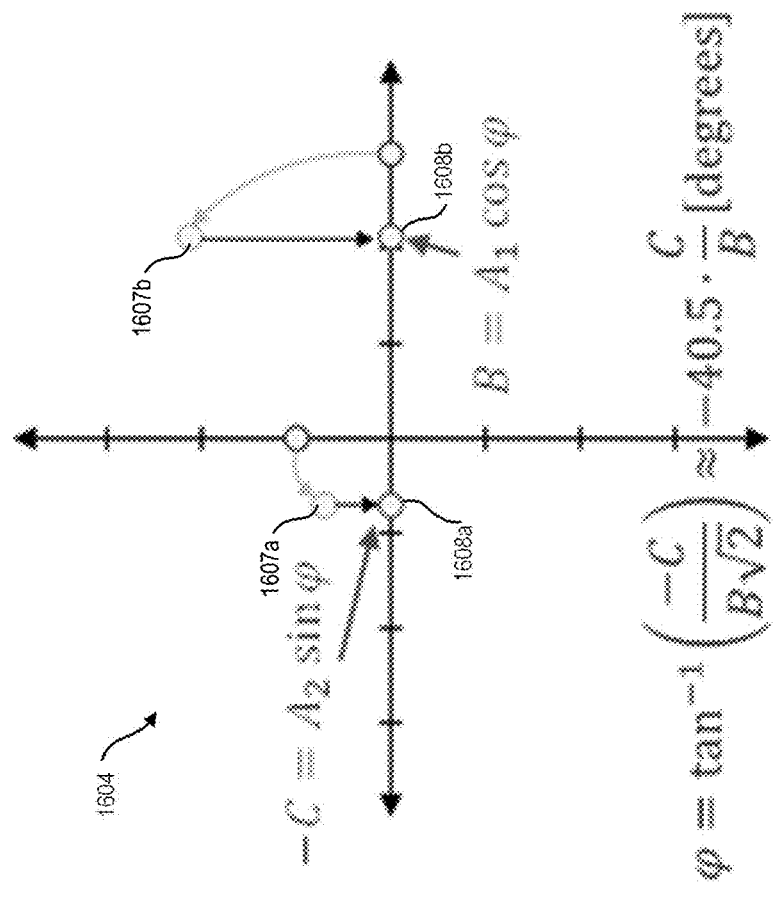
FIG. 16 illustrates an example amplitude and phase-shift keying (APSK) constellation and an example aliased constellation.
Figure 16:
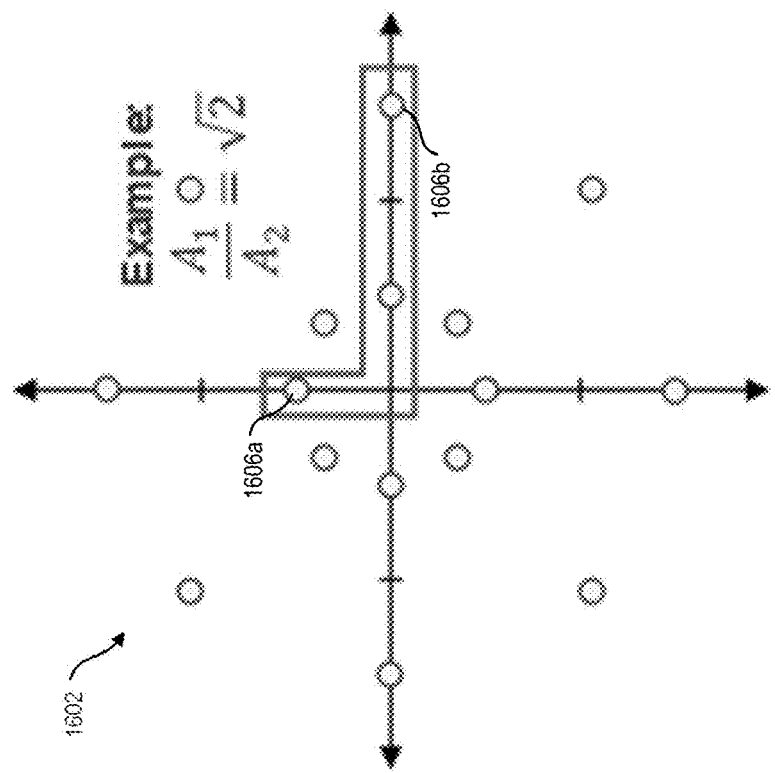

FIG. 16 illustrates an example APSK constellation 1602 and an example aliased constellation 1604, in accordance with at least one aspect described in the present disclosure. The APSK constellation 1602 may include multiple constellation pairs. In FIG. 16, a single constellation pair is denoted as 1606a-b to illustrate an example constellation pair and for ease of illustration.

The constellation pairs may include different amplitudes. For example, an inner ring of the constellation pairs may include an amplitude that is a ratio of an amplitude of an outer ring of the constellation pairs. In some aspects, the ratio may be equal to $$\frac{1}{\sqrt{2}}.$$

Each of the constellation pairs may be ninety degrees out-of-phase with each other. For example, the first constellation point 1606a may be positioned on a quadrature axis (Q axis) and the second constellation point 1606b may be positioned on an In-phase axis (I axis).

The aliased constellation 1604 may include a rotated constellation pair 1607a-b and an aliased constellation pair 1608a-b. The rotated constellation pair 1607a-b may represent the constellation pair 1606a-b after experiencing phase rotation due to channel issues, receiver issues, or some combination thereof. The aliased constellation pair 1607a-b may represent the rotated constellation pair 1607a-b after being aliased on an in-phase axis of the aliased constellation 1604 by the secondary receiver 1512. The secondary receiver 1512 may alias the rotated constellation pair 1607a-b due to the secondary receiver 1512 performing non-coherent detection.

In some aspects, the secondary receiver 1512 may estimate the phase rotation of the constellation pair 1606a-b based on a ratio and sign the of the aliased constellation pair 1608a-b. For example, a ratio of the second aliased constellation point 1608b may be estimated according to $A_1\cos(\varphi)$ in which Al is the amplitude of the second constellation point 1606b. As another example, a ratio of the first aliased constellation point 1608a may be estimated according to $A_2\sin(\varphi)$. In addition, the secondary receiver 1512 may estimate the phase rotation according to $\tan^{-1}$ $$\left(\frac{-C}{B\sqrt{2}}\right)$$

in which C is the ratio of the first aliased constellation point 1608a and B is the ratio of the second aliased constellation point 1608b. In the example illustrated in FIG. 16, the phase rotation may be roughly equal to $$40.5\frac{C}{B}$$

degrees.

In some aspects, the transceiver 1500 or another device may generate a training sequence of constellation pairs for the secondary receiver 1512 to determine the coarse CSI based on.

Figure 17:
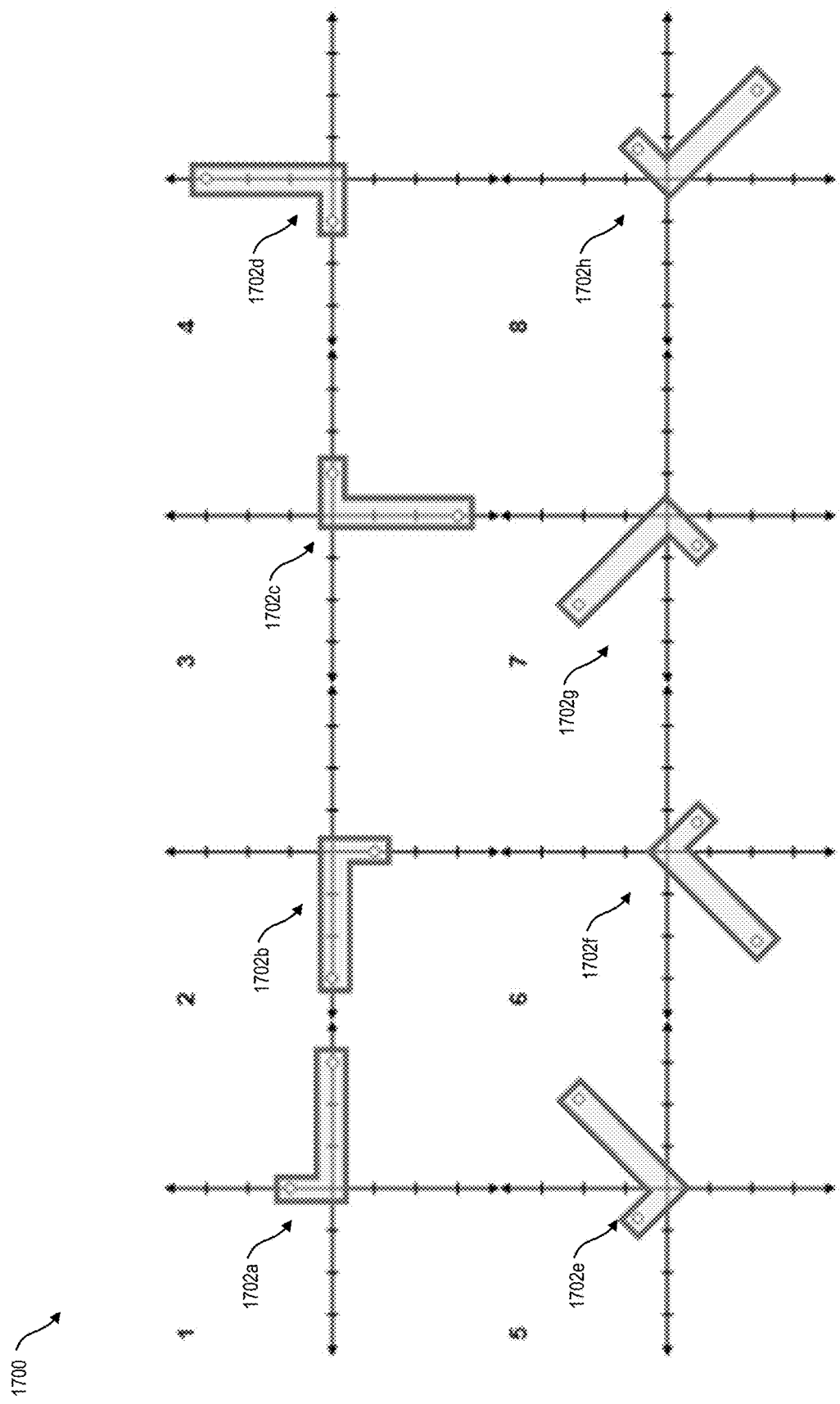
FIG. 17 illustrates an example training sequence including constellation pairs, all according to at least one aspect described in the present disclosure.

FIG. 17 illustrates an example training sequence 1700 including constellation pairs 1702a-h, in accordance with at least one aspect described in the present disclosure. The constellation pairs 1702 may be received by the secondary receiver 1512 and the secondary receiver 1512 may estimate the phase rotation by comparing the aliased constellation pairs to the constellation pairs 1702a-h as discussed above.

In some aspects, the secondary receiver (e.g., the low-power receiver) may achieve low power consumption while operating in different wireless systems compared to the main receiver. For example, the secondary receiver may operate in Wi-Fi, near field communication, Bluetooth or any other appropriate wireless system. In a Wi-Fi system, the main receiver may infrequently and sporadically receive data signals. Without the secondary receiver in the Wi-Fi system, the main receiver may consume more power, increase latency, or some combination thereof. For example, the main receiver may consume more power by maintaining a link rather than transitioning to a low power state. As another example, the main receiver may increase latency by transitioning to the low power state and having to perform a calibration procedure prior to receiving the data.

The secondary receiver may monitor the channel for a wake up packet, a beacon signal, or some combination thereof. Responsive to the secondary receiver receiving the wake up packet, the secondary receiver may provide a wake up signal to the main receiver to cause the main receiver to exit the low power state and enter an operative state. The secondary receiver may perform non-coherent detection for the wake up packet or the beacon signal to reduce power consumption while the main receiver is in the low power state compared to coherent detection.

A wireless chip to chip (WC2C) system may include similar issues at Wi-Fi in that the main receiver may either increase power consumption or latency due to inconsistent data traffic. For example, if the main receiver is implemented as part of a control plane, control signals may be infrequently transmitted and the main receiver may either avoid the low power state to maintain a calibrated link or the main receiver may perform the calibration procedure prior to receiving the data traffic. As another example, if the main receiver is implemented as part of a data plane, data signals may be regularly received but the main receiver may increase the latency due to the calibration procedure.

In some aspects, the secondary receiver may reduce power consumption by the transceiver (e.g., the main receiver), the latency, or some combination thereof. For example, the secondary receiver may permit the main receiver to perform a shortened calibration procedure when transitioning from the low power state. The secondary receiver may operate on the same channel as the main receiver. In addition, the secondary receiver may determine CSI (e.g., coarse CSI) of the channel, which may be used by the main receiver to perform the shortened calibration procedure. The secondary receiver may be able to determine the CSI due to the main receiver and the secondary receiver sharing antennas, operating on the same channel, and using the same or similar reference signals.

In some aspects, the secondary receiver may perform non-coherent detection on the channel. Due to the non-coherent detection, the secondary receiver may receive aliased constellation points. The secondary receiver may determine the CSI (e.g., an estimated phase rotation) based on a ratio and amplitude of the aliased constellation points. The main receiver may use a frame synchronization, a preamble sequence, and the coarse CSI, or some combination thereof to determine fine CSI. The main receiver may determine the fine CSI to reduce a BER of the channel.

A transceiver may include a main receiver, a secondary receiver, a switching device, and an antenna. The main receiver may include a third terminal and a fourth terminal. The secondary receiver may include a first terminal and a second terminal. The fourth terminal may be electrically coupled to the second terminal. The antenna may include a fifth terminal electrically coupled to the first terminal and the third terminal. In some aspects, the transceiver may communicate the control signals within the control plane. In other aspects, the transceiver may communicate the data signals within the data plane.

The switching device may include multiple switching elements (generally referred to in the present disclosure as switches). Each of the switches may be electrically coupled between the antenna and one of the main receiver and the secondary receiver. Each of the switches may transition between an open state and a closed state to control when the main receiver is electrically coupled to the antenna and when the secondary receiver is electrically coupled to the antenna.

The switching device may include a sixth terminal, a seventh terminal, and an eighth terminal. The sixth terminal may be electrically coupled to the fifth terminal. The seventh terminal may be electrically coupled to the third terminal. The eighth terminal may be electrically coupled to the first terminal. Each of the switches may be electrically coupled between the sixth terminal and one of the seventh terminal and the eighth terminal. The switches may control when the seventh terminal is electrically coupled to sixth terminal and when the eighth terminal is electrically coupled to the sixth terminal.

The antenna may wirelessly receive signals on the channel. For example, the antenna may wirelessly receive the beacon signal, the wake up packet, the data signal, the control signal, or some combination thereof.

In some aspects, after initial fabrication or upon each cold boot, the main receiver may perform an initial calibration procedure. The main receiver, during the initial calibration procedure, may characterize impairments of the channel, the main receiver, or some combination thereof. For example, the main receiver may be coupled to a transmitter in a local loop-back configuration. The transmitter may provide a pre-defined sequence of calibration tones and the main receiver may receive the pre-defined calibration tones. The main receiver may determine correction factors (e.g., tap coefficients, CSI, etc.). This process may be repeated for each channel the main receiver is configured to operate on. In some aspects, upon cold boot-up, the main receiver may perform the calibration procedure to adjust I/Q imbalance correction factors, train adaptive equalizer tap coefficients, or some combination for the channel.

To reduce power consumption while maintaining calibration of the channel (e.g., to permit the main receiver to enter the low power state), the secondary receiver may perform various operations in accordance with at least one aspect described in the present disclosure.

The secondary receiver may receive, via the first terminal, a beacon signal on the channel. In some aspects, the beacon signal may include the wake up packet (e.g., a wake up radio signal). The beacon signal may include sample pairs. Each of the sample pairs may include out of phase pre-defined channel samples. Each of the out of phase pre-defined channel samples may include a pre-defined ratio and sign associated with an amplitude of the channel samples. In some aspects, the pre-defined channel samples may include out of phase pre-defined I/Q samples.

In some aspects, the channel samples may include multiple constellation pairs that are ninety degrees out of phase with each other. Each of the channel samples may include different amplitudes than each other. The I/Q sample pairs may be ninety degrees out of phase and at different amplitudes.

The secondary receiver may determine a ratio and a sign of amplitudes of each of the out of phase pre-defined channel samples. The secondary receiver may also determine CSI (e.g., coarse CSI) of the channel based on the ratio and the sign of the amplitudes. The secondary receiver may determine the CSI of the channel to maintain a calibrated channel for the main receiver to receive signals. The coarse CSI may include I/Q imbalance correction factors, adaptive equalizer tap coefficients, and some combination thereof.

In some aspects, the beacon signal may include a first beacon signal, the sample pairs may include a first set of sample pairs, and the out of phase pre-defined channel samples may include a first set of out of phase pre-defined channel samples. The secondary receiver may receive, via the first terminal, a second beacon signal on the channel. The second beacon signal may include a second set of sample pairs. Each sample pair of the second set of sample pairs may include a second set of out of phase pre-defined channel samples. The secondary receiver may also determine a ratio and a sign of the amplitudes of each of the out of phase pre-defined channel samples of the second set of out of phase pre-defined channel samples. In addition, the secondary receiver may update the CSI of the channel based on the ratio and the sign of the amplitudes of the first set of out of phase pre-defined channel samples and the ratio and the sign of the amplitudes of the second set of out of phase pre-defined channels samples.

The main receiver may receive, via the fourth terminal, the coarse CSI. The main receiver may use the coarse CSI to perform initialization operations (e.g., perform a calibration procedure). For example, the main receiver may determine fine CSI based on a frame synchronization sequence of a main RX data packet and the coarse CSI. In some aspects, the main receiver may receive, via the third terminal, a signal (e.g., a data signal or a control signal) on the channel. In these and other aspects, the signal may include the main RX data packet. The main receiver may recover data within the signal based on the coarse CSI.

In some aspects, each of the out of phase pre-defined channel samples may include a pre-defined ratio and a sign of the amplitudes. The secondary receiver may determine an aliased ratio and sign of the amplitudes of each of the out of phase pre-defined channel samples. The secondary receiver may perform non-coherent detection on the channel and may determine the aliased ratio and sign of a projection of each of the out of phase pre-defined I/Q samples onto an in-phase axis.

The secondary receiver may compare the aliased ratio and sign of each of the amplitudes to the pre-defined ratio and sign of the corresponding amplitudes. The secondary receiver may also determine a phase rotation of the channel based on a difference between the aliased ratio and sign of each of the amplitudes and the pre-defined ratio and sign of the amplitudes. In some aspects, the CSI may include the phase rotation of the channel.

In some aspects, the secondary receiver may estimate an effective phase rotation ($\varphi$) of the transceiver, the channel, or some combination thereof based on the ratio and the sign of the amplitudes of the aliased ratio sign. The phase rotation of the transceiver may occur due to frequency offsets or oscillator offsets.

In some aspects, the secondary receiver may determine a first order ratio of channel path loss of I and Q phases based on the phase rotation. The first order ratio may differ from an actual channel path loss by a constant scaling factor of a. In some aspects, the constant scaling factor may be due to a difference between a gain factor of the secondary receiver (e.g., an analog frontend) and the calculated signal strength on the main receiver. In other aspects, the constant scaling factor may be due to a difference between a gain factor of the secondary receiver and a gain factor of the main receiver.

The secondary receiver may determine a frequency dependent channel impulse response of the channel. In some aspects, the secondary receiver may determine the frequency dependent channel impulse response using minimum mean square error or any other appropriate method. The secondary receiver may also invert the frequency dependent channel impulse response to derive the tap coefficients for an adaptive equalizer within the main receiver. The coarse CSI may include the tap coefficients. The main receiver may multiply the tap coefficients by the constant scaling factor to determine the fine CSI.

In some aspects, the beacon signal may include the wake up packet. The wake up packet may include synchronization information, a MAC header, a data payload, a frame check sequence, or some combination thereof. The synchronization information may include a wake-up preamble sequence that includes a repeated PN sequence for synchronization. The MAC header may include information identifying a transmitter that transmitted the beacon signal. In addition, the MAC header may include information that indicates that the beacon signal is for channel calibration. The data payload may include the sample pairs that form a training sequence. The data payload may include the pre-defined sample pairs. In some aspects, the data payload may also include additional training sequences for most robust links for nosier channel scenarios. The frame check sequence may include information for error detection and error correction.

The MAC header, the data payload, and the frame check sequence may be Manchester encoded to permit the secondary receiver to perform the non-coherent detection.

The beacon signal may be modulated according to one of an on-off keying modulation scheme, an amplitude phase shift keying scheme, and quadrature amplitude modulation scheme.

In some aspects, the signal may include a data packet that include a frame synchronization sequence, a data payload, another frame check sequence, or some combination thereof. The frame synchronization sequence, the data payload, or some combination thereof include information to cause the main receiver to determine the fine CSI based on the information within the frame synchronization sequence, the coarse CSI, and the data payload.

The secondary receiver may include pre-defined parameters and the main receiver may include pre-defined parameters. For example, the secondary receiver and the main receiver may include gain factors. The main receiver may determine the fine CSI based on the coarse CSI and the pre-defined parameters of the secondary receiver and the main receiver.

The secondary receiver may receive, via the first terminal, the wake up packet (e.g., the wake up signal). The secondary receiver may also provide, via the second terminal and the fourth terminal, the wake up signal to the main receiver. Responsive to receiving the wake up signal, the main receiver may transition from the low power state to an operative state. The main receiver may also receive the signal on the channel. In addition, the main receiver may recover data within the signal based on the coarse CSI.

In some aspects, the secondary receiver may operate at a reduced bandwidth compared to the main receiver. The channel may include a receive channel that includes a frequency between three hundred MHz and three hundred GHz.

The main receiver may receive a first clock signal at a frequency. The secondary receiver may receive a second clock signal at the frequency. Duty cycles of the main receiver and the secondary receiver may be based on the frequency.

Example 1a may include transceiver for communicating control signals within a control plane, the transceiver may include a first antenna element configured to wirelessly transmit a transmit control signal and wirelessly receive a receive control signal on a first channel; a second antenna element configured to wirelessly transmit the transmit control signal and wirelessly receive the receive control signal on a second channel; a transmitter device configured to provide the transmit control signal on the first channel and the second channel; a receiver device configured to receive the receive control signal on the first channel and the second channel; and a secondary receiver device configured to monitor occupation of the first channel and the second channel without decoding at least a portion of control signals on the first channel and the second channel concurrent with the receiver device receiving the receive control signal; and a plurality of switching elements, each switching element of the plurality of switching elements electrically coupled between one of the transmitter device, the receiver device, and the secondary receiver device and one of the first antenna element and the second antenna element, wherein each switching element of the plurality of switching elements is configured to transition between an open state and a closed state, the plurality of switching elements configured to control when: the transmitter device provides the transmit control signal to the first antenna element, the transmitter device provides the transmit control signal to the second antenna element, and the transmitter device is electrically isolated from the first antenna element and the second antenna element; the receiver device receives the receive control signal from the first antenna element, the receiver device receives the receive control signal from the second antenna element, and the receiver device is electrically isolated from the first antenna element and the second antenna element; and the secondary receiver device monitors occupation of the first channel, the secondary receiver device monitors of the second channel, and the secondary receiver is electrically isolated from the first antenna element and the second antenna element.

Example 2a may include the transceiver of example 1a, wherein the secondary receiver is further configured to monitor the first channel and the second channel for a wake up signal and the corresponding switching elements of the plurality of switching elements are configured to transition between the open state and the closed state to control when the secondary receiver device monitors the first channel and the second channel for the wake up signal.

Example 3a may include the transceiver of any of examples 1a and 2a, wherein the plurality of switching elements transition between the open state and the closed state to cause the transceiver to operate according to a particular operational mode of a plurality of operational modes.

Example 4a may include the transceiver of example 3a, wherein the plurality of operational modes include: a transmit only mode in which the transmitter device provides the transmit control signal to one of the first antenna element and the second antenna element and the corresponding switching elements of the plurality of switching elements electrically isolate the receiver device and the secondary receiver device from the first antenna element and the second antenna element; a receive only mode in which the receiver device receives the receive control signal from one of the first antenna element and the second antenna element and the corresponding switching elements of the plurality of switching elements electrically isolate the transmitter device and the secondary receiver device from the first antenna element and the second antenna element; a duplex channel occupation mode in which the receiver device receives the receive control signal from one of the first antenna element and the second antenna element, the secondary receiver device monitors occupation of one of the first channel and the second channel and the corresponding switching elements of the plurality of switching elements electrically isolate the transmitter device from the first antenna element and the second antenna element; and a duplex mode in which the receiver device receives the receive control signal from one of the first antenna element and the second antenna element, the transmitter device provides the transmit control signal to one of the first antenna element and the second antenna element, and the corresponding switching elements of the plurality of switching elements electrically isolate the secondary receiver device from the first antenna element and the second antenna element.

Example 5a may include the transceiver of example 3a, wherein the plurality of operational modes further includes a standby mode in which the secondary receiver device monitors one of the first channel and the second channel for the wake up signal and the corresponding switching elements of the plurality of switching elements electrically isolate the receiver device and the transmitter device from the first antenna element and the second antenna element.

Example 6a may include the transceiver of example 5a, wherein responsive to detecting the wake up signal, the corresponding switching elements of the plurality of switching elements are configured to transition between the open state and the closed state to cause the transceiver to operate according to one of the transmit only mode, the receive only mode, the duplex channel occupation mode, and the duplex mode.

Example 7a may include the transceiver of any of examples 5a and 6a, wherein the wake up signal includes a narrow bandwidth and low data rate signal to reduce at least one of a noise setting of the transceiver and a filter setting of the transceiver compared to a wake up signal to be received by the receiver device.

Example 8a may include the transceiver of any of examples 4a-7a, wherein: prior to the transmitter device providing the transmit control signal, the switching elements transition between the open state and the closed state to cause the transceiver to operate according to the duplex channel occupation mode to permit the secondary receiver to determine if one of the first channel and the second channel are occupied; and responsive, to the corresponding channel not being occupied, the switching elements transition between the open state and the closed state to cause the transceiver to operate according to one of the transmit only mode or the duplex mode.

Example 9a may include the transceiver of any of example 1a-8a, wherein the secondary receiver device is configured to monitor occupation of the first channel and the second channel by detecting energy on one of the first channel and the second channel.

Example 10a may include the transceiver of any of examples 1a-9a, wherein the first antenna element includes a single channel antenna element configured to operate on the first channel and the second antenna element includes a single channel antenna element configured to operate on the second channel and the transceiver is configured to operate according to a frequency division duplex protocol.

Example 11a may include the transceiver of example 10a, wherein the first channel and the second channel include separate channels that each include a bandwidth that is equal to or greater than five hundred megahertz.

Example 12a may include the transceiver of any of examples 1a-11a, wherein the plurality of switching elements includes a dual-port-three-throw (DP3T) switch assembly.

Example 13a may include the transceiver of example 12a, wherein the DP3T switch assembly includes six switching elements wherein: a first switching element is electrically coupled between the transmitter device and the first antenna element; a second switching element is electrically coupled between the transmitter device and the second antenna element; a third switching element is electrically coupled between the receiver device and the first antenna element; a fourth switching element is electrically coupled between the receiver device and the second antenna element; a fifth switching element is electrically coupled between the secondary receiver device and the first antenna element; and a sixth switching element is electrically coupled between the secondary receiver device and the second antenna element.

Example 14a may include the transceiver of any of examples 1a-13a, wherein the transceiver is configured to support point to multi-point communication.

Example 15a may include the transceiver of any of examples 1a-13a, wherein the transceiver is configured to support multi-point to multi-point communication.

Example 16a may include the transceiver of any of examples 1a-15a, wherein the transceiver includes a control plane system.

Example 17a may include a transceiver for communicating control signals within a control plane, the transceiver including: a first antenna element including a first terminal and configured to wirelessly transmit a transmit control signal and wirelessly receive a receive control signal on a first channel; a second antenna element including a second terminal and configured to wirelessly transmit the transmit control signal and wirelessly receive the receive control signal on a second channel; a transmitter device including a third terminal and configured to provide the transmit control signal on the first channel and the second channel; a receiver device including a fourth terminal and configured to receive the receive control signal on the first channel and the second channel; and a secondary receiver device including a fifth terminal and configured to monitor occupation of the first channel and the second channel without decoding at least a portion of control signals on the first channel and the second channel concurrent with the receiver device receiving the receive control signal; and a plurality of switching elements including a sixth terminal, a seventh terminal, an eighth terminal, a ninth terminal, and a tenth terminal, wherein the sixth terminal is electrically coupled to the first terminal, the seventh terminal is electrically coupled to the second terminal, the eighth terminal is electrically coupled to the third terminal, the ninth terminal is electrically coupled to the fourth terminal, and the tenth terminal is electrically coupled to the fifth terminal, wherein each switching element of the plurality of switching elements is configured to transition between an open state and a closed state to control when: the eighth terminal is electrically coupled to the sixth terminal, the eighth terminal is electrically coupled to the seventh terminal, and the eighth terminal is electrically isolated from the first antenna element and the second antenna element; the ninth terminal is electrically coupled to the sixth terminal, the ninth terminal is electrically coupled to the seventh terminal, and the ninth terminal is electrically isolated from the first antenna element and the second antenna element; and the tenth terminal is electrically coupled to the sixth terminal, the tenth terminal is electrically coupled to the seventh terminal, and the tenth terminal is electrically isolated from the first antenna element and the second antenna element.

Example 18a may include the transceiver of example 17a, wherein the secondary receiver is further configured to monitor the first channel and the second channel for a wake up signal and the corresponding switching elements of the plurality of switching elements are configured to transition between an open state and a closed state to control when the tenth terminal is electrically coupled to the sixth terminal and the seventh terminal to cause the secondary receiver device to monitor for the wake up signal on the corresponding channel.

Example 19a may include the transceiver of any of examples 17a and 18a, wherein the plurality of switching elements transition between the open state and the closed state to cause the transceiver to operate according to a particular operational mode of a plurality of operational modes.

Example 20a may include the transceiver of example 19a, wherein the plurality of operational modes include: a transmit only mode in which the eighth terminal is electrically coupled to one of the sixth terminal and the seventh terminal and the ninth terminal and the tenth terminal are electrically isolated from the first antenna element and the second antenna element; a receive only mode in which the ninth terminal is electrically coupled to one of the sixth terminal and the seventh terminal and the eighth terminal and the tenth terminal are electrically isolated from the first antenna element and the second antenna element; a duplex channel occupation mode in which the ninth terminal is electrically coupled to one of the sixth terminal and the seventh terminal, the tenth terminal is electrically coupled to one of the sixth terminal and the seventh terminal, and the eighth terminal is electrically isolated from the first antenna element and the second antenna element; and a duplex mode in which the ninth terminal is electrically coupled to one of the sixth terminal and the seventh terminal, the eighth terminal is electrically coupled to one of the sixth terminal and the seventh terminal, and the tenth terminal is electrically isolated from the first antenna element and the second antenna element.

Example 21a may include the transceiver of example 20a, wherein the plurality of operational modes further includes a standby mode in which the tenth terminal is electrically coupled to one of the sixth terminal and the seventh terminal and the eighth terminal and the ninth terminal are electrically isolated from the first antenna element and the second antenna element.

Example 22a may include the transceiver of example 21a, wherein responsive to detecting the wake up signal, the corresponding switching elements of the plurality of switching elements are configured to transition between the open state and the closed state to cause the transceiver to operate according to one of the transmit only mode, the receive only mode, the duplex channel occupation mode, and the duplex mode.

Example 23a may include the transceiver of any of examples 20a-22a, wherein: prior to the transmitter device providing the transmit control signal, the switching elements transition between the open state and the closed state to cause the transceiver to operate according to the duplex channel occupation mode to permit the secondary receiver to determine if one of the first channel and the second channel are occupied; and responsive, to the corresponding channel not being occupied, the switching elements transition between the open state and the closed state to cause the transceiver to operate according to one of the transmit only mode or the duplex mode.

Example 24a may include the transceiver of any of examples 17a-23a, wherein the plurality of switching elements includes six switching elements wherein: a first switching element is electrically coupled between the eighth terminal and the sixth terminal; a second switching element is electrically coupled between the eighth terminal and the seventh terminal; a third switching element electrically coupled between the ninth terminal and the sixth terminal; a fourth switching element electrically coupled between the ninth terminal and the seventh terminal; a fifth switching element electrically coupled between the tenth terminal and the sixth terminal; and a sixth switching element electrically coupled between the tenth terminal and the seventh terminal.

Example 25a may include a transceiver that includes: a transmitter device configured to provide a transmit control signal on a first channel and a second channel; a receiver device configured to receive a receive control signal on the first channel and the second channel; and a secondary receiver device configured to monitor occupation of the first channel and the second channel without decoding at least a portion of control signals concurrent with the receiver device receiving the receive control signal; and a plurality of switching elements configured to control when: the transmitter device provides the transmit control signal to one of and is electrically isolated from a first antenna and a second antenna; the receiver device receives the receive control signal from one of and is electrically isolated from the first antenna and the second antenna; and the secondary receiver device monitors occupation of one of the first channel and the second channel and is electrically isolated from the first antenna and the second antenna.

Example 26a may include the transceiver of example 25a, wherein the secondary receiver is further configured to monitor the first channel and the second channel for a wake up signal and the corresponding switching elements of the plurality of switching elements are configured to transition between an open state and A closed state to control when the secondary receiver device monitors the first channel and the second channel for the wake up signal.

Example 27a may include the transceiver of example 26a, wherein the plurality of switching elements transition between the open state and the closed state to cause the transceiver to operate according to a particular operational mode of a plurality of operational modes.

Example 28a may include the transceiver of example 27a, wherein the plurality of operational modes include: a transmit only mode in which the transmitter device provides the transmit control signal to one of the first antenna and the second antenna and the corresponding switching elements of the plurality of switching elements electrically isolate the receiver device and the secondary receiver device from the first antenna and the second antenna; a receive only mode in which the receiver device receives the receive control signal from one of the first antenna and the second antenna and the corresponding switching elements of the plurality of switching elements electrically isolate the transmitter device and the secondary receiver device from the first antenna and the second antenna; a duplex channel occupation mode in which the receiver device receives the receive control signal from one of the first antenna and the second antenna, the secondary receiver device monitors occupation of one of the first channel and the second channel and the corresponding switching elements of the plurality of switching elements electrically isolate the transmitter device from the first antenna and the second antenna; and a duplex mode in which the receiver device receives the receive control signal from one of the first antenna and the second antenna, the transmitter device provides the transmit control signal to one of the first antenna and the second antenna, and the corresponding switching elements of the plurality of switching elements electrically isolate the secondary receiver device from the first antenna and the second antenna.

Example 29a may include the transceiver of example 28a, wherein the plurality of operational modes further include a standby mode in which the secondary receiver device monitors one of the first channel and the second channel for the wake up signal and the corresponding switching elements of the plurality of switching elements electrically isolate the receiver device and the transmitter device from the first antenna and the second antenna.

Example 30a may include the transceiver of example 28a, wherein: prior to the transmitter device providing the transmit control signal, the switching elements transition between the open state and the closed state to cause the transceiver to operate according to the duplex channel occupation mode to permit the secondary receiver to determine if one of the first channel and the second channel are occupied; and responsive, to the corresponding channel not being occupied, the switching elements transition between the open state and the closed state to cause the transceiver to operate according to one of the transmit only mode or the duplex mode.

Example 31a may include a transceiver that includes: a transmitter device configured to provide a transmit control signal on a first channel and a second channel; a receiver device configured to receive a receive control signal on the first channel and the second channel; and a secondary receiver device configured to monitor occupation of the first channel and the second channel without decoding at least a portion of control signals concurrent with the receiver device receiving the receive control signal; and a plurality of switching elements configured to control in response to: the transmitter device providing the transmit control signal to one of a first antenna or a second antenna and the transmitter device is electrically isolated from the first antenna and the second antenna; the receiver device receiving the receive control signal via one of the first antenna or the second antenna and the receiver device is electrically isolated from the first antenna and the second antenna; and the secondary receiver device monitoring occupation of one of the first channel and the second channel and the secondary receiver device is electrically isolated from the first antenna and the second antenna.

Example 1b may include a transceiver for communicating control signals within a control plane, the transceiver includes a transmitter including: a baseband stage configured to: receive an input signal that includes a baseband symbol rate frequency; receive a first clock signal within a first frequency that is equal to the baseband symbol rate frequency; and generate, based on the first clock signal and the input signal, a baseband signal within a radio frequency (RF), the baseband signal includes a symbol rate frequency that is less than the baseband symbol rate frequency; a phase modulator stage configured to: receive a second clock signal and the baseband signal; and generate a carrier signal within the RF, the carrier signal includes a modulated phase based on the baseband signal and the second clock signal; a pulse shaper and modulator stage configured to: receive a third clock signal, the baseband signal, and the carrier signal; and generate, based on the third clock signal, the baseband signal, and the carrier signal, a modulated signal within the RF that includes shaped symbols at the symbol rate frequency so as to permit full-duplex wireless communication by the transceiver within the control plane; and an amplifier stage including a weighting scheme and configured to: receive the modulated signal; and generate a control signal within the RF based on the weighting scheme and the modulated signal.

Example 2b may include the transceiver of example 1b, wherein the pulse shaper and modulator stage includes a pulse shaper stage configured to: receive the third clock signal and the carrier signal; and generate, based on the third clock signal and the carrier signal, a shaped signal within the RF that includes the shaped symbols at the symbol rate frequency; and a modulator stage configured to: receive the shaped signal and the baseband signal; and generate, based on the shaped signal and the baseband signal, the modulated signal within the RF including the shaped symbols at the symbol rate frequency.

Example 3b may include the transceiver of any of examples 1band 2b, wherein the third clock signal includes a plurality of sub window signals and the pulse shaper stage includes a plurality of digital gates, each digital gate of the plurality of digital gates configured to: receive a corresponding sub-window signal of the plurality of sub-window signals and the carrier signal; and gate the carrier signal with the corresponding sub-window signal of the plurality of sub-window signals to generate a plurality of sub-shaped signals within the RF, wherein the shaped signal includes the plurality of sub-shaped signals.

Example 4b may include the transceiver of example 3b, wherein the third clock signal is within a third frequency and the plurality of sub-window signals include a timing resolution of one divided by the third frequency.

Example 5b may include the transceiver of example 4b, wherein a duty cycle of each sub-window signal of the plurality of sub-window signals is reduced a step size equal to two divided by the third frequency such that the duty cycle of the corresponding sub-window signal is reduced compared to the duty cycle of a previous sub-window signal of the plurality of sub-window signals.

Example 6b may include the transceiver of example 5b, wherein the duty cycle of a first sub-window signal of the plurality of sub-window signals is equal to one hundred twenty eight divided by the third frequency and the duty cycle of a last sub-window signal of the plurality of sub-window signals is equal to one divided by the third frequency.

Example 7b may include the transceiver of any of examples 1b-6b, wherein the pulse shaper stage is configured to generate the modulated signal by expanding a symbol period of the shaped symbols of the modulated signal to a duration greater than one divided by the baseband symbol rate frequency.

Example 8b may include the transceiver of example 7b, wherein an envelope of the shaped symbols of the modulated signal includes a bell shaped envelope extending two or more symbol periods.

Example 9b may include the transceiver of any of examples 2b-7b, wherein the modulator stage includes a plurality of gate pairs, each gate pair of the plurality of gate pairs configured to: receive a corresponding sub-shaped signal of the plurality of sub-shaped signals and the baseband signal; gate the corresponding sub-shaped signal with the baseband signal; and gate the corresponding sub-shaped signal with a ground reference to cause the modulated signal to include a plurality of sub-modulated signals within the RF.

Example 10b may include the transceiver of example 9b, wherein the amplifier stage includes a plurality of amplifier capacitor pairs, wherein a capacitive value of each of the amplifier capacitor pairs includes the weighting scheme, and wherein each amplifier capacitor pair of the plurality of amplifier capacitor pairs is configured to: receive a corresponding sub-modulated signal of the plurality of sub-modulated signals; amplify an amplitude of the corresponding sub-modulated signal; and generate a sub-control signal within the RF based on amplified corresponding sub-modulated signal, wherein the control signal includes a sum of the sub-control signal generated by each amplifier capacitor pair of the plurality of amplifier capacitor pairs.

Example 11b may include the transceiver of any of examples 1b-10b, wherein the second clock signal is within a second frequency that is different than the first frequency, the transceiver further includes a local oscillator and: the local oscillator is configured to generate the second clock signal as a plurality of complementary phase signals within the second frequency; and the phase modulator stage is configured to multiplex the plurality of complementary phase signals based on the baseband signal.

Example 12b may include the transceiver of example 11b, wherein the plurality of complementary phase signals include eight sets of complementary phase signals.

Example 13b may include the transceiver of any of examples 11b and 12b, wherein the local oscillator includes a multiple stage ring oscillator.

Example 14b may include the transceiver of any of examples 1b-13b, wherein the baseband signal includes a plurality of even symbols and a plurality of odd symbols and wherein the phase modulator stage, the pulse shaper and modulator stage, and the amplifier stage include: an even path configured to: generate an even carrier signal based on the plurality of even symbols and the second clock signal, wherein the carrier signal includes the even carrier signal; and generate, based on the third clock signal, the plurality of even symbols, and the even carrier signal, an even modulated signal, wherein the modulated signal includes the even modulated signal; and an odd path configured to: generate an odd carrier signal based on the plurality of odd symbols and the second clock signal, wherein the carrier signal further includes the odd carrier signal; and generate, based on the third clock signal, the plurality of odd symbols, and the odd carrier signal, an odd modulated signal, wherein the modulated signal further includes the odd modulated signal.

Example 15b may include the transceiver of any of examples 1b-14b, wherein the phase modulator includes a resolution of three bits.

Example 16b may include the transceiver of any of examples 1b-15b, wherein the transmitter includes a polar transmitter architecture.

Example 17b may include the transceiver of any of examples 1b-16b, wherein modulation of the control signal is achieved through phase modulation and amplitude modulation.

Example 18b may include the transceiver of any of examples 1b-17b, wherein the transmitter supports at least one of a binary phase shift keying scheme, a quadrature phase shift keying scheme, an eight phase shift keying scheme, and a sixteen phase shift keying scheme.

Example 19b may include the transceiver of any of examples 1b-18b, wherein the baseband symbol rate frequency includes five hundred megahertz.

Example 20b may include the transceiver of any of examples 1b-19b, wherein the pulse shaper and modulator stage includes a one bit amplitude modulator.

Example 21b may include the transceiver of any of examples 1b-20b, wherein the phase modulator stage includes a multiplexer.

Example 22b may include a transceiver for communicating control signals within a control plane, the transceiver includes a transmitter including: a baseband stage including a first terminal, a second terminal, and a third terminal, the baseband stage configured to: receive, at the first terminal, an input signal that includes a baseband symbol rate frequency; receive, at the second terminal, a first clock signal within a first frequency that is equal to the baseband symbol rate frequency; and generate, based on the first clock signal and the input signal, a baseband signal within a radio frequency (RF), the baseband signal includes a symbol rate frequency that is less than the baseband symbol rate frequency; a phase modulator stage including a fourth terminal electrically coupled to the third terminal, a fifth terminal, and a sixth terminal, the phase modulator stage configured to: receive, at the fifth terminal, a second clock signal; receive, at the fourth terminal, the baseband signal; and generate a carrier signal within the RF, the carrier signal includes a modulated phase based on the baseband signal and the second clock signal; a pulse shaper and modulator stage including a seventh terminal electrically coupled to the sixth terminal, an eighth terminal electrically coupled to the fourth terminal, a ninth terminal, and a tenth terminal, the pulse shaper and modulator stage configured to: receive, at the ninth terminal, a third clock signal; receive, at the eighth terminal, the baseband signal; receive, at the seventh terminal, the carrier signal; and generate, based on the third clock signal, the baseband signal, and the carrier signal, a modulated signal within the RF that includes shaped symbols at the symbol rate frequency so as to permit full-duplex wireless communication by the transceiver within the control plane; and an amplifier stage including a weighting scheme and an eleventh terminal electrically coupled to the tenth terminal, the amplifier stage configured to: receive, at the eleventh terminal, the modulated signal; and generate a control signal within the RF based on the weighting scheme and the modulated signal.

Example 23b may include the transceiver of example 22b, wherein the pulse shaper and modulator stage includes: a pulse shaper stage including the seventh terminal, the ninth terminal, and a twelfth terminal, the pulse shaper configured to: receive, at the ninth terminal, the third clock signal receive, at the seventh terminal, the carrier signal; and generate, based on the third clock signal and the carrier signal, a shaped signal within the RF that includes the shaped symbols at the symbol rate frequency; and a modulator stage including the eight terminal and a thirteenth terminal electrically coupled to the twelfth terminal, the modulator stage configured to: receive, at the thirteenth terminal, the shaped signal; receive, at the eighth terminal, the baseband signal; and generate, based on the shaped signal and the baseband signal, the modulated signal within the RF including the shaped symbols at the symbol rate frequency.

Example 24b may include the transceiver of example 23b, wherein the third clock signal includes a plurality of sub window signals, the pulse shaper stage includes a plurality of digital gates, and the ninth terminal includes a plurality of sub-ninth terminals, each of the digital gates electrically coupled to the seventh terminal and a different sub-ninth terminal of the plurality of sub-ninth terminals, each digital gate of the plurality of digital gates configured to: receive, via a corresponding sub-ninth terminal of the plurality of sub-ninth terminals, a corresponding sub-window signal of the plurality of sub-window signals; receive, via the seventh terminal, the carrier signal; and gate the carrier signal with the corresponding sub-window signal of the plurality of sub-window signals to generate a plurality of sub-shaped signals within the RF, wherein the shaped signal includes the plurality of sub-shaped signals.

Example 25b may include the transceiver of example 24b, wherein the modulator stage includes a plurality of gate pairs and the thirteenth terminal includes a plurality of sub-thirteenth terminals, each gate pair of the plurality of gate pairs electrically coupled to the eighth terminal and a different sub-thirteenth terminal of the plurality of sub-thirteenth terminals, each gate pair of the plurality of gate pairs configured to: receive, via a corresponding sub-thirteenth terminal of the plurality of sub-thirteenth terminals, a corresponding sub-shaped signal of the plurality of sub-shaped signals; receive, via the eighth terminal, the baseband signal; gate the corresponding sub-shaped signal with the baseband signal; and gate the corresponding sub-shaped signal with a ground reference to cause the modulated signal to include a plurality of sub-modulated signals within the RF.

Example 26b may include the transceiver of example 25b, wherein the amplifier stage includes a plurality of amplifier capacitor pairs, wherein a capacitive value of each of the amplifier capacitor pairs includes the weighting scheme, the eleventh terminal includes a plurality of sub-eleventh terminals, each amplifier capacitor pair is electrically coupled to a different sub-eleventh terminal of the plurality of sub-eleventh terminals, and wherein each amplifier capacitor pair of the plurality of amplifier capacitor pairs is configured to: receive, via a corresponding sub-eleventh terminal of the plurality of sub-eleventh terminals, a corresponding sub-modulated signal of the plurality of sub-modulated signals; amplify an amplitude of the corresponding sub-modulated signal; and generate a sub-control signal within the RF based on amplified corresponding sub-modulated signal, wherein the control signal includes a sum of the sub-control signal generated by each amplifier capacitor pair of the plurality of amplifier capacitor pairs.

Example 27b may include the transceiver of any of examples 22b-26b, wherein the second clock signal is within a second frequency that is different than the first frequency, the fifth terminal includes a plurality of sub-fifth terminals, and the transceiver further includes a local oscillator including a plurality of oscillator terminals, each oscillator terminal of the plurality of oscillator terminal is electrically coupled to a different sub-fifth terminal of the plurality of sub-fifth terminals and: the local oscillator is configured to generate the second clock signal as a plurality of complementary phase signals within the second frequency, wherein each complementary phase signal is provided on a different oscillator terminal of the plurality of oscillator terminals; and the phase modulator stage is configured to: receive, via the plurality of sub-fifth terminals, the plurality of complementary phase signals; and multiplex the plurality of complementary phase signals based on the baseband signal.

Example 28b may include the transceiver of any of examples 22b-27b, wherein the baseband signal includes a plurality of even symbols and a plurality of odd symbols, the fourth terminal includes a first sub-terminal and a second sub-terminal, and wherein the phase modulator stage, the pulse shaper and modulator stage, and the amplifier stage include: an even path, electrically coupled to the first sub-terminal, the even path configured to: receive, via the first sub-terminal, the baseband signal including the plurality of even symbols; generate an even carrier signal based on the plurality of even symbols and the second clock signal, wherein the carrier signal includes the even carrier signal; and generate, based on the third clock signal, the plurality of even symbols, and the even carrier signal, an even modulated signal, wherein the modulated signal includes the even modulated signal; and an odd path electrically coupled to the second sub-terminal, the odd path configured to: receive, via the second sub-terminal, the baseband signal including the plurality of odd symbols; generate an odd carrier signal based on the plurality of odd symbols and the second clock signal, wherein the carrier signal further includes the odd carrier signal; and generate, based on the third clock signal, the plurality of odd symbols, and the odd carrier signal, an odd modulated signal, wherein the modulated signal further includes the odd modulated signal.

Example 29b may include a transceiver that includes a transmitter that includes: a baseband stage configured to: receive an input signal that includes a baseband symbol rate and a first clock signal within a first frequency that is equal to the baseband symbol rate; and generate, based on the first clock signal and the input signal, a baseband signal within a radio frequency (RF) that includes a symbol rate that is less than the baseband symbol rate; a phase modulator stage configured to: receive a second clock signal and the baseband signal; and generate a carrier signal within the RF that includes a modulated phase based on the baseband signal and the second clock signal; a pulse shaper and modulator stage configured to: receive a third clock signal, the baseband signal, and the carrier signal; and generate, based on the third clock signal, the baseband signal, and the carrier signal, a modulated signal within the RF that includes shaped symbols at the symbol rate so as to permit duplex wireless communication by the transceiver.

Example 30b may include the transceiver of example 29b further including an amplifier stage including a weighting scheme and configured to: receive the modulated signal; and generate a control signal within the RF based on the weighting scheme and the modulated signal.

Example 31b may include the transceiver of example 29b, wherein the pulse shaper and modulator stage includes: a pulse shaper stage configured to: receive the third clock signal and the carrier signal; and generate, based on the third clock signal and the carrier signal, a shaped signal within the RF that includes the shaped symbols at the symbol rate; and a modulator stage configured to: receive the shaped signal and the baseband signal; and generate, based on the shaped signal and the baseband signal, the modulated signal within the RF including the shaped symbols at the symbol rate.

Example 32b may include the transceiver of example 29b, wherein the third clock signal includes a plurality of sub window signals and the pulse shaper stage includes a plurality of digital gates, each digital gate of the plurality of digital gates configured to: receive a corresponding sub-window signal of the plurality of sub-window signals and the carrier signal; and gate the carrier signal with the corresponding sub-window signal of the plurality of sub-window signals to generate a plurality of sub-shaped signals within the RF, wherein the shaped signal includes the plurality of sub-shaped signals.

Example 33b may include the transceiver of example 31b, wherein the modulator stage includes a plurality of gate pairs, each gate pair of the plurality of gate pairs configured to: receive a corresponding sub-shaped signal of the plurality of sub-shaped signals and the baseband signal; gate the corresponding sub-shaped signal with the baseband signal; and gate the corresponding sub-shaped signal with a ground reference to cause the modulated signal to include a plurality of sub-modulated signals within the RF.

Example 34b may include the transceiver of example 30b, wherein the amplifier stage includes a plurality of amplifier capacitor pairs, wherein a capacitive value of each of the amplifier capacitor pairs includes the weighting scheme, and wherein each amplifier capacitor pair of the plurality of amplifier capacitor pairs is configured to: receive a corresponding sub-modulated signal of the plurality of sub-modulated signals; amplify an amplitude of the corresponding sub-modulated signal; and generate a sub-control signal within the RF based on amplified corresponding sub-modulated signal, wherein the control signal includes a sum of the sub-control signal generated by each amplifier capacitor pair of the plurality of amplifier capacitor pairs.

Example 35b may include the transceiver of example 29b, wherein the baseband signal includes a plurality of even symbols and a plurality of odd symbols and wherein the phase modulator stage, the pulse shaper and modulator stage, and the amplifier stage include: an even path configured to: generate an even carrier signal based on the plurality of even symbols and the second clock signal, wherein the carrier signal includes the even carrier signal; and generate, based on the third clock signal, the plurality of even symbols, and the even carrier signal, an even modulated signal, wherein the modulated signal includes the even modulated signal; and an odd path configured to: generate an odd carrier signal based on the plurality of odd symbols and the second clock signal, wherein the carrier signal further includes the odd carrier signal; and generate, based on the third clock signal, the plurality of odd symbols, and the odd carrier signal, an odd modulated signal, wherein the modulated signal further includes the odd modulated signal.

Example 1c may include transceiver that includes: a secondary receiver device configured to: receive a beacon signal on a channel, the beacon signal including a plurality of sample pairs, each sample pair of the plurality of sample pairs including a plurality of out of phase pre-defined channel samples; determine a ratio and a sign of amplitudes of each of the out of phase pre-defined channel samples of the plurality of out of phase pre-defined channel samples; and determine channel state information (CSI) of the channel based on the ratio and the sign of the amplitudes of the plurality of out of phase pre-defined channel samples; and a main receiver device configured to: receive a signal on the channel; and recover the signal based on the CSI.

Example 2c may include the transceiver of example 1b, wherein each of the out of phase pre-defined channel samples of the plurality of sample pairs includes a pre-defined ratio and a sign of the amplitudes and the secondary receiver device is further configured to: determine an aliased ratio and sign of the amplitudes of each of the out of phase pre-defined channel samples of the plurality of sample pairs; compare the aliased ratio and sign of each of the amplitudes to the pre-defined ratio and sign of the corresponding amplitudes; and determine a phase rotation of the channel based on a difference between the aliased ratio and sign of each of the amplitudes and the pre-defined ratio and sign of the amplitudes, wherein the CSI includes the phase rotation of the channel.

Example 3c may include the transceiver of example 2c, wherein the secondary receiver device is further configured to: determine a frequency dependent channel impulse response of the channel; and invert the frequency dependent channel impulse response to derive tap coefficients, wherein the CSI includes the tap coefficients.

Example 4c may include the transceiver of example 3c, wherein the main receiver device includes a constant scaling factor based on a gain of the main receiver device and a gain of the secondary receiver device and wherein the main receiver device is configured to multiply the tap coefficients by the constant scaling factor to determine final CSI based on a difference between the gain of the main receiver device and the gain of the secondary receiver device.

Example 5c may include the transceiver of any of examples 1c-4c, wherein the beacon signal includes a wake up radio packet including: a wake-up preamble including synchronization information; a MAC header including information identifying a transmitter that transmitted the beacon signal and that the beacon signal is for channel calibration; a data payload including the plurality of sample pairs; and a frame check sequence including information for error detection and error correction.

Example 6c may include the transceiver of example 5c, wherein the MAC header, the data payload, and the FCS are Manchester encoded.

Example 7c may include the transceiver of any of examples 5c and 6c, wherein the beacon signal is modulated according to one of an on-off keying modulation scheme, an amplitude phase shift keying scheme, and quadrature amplitude modulation scheme.

Example 8c may include the transceiver of any of examples 5c-7c, wherein the CSI includes coarse CSI and wherein the signal includes a data packet including: a frame synchronization sequence; a data payload, wherein the frame synchronization sequence and the data payload includes information to cause the main receiver device to determine fine CSI based on the information within the frame synchronization sequence, the coarse CSI, and the data payload; and another frame check sequence.

Example 9c may include the transceiver of any of examples 1c-7c, wherein the CSI includes coarse CSI, the secondary receiver device includes pre-defined parameters, and the main receiver device also includes pre-defined parameters, the main receiver device further configured to determine fine CSI based on the coarse CSI and the pre-defined parameters of the secondary receiver device and the main receiver device.

Example 10c may include the transceiver of any of examples 1c-9c, wherein the secondary receiver device is further configured to: receive a wake up signal; and provide the wake up signal to the main receiver device, wherein, responsive to receiving the wake up signal, the main receiver device is configured to: transition from a low power state to an operative state; receive the signal on the channel; and recover the signal based on the CSI.

Example 11c may include the transceiver of any of examples 1c-10c, wherein the secondary receiver device determines the CSI of the channel to maintain a calibrated channel for the main receiver device to receive the signal on.

Example 12c may include the transceiver of any of examples 1c-11c further including: an antenna element configured to wirelessly receive the beacon signal and the signal on the channel; and a plurality of switching elements, each switching element of the plurality of switching elements electrically coupled between the antenna elements and one of the main receiver device and the secondary receiver device, wherein each switching element of the plurality of switching elements is configured to transition between an open state and a closed state, the plurality of switching elements configured to control when the main receiver device is electrically coupled to the antenna element and when the secondary receiver device is electrically coupled to the antenna element.

Example 13c may include the transceiver of any of examples 1c-12c, wherein the plurality of out of phase pre-defined channel samples include a plurality of out of phase pre-defined in-phase/quadrature (I/Q) samples.

Example 14c may include the transceiver of example 13c, wherein each out of phase pre-defined I/Q sample of the plurality of out of phase pre-defined I/Q samples includes a pre-defined ratio and a sign of the amplitudes and the secondary receiver device is further configured to: determine an aliased ratio and sign of the amplitudes of a projection of each out of phase pre-defined I/Q sample of the plurality of out of phase pre-defined I/Q samples onto an in-phase axis; compare the aliased ratio and sign of each of the amplitudes to the pre-defined ratio and sign of the corresponding amplitudes; and determine a phase rotation of the channel based on a difference between the aliased ratio and sign of each of the amplitudes and the pre-defined ratio and sign of the amplitudes, wherein the CSI includes the phase rotation of the channel.

Example 15c may include the transceiver of any of examples 1c-14c, wherein the channel samples of each of the plurality of out of phase pre-defined channel samples are ninety degrees out of phase with each other.

Example 16c may include the transceiver of any of examples 1c-15c, wherein the channel samples of each of the plurality of out of phase pre-defined channel samples include different amplitudes than each other.

Example 17c may include the transceiver of any of examples 1c-16c, wherein the beacon signal includes a first beacon signal, the plurality of sample pairs include a first plurality of sample pairs, and the plurality of out of phase pre-defined channel samples include a first plurality of out of phase pre-defined channel samples, and wherein the secondary receiver is further configured to: receive a second beacon signal on the channel, the second beacon signal including a second plurality of sample pairs, each sample pair of the second plurality of sample pairs including a second plurality of out of phase pre-defined channel samples; determine a ratio and a sign of amplitudes of each of the out of phase pre-defined channel samples of the second plurality of out of phase pre-defined channel samples; and update the CSI of the channel based on the ratio and the sign of the amplitudes of the first plurality of out of phase pre-defined channel samples and the ratio and the sign of the amplitudes of the second plurality of out of phase pre-defined channels samples.

Example 18c may include the transceiver of any of examples 1c-17c, wherein the secondary receiver device operates at a reduced bandwidth compared to the main receiver device.

Example 19c may include the transceiver of any of examples 1c-18c, wherein the channel includes a frequency between three hundred megahertz and three hundred gigahertz.

Example 20c may include the transceiver of any of examples 1c-19c, wherein: the main receiver device is further configured to receive a first clock signal at a frequency; and the secondary receiver device is further configured to receive a second clock signal at the frequency, wherein duty cycles of the main receiver device and the secondary receiver device are based on the frequency.

Example 21c may include the transceiver of any of examples 1c-20c, wherein the secondary receiver device is configured to operate according to non-coherent detection.

Example 22c may include the transceiver of any of examples 1c-21c, wherein the beacon signal includes a wake up radio signal.

Example 23c may include the transceiver of any of examples 1c-22c, wherein the transceiver is configured to communicate control signals within a control plane.

Example 24c may include the transceiver of any of examples 1c-22c, wherein the transceiver is configured to communicate data signals within a data plane.

Example 25c may include a transceiver that includes: a secondary receiver device including a first terminal and a second terminal, the secondary receiver device configured to: receive, via the first terminal, a beacon signal on a channel, the beacon signal including a plurality of sample pairs, each sample pair of the plurality of sample pairs including a plurality of out of phase pre-defined channel samples; determine a ratio and a sign of amplitudes of each of the out of phase channel samples of the plurality of out of phase channel samples; and determine channel state information (CSI) of the channel based on the ratio and the sign of the amplitudes of the plurality of out of phase pre-defined channel samples; and a main receiver device including a third terminal and a fourth terminal electrically coupled to the second terminal, the main receiver device configured to: receive, via the third terminal, a signal on the channel; receive, via the fourth terminal, the CSI; and recover the signal based on the CSI.

Example 26c may include the transceiver of example 25c, wherein the secondary receiver device is further configured to: receive, via the first terminal, a wake up signal; and provide, via the second terminal and the fourth terminal, the wake up signal to the main receiver device, wherein, responsive to receiving the wake up signal, the main receiver device is configured to: transition from a low power state to an operative state; receive the signal on the channel; and recover the signal based on the CSI.

Example 27c may include the transceiver of any of examples 25c and 26c further including: an antenna element including a fifth terminal, the antenna element configured to wirelessly receive the beacon signal and the signal on the channel; and a plurality of switching elements including a sixth terminal electrically coupled to the fifth terminal, a seventh terminal electrically coupled to the third terminal, and an eighth terminal electrically coupled to the first terminal, each switching element of the plurality of switching elements electrically coupled between the sixth terminal and one of seventh terminal and the eighth terminal, wherein each switching element of the plurality of switching elements is configured to transition between an open state and a closed state, the plurality of switching elements configured to control when the seventh terminal is electrically coupled to sixth terminal and when the eighth terminal is electrically coupled to the sixth terminal.

Example 28c may include the transceiver of any of examples 25c-27c, wherein the beacon signal includes a first beacon signal, the plurality of sample pairs include a first plurality of sample pairs, and the plurality of out of phase pre-defined channel samples include a first plurality of out of phase pre-defined channel samples, and wherein the secondary receiver is further configured to: receive, via the first terminal, a second beacon signal on the channel, the second beacon signal including a second plurality of sample pairs, each sample pair of the second plurality of sample pairs including a second plurality of out of phase pre-defined channel samples; determine a ratio and a sign of amplitudes of each of the out of phase pre-defined channel samples of the second plurality of out of phase pre-defined channel samples; and update the CSI of the channel based on the ratio and the sign of the amplitudes of the first plurality of out of phase pre-defined channels samples and the ratio and the sign of the amplitudes of the second plurality of out of phase pre-defined channel samples.

Example 29c may include the transceiver of any of examples 25c-28c, wherein each of the out of phase pre-defined channel samples of the plurality of sample pairs includes a pre-defined ratio and a sign of the amplitudes and the secondary receiver device is further configured to: determine an aliased ratio and sign of the amplitudes of each of the out of phase pre-defined channel samples of the plurality of sample pairs; compare the aliased ratio and sign of each of the amplitudes to the pre-defined ratio and sign of the corresponding amplitudes; and determine a phase rotation of the channel based on a difference between the aliased ratio and sign of each of the amplitudes and the pre-defined ratio and sign of the amplitudes, wherein the CSI includes the phase rotation of the channel.

Example 30c may include the transceiver of example 29c, wherein the secondary receiver device is further configured to: determine a frequency dependent channel impulse response of the channel; and invert the frequency dependent channel impulse response to derive tap coefficients, wherein the CSI includes the tap coefficients.

Example 31c may include the transceiver of example 30c, wherein the main receiver device includes a constant scaling factor based on a gain of the main receiver device and a gain of the secondary receiver device and wherein the main receiver device is configured to multiply the tap coefficients by the constant scaling factor to determine final CSI based on a difference between the gain of the main receiver device and the gain of the secondary receiver device.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A transceiver comprising:
a transmitter device configured to concurrently provide a transmit control signal on a first channel and a second channel;
a receiver device configured to concurrently receive a receive control signal on the first channel and the second channel;
a secondary receiver device configured to concurrently monitor occupation of the first channel and the second channel without decoding at least a portion of control signals concurrent with the receiver device receiving the receive control signal; and
a plurality of switching elements configured to control when:
the transmitter device provides the transmit control signal to one of a first antenna and a second antenna and the transmitter device is electrically isolated from the first antenna and the second antenna;
the receiver device receives the receive control signal from one of the first antenna and the second antenna and the receiver device is electrically isolated from the first antenna and the second antenna; and
the secondary receiver device monitors occupation of one of the first channel and the second channel and the secondary receiver device is electrically isolated from the first antenna and the second antenna.

2. The transceiver of claim 1, wherein the secondary receiver is further configured to monitor the first channel and the second channel for a wake up signal and the corresponding switching elements of the plurality of switching elements are configured to transition between an open state and a closed state to control when the secondary receiver device monitors the first channel and the second channel for the wake up signal.

3. The transceiver of claim 2, wherein the plurality of switching elements transition between the open state and the closed state to cause the transceiver to operate according to a particular operational mode of a plurality of operational modes.

4. The transceiver of claim 3, wherein the plurality of operational modes comprise:
a transmit only mode in which the transmitter device provides the transmit control signal to one of the first antenna and the second antenna and the corresponding switching elements of the plurality of switching elements electrically isolate the receiver device and the secondary receiver device from the first antenna and the second antenna;
a receive only mode in which the receiver device receives the receive control signal from one of the first antenna and the second antenna and the corresponding switching elements of the plurality of switching elements electrically isolate the transmitter device and the secondary receiver device from the first antenna and the second antenna;
a duplex channel occupation mode in which the receiver device receives the receive control signal from one of the first antenna and the second antenna, the secondary receiver device monitors occupation of one of the first channel and the second channel and the corresponding switching elements of the plurality of switching elements electrically isolate the transmitter device from the first antenna and the second antenna; and
a duplex mode in which the receiver device receives the receive control signal from one of the first antenna and the second antenna, the transmitter device provides the transmit control signal to one of the first antenna and the second antenna, and the corresponding switching elements of the plurality of switching elements electrically isolate the secondary receiver device from the first antenna and the second antenna.

5. The transceiver of claim 4, wherein the plurality of operational modes further comprise a standby mode in which the secondary receiver device monitors one of the first channel and the second channel for the wake up signal and the corresponding switching elements of the plurality of switching elements electrically isolate the receiver device and the transmitter device from the first antenna and the second antenna.

6. The transceiver of claim 4, wherein:
prior to the transmitter device providing the transmit control signal, the switching elements transition between the open state and the closed state to cause the transceiver to operate according to the duplex channel occupation mode to permit the secondary receiver to determine if one of the first channel and the second channel are occupied; and
responsive, to the corresponding channel not being occupied, the switching elements transition between the open state and the closed state to cause the transceiver to operate according to one of the transmit only mode or the duplex mode.

7. The transceiver of claim 1, wherein the secondary receiver device is configured to monitor occupation of the first channel and the second channel by detecting energy on one of the first channel and the second channel.

8. The transceiver of claim 1, wherein the first antenna comprises a single channel antenna element configured to operate on the first channel and the second antenna comprises a single channel antenna element configured to operate on the second channel and the transceiver is configured to operate according to a frequency division duplex protocol.

9. The transceiver of claim 8, wherein the first channel and the second channel comprise separate channels that each comprise a bandwidth that is equal to or greater than five hundred megahertz.

10. The transceiver of claim 1, wherein the plurality of switching elements comprises a dual-port-three-throw (DP3T) switch assembly.

11. The transceiver of claim 10, wherein the DP3T switch assembly comprises six switching elements wherein: a first switching element is electrically coupled between the transmitter device and the first antenna; a second switching element is electrically coupled between the transmitter device and the second antenna; a third switching element is electrically coupled between the receiver device and the first antenna; a fourth switching element is electrically coupled between the receiver device and the second antenna; a fifth switching element is electrically coupled between the secondary receiver device and the first antenna; and a sixth switching element is electrically coupled between the secondary receiver device and the second antenna .

12. The transceiver of claim 1, wherein the transceiver is configured to support point to multi-point communication.

13. The transceiver of claim 1, wherein the transceiver is configured to support multi-point to multi-point communication.

14. The transceiver of claim 1, wherein the transceiver comprises a control plane system.

* * * * *